United States Patent [19]

Kim et al.

[11] Patent Number: 4,915,468

[45] Date of Patent: Apr. 10, 1990

[54] APPARATUS USING TWO-MODE OPTICAL WAVEGUIDE WITH NON-CIRCULAR CORE

[75] Inventors: Byoung Y. Kim, Menlo Park, Calif.; James N. Blake, Phoenix, Ariz.

[73] Assignee: The Board of Trustees of the Leland Stanford Junior University, Stanford, Calif.

[21] Appl. No.: 245,717

[22] Filed: Sep. 16, 1988

Related U.S. Application Data

[63] Continuation-in-part of Ser. No. 17,882, Feb. 20, 1987, abandoned.

[51] Int. Cl.[4] .......................... G02B 6/02; G02B 6/26
[52] U.S. Cl. ............................... 350/96.15; 350/96.29
[58] Field of Search ............... 350/96.15, 96.16, 96.18, 350/96.20, 96.29, 96.30

[56] References Cited

U.S. PATENT DOCUMENTS

| | | | |
|---|---|---|---|
| 4,536,058 | 8/1985 | Shaw et al. | 350/320 |
| 4,556,279 | 12/1985 | Shaw et al. | 350/96.15 |
| 4,669,814 | 6/1987 | Dyott | 350/96.15 |
| 4,679,894 | 7/1987 | Pavlath | 350/96.15 |
| 4,684,215 | 8/1987 | Shaw et al. | 350/96.29 |
| 4,699,513 | 10/1987 | Brooks et al. | 356/345 |
| 4,735,484 | 4/1988 | Fesler | 350/96.29 |
| 4,735,485 | 4/1988 | Shaw et al. | 350/96.29 |
| 4,741,586 | 5/1988 | Kim et al. | 350/96.15 |
| 4,768,851 | 9/1988 | Shaw et al. | 350/96.15 |

OTHER PUBLICATIONS

W. P. Risk et al., "Single-Sideband Frequency Shifting in Birefringent Optical Fiber," *SPIE* vol. 478-Fiber Optic and Laser Sensors II (1984), pp. 91–97.

D. Gloge, "Weakly Guiding Fibers," *APPLIED OPTICS*, vol. 10, No. 10, Oct. 1971, pp. 2252–2258.

Masaaki Imai et al., "Excitation of the Fundamental and Low-Order Modes of Optical Fiber Waveguides with Gaussian Beams. 2: Offset Beams," *APPLIED OPTICS*, vol. 14, No. 1, Jan. 1975, pp. 169–173.

M. R. Layton et al., "Optical Fiber Acoustic Sensor Utilizing Mode–Mode Interference," *APPLIED OPTICS*, vol. 18, No. 5, Mar. 1, 1979, pp. 666–670.

Thomas G. Giallorenzi et al., "Otical Fiber Sensor Technology," *IEEE JOURNAL OF QUANTUM ELECTRONICS*, vol. QE-18, No. 4, Apr. 1982, pp. 626–665.

Michel J. F. Digonnet et al., "Analysis of a Tunable Single Mode Optical Fiber Coupler," *IEEE JOURNAL OF QUANTUM ELECTRONICS*, vol. QE-18, No. 4, Apr. 1982, pp. 746–754.

Toshihiko Yoshino et al., "Fiber-Optic Fabry-Perot Interferometer and Its Sensor Applications," *IEEE Journal of Quantum Electronics*, vol. QE-18, Oct. 1982, pp. 1624–1633.

Allen W. Snyder et al., "Optical Waveguide Theory," Section 18-10, Modes of perturbed fibers; Example: Elliptical deformation, Chapman and Hall, N.Y. (ISBN 0-412-09959-0), 1983, pp. 382–387.

G. Meltz et al., "Cross-Talk Fiber-Optic Temperature Sensor," *APPLIED OPTICS*, vol. 22, No. 3, Feb. 1, 1983, pp. 464–477.

(List continued on next page.)

*Primary Examiner*—William L. Sikes
*Assistant Examiner*—Akm E. Ullah
*Attorney, Agent, or Firm*—Knobbe, Martens, Olson & Bear

[57] ABSTRACT

An apparatus utilizes a two-mode optical waveguide with a non-circular core to provide stable spatial intensity patterns in both propagation modes for light propagating therein. The light has a wavelength, and the non-circular core has cross-sectional dimensions selected such that (1) the waveguide propagates light at that wavelength in a fundamental mode and a higher order mode, and (2) substantially all of the light in the higher order mode propagates in only a single, stable intensity pattern. Embodiments of the invention include, for example, modal couplers, frequency shifters, mode selectors and interferometers. One of the interferometer embodiments may be used as a strain gauge.

88 Claims, 19 Drawing Sheets

OTHER PUBLICATIONS

S. C. Rashleigh, "Polarimetric Sensors: Exploiting the Axial Stress in High Birefringence Fibers," *Digest of the First International Conference on Optical Fibre Sensors*, London, England, Apr. 26-28, 1983, pp. 210-213.

S. C. Rashleight et al., "Perservation of Polarization in Single-Mode Fibers," *Laser Focus With Fiberoptic Technology*, vol. 19, No. 5, May 1983, pp. 155-161.

K. Nosu et al., "Acousto-Optic Frequency Shifter for Single-Mode Fibers," *Electronic Letters*, vol. 19, No. 20, Sep. 29, 1983, pp. 816-818.

R. C. Youngquist et al., "Two Mode Fiber Modal Coupler," *Optics Letters*, vol. 9, No. 5, May 1984, pp. 177-179.

W. P. Risk et al., "Acousto-Optic Frequency Shifting in Birefringent Fiber," *OPTICS LETTERS*, vol. 9, No. 7, Jul. 1984, pp. 309-311.

Henry F. Taylor, "bending Effects in Optical Fibers," *Journal of Lightwave Technology*, vol. LT-2, No. 5, Oct. 1984, pp. 617-628.

R. C. Youngquist et al., "All-Fibre Component Using Periodic Coupling," *IEEE Proceedings*, vol. 132, Pt. J, No. 5, Oct. 1985, pp. 277-286.

W. V. Sorin et al, "Phase-Velocity Measurements Using Prism Output Coupling for Single-and Few-Mode Optical Fibers," *OPTICS LETTERS*, vol. 11, No. 2, Feb. 1986, pp. 106-108.

J. N. Blake et al., "Fiber-Optic Modal Coupler Using Periodic Microbending," *OPTICS LETTERS*, vol. 11, No. 3, Mar. 1986, pp. 177-179.

Allan W. Snyder et al., "Optical Fibers of Arbitrary Cross Sections," *Journal of the Optical Society of America-A*, vol. 3, No. 5, May 1986, pp. 600-609.

B. Y. Kim et al., "All-Fiber Acousto-Optic Frequency Shifter," *OPTICS LETTERS*, vol. 11, No. 6, Jun. 1986, pp. 389-391.

W. V. Sorin et al., "Highly Selective Evanescent Modal Filter for Two-Mode Optical Fibers," *OPTICS LETTERS*, vol. 11, No. 9, Sep. 1986, pp. 581-583.

J. N. Blake et al., "All-Fiber Acousto-Optic Frequency Shifter Using Two-Mode Fiber," *Proceedings of the SPIE*, vol. 719, 1986, pp. 92-100.

W. V. Sorin et al., "A Single-Mode Fiber Evanescent Grating Reflector," *Journal of Lightwave Technology*, vol. LT-3, No. 5, Oct. 1985, pp. 1041-1043.

J. N. Blake et al., "Elliptical Core Two-Mode Fiber Strain Gauge," *SPIE* vol. 838, *Fiber Optic and Laser Sensors V*, Aug. 17-19, 1987, San Diego, pp. 332-339.

B. Y. Kim et al., "Use of Highly Elliptical Core Fibers for Two-Mode Fiber Devices," *Optics Letters*, vol. 12, Sep. 1987, pp. 729-731.

J. N. Blake et al., "Strain Effects on Highly Elliptical Core Two-Mode Fibers," *OPTICS LETTERS*, vol. 12, Sep. 1987, pp. 732-734.

J. N. Blake et al., "Elliptical Core Two-Mode Fiber Strain Gauge with Heterodyne Detection," Optical Fiber Sensors, 1988 Technical Digest Series, vol. 2, Part 2, presented at Optical Fibers Topical Meeting, Jan. 27-29, 1988, New Orleans, pp. 416-419.

H. E. Engan et al., "Propagation and Optical Interaction of Guided Acoustic Waves in Two-Mode Optical Fibers," *Journal of Lightwave Technology*, vol. 6, No. 3, Mar. 1988, pp. 428-436.

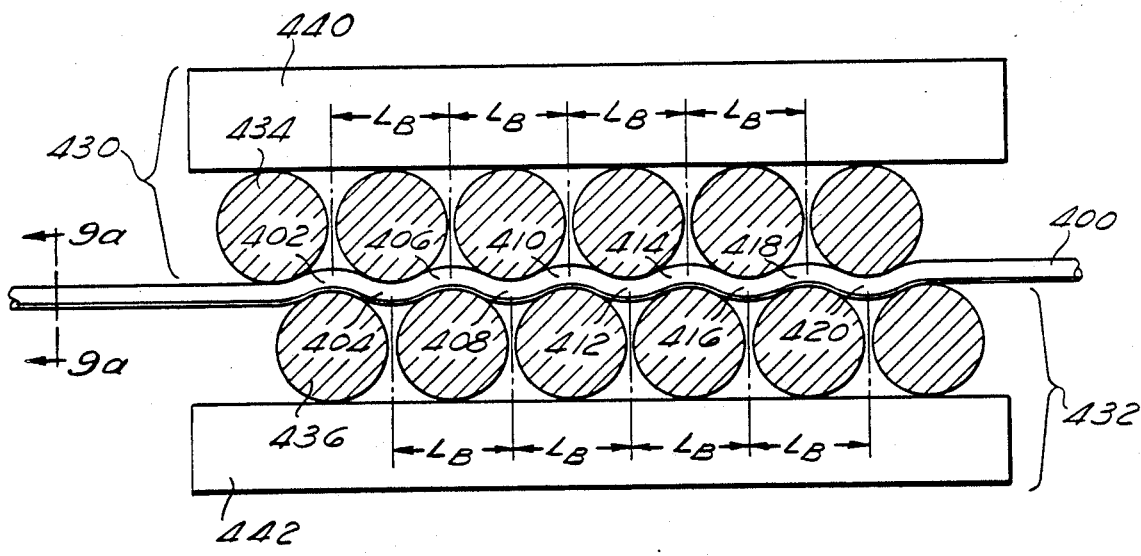
Fig. 9
Fig. 9a
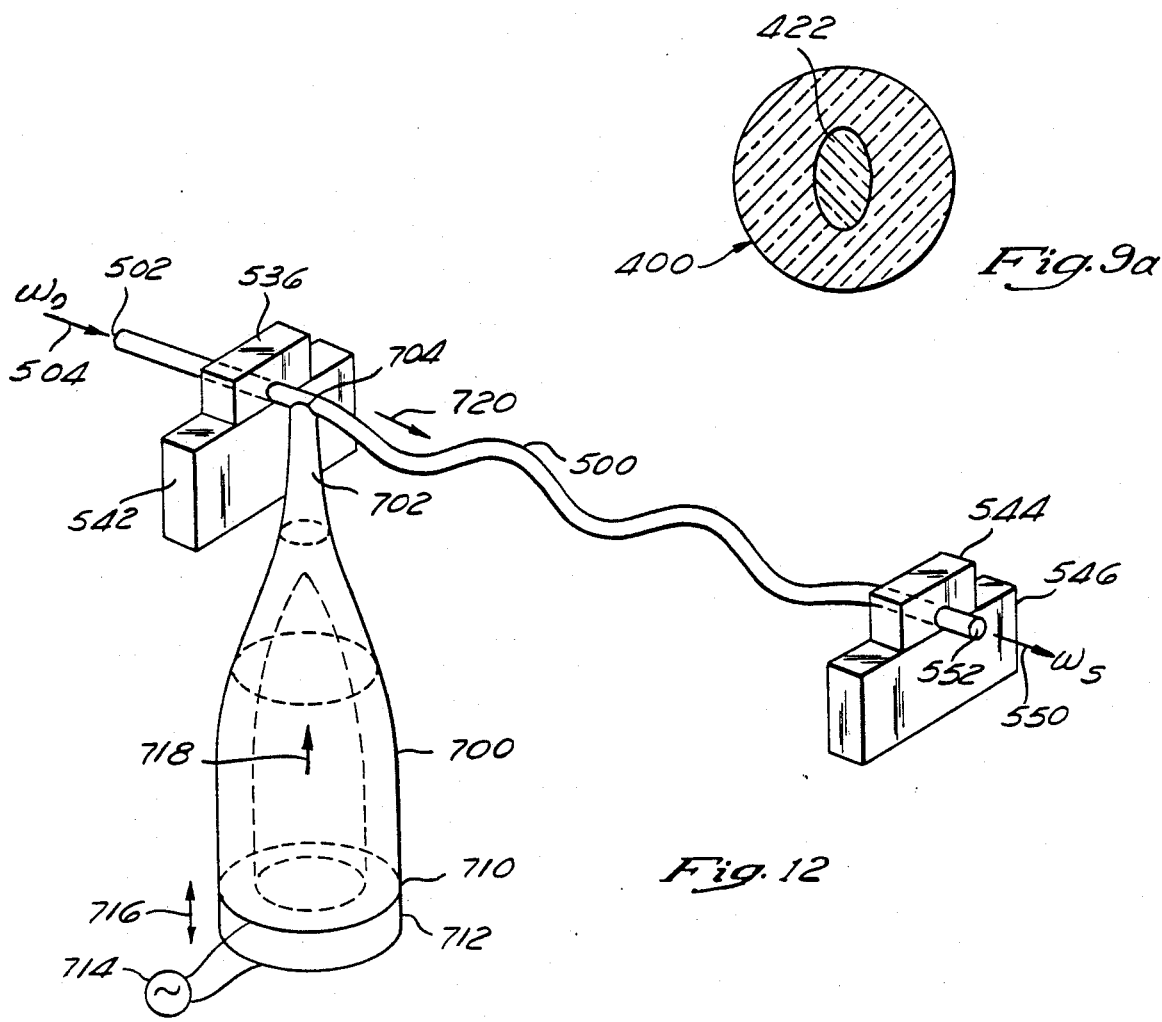
Fig. 12

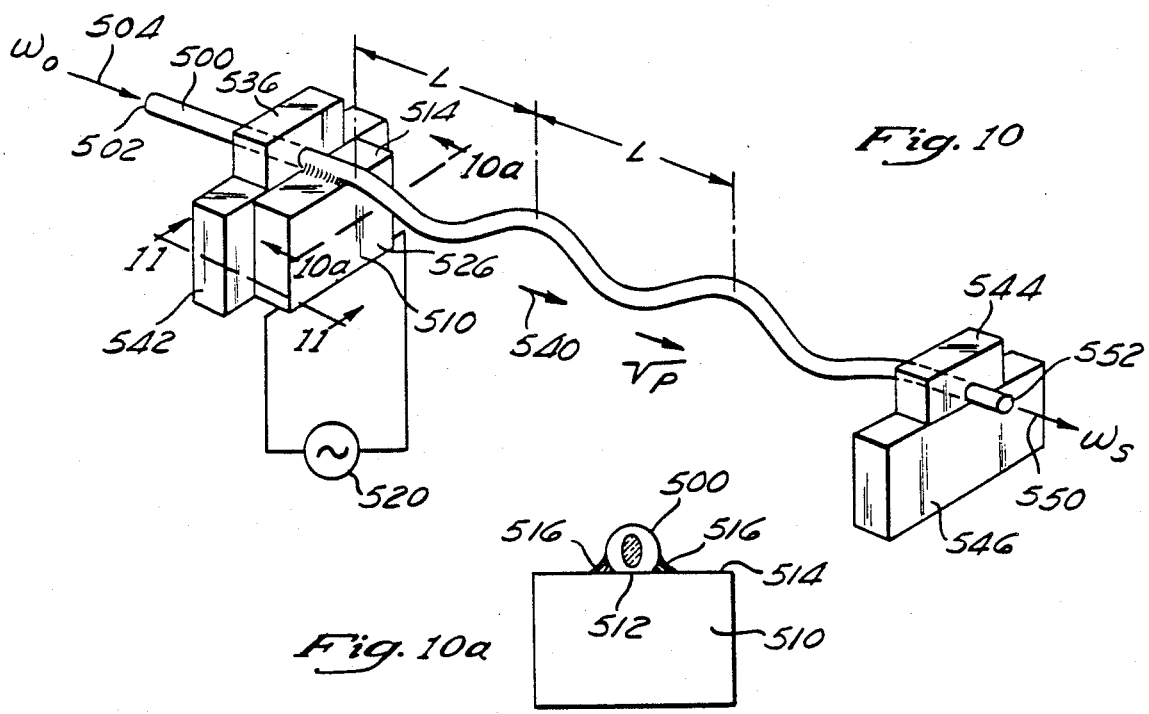
*Fig. 10*
*Fig. 10a*
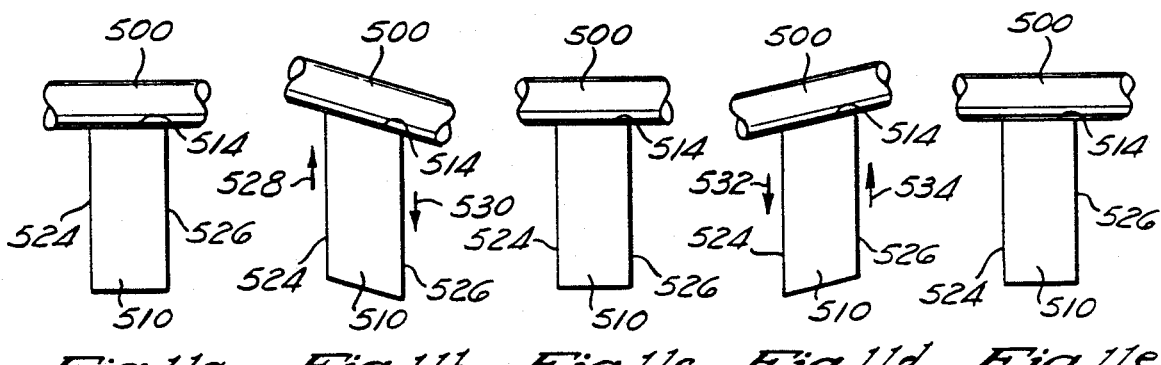
*Fig. 11a*  *Fig. 11b*  *Fig. 11c*  *Fig. 11d*  *Fig. 11e*

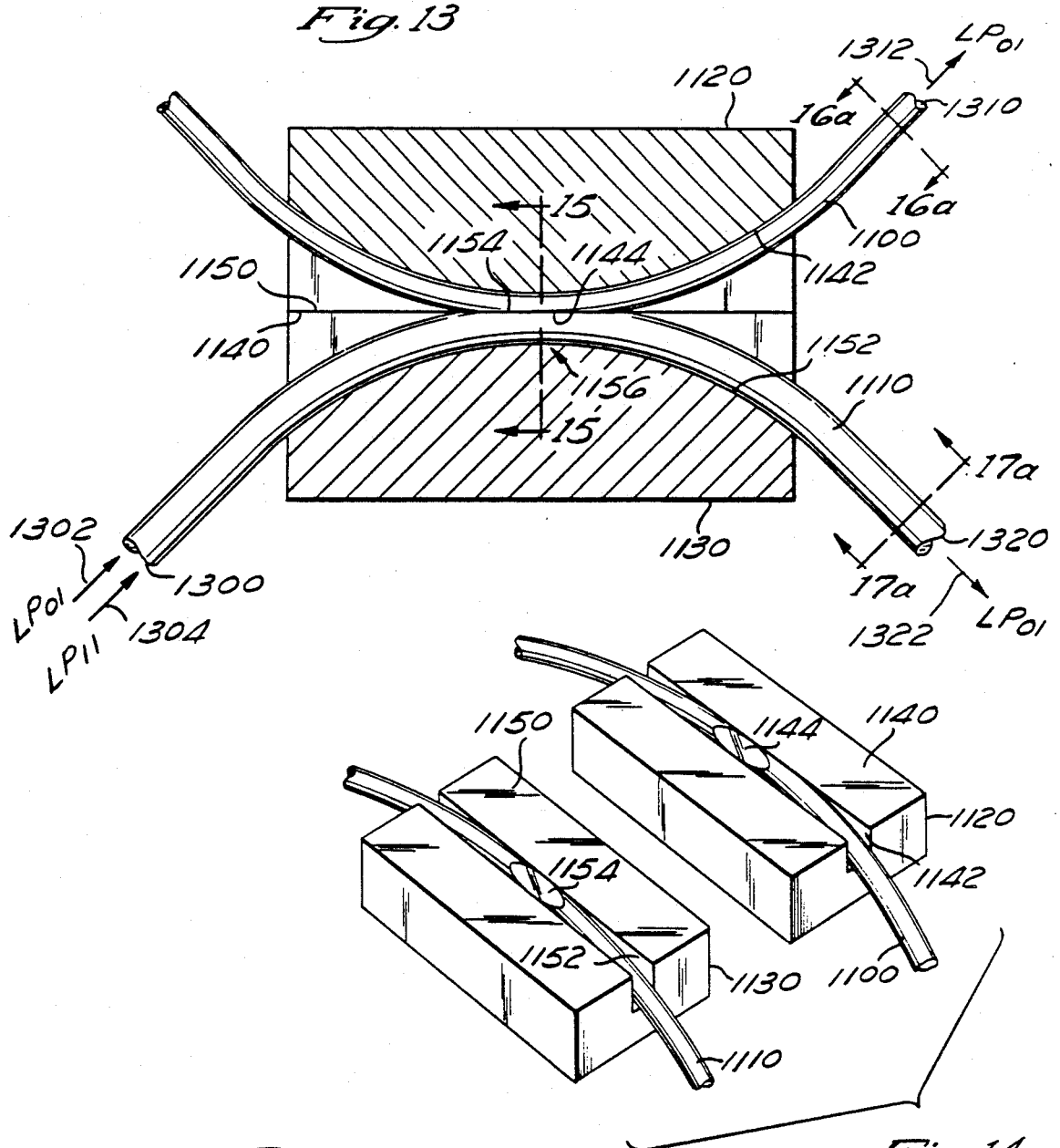
Fig. 13
Fig. 14
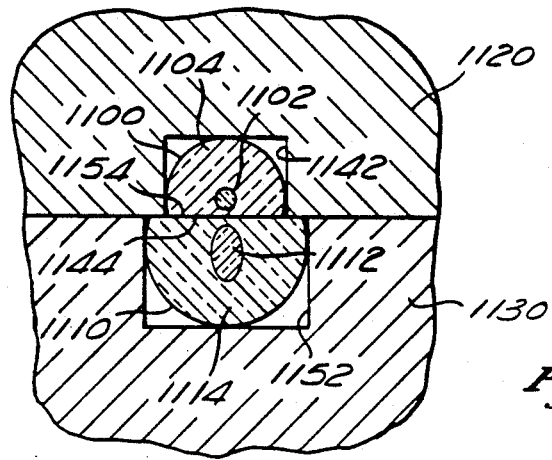
Fig. 15

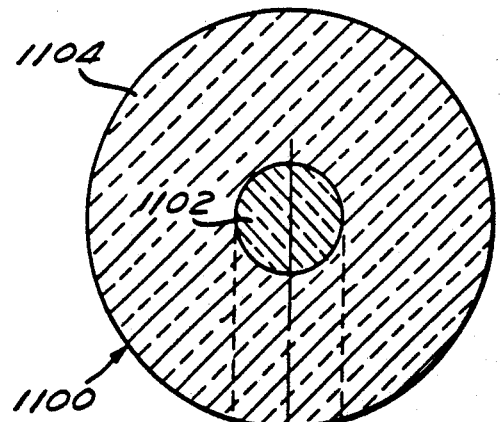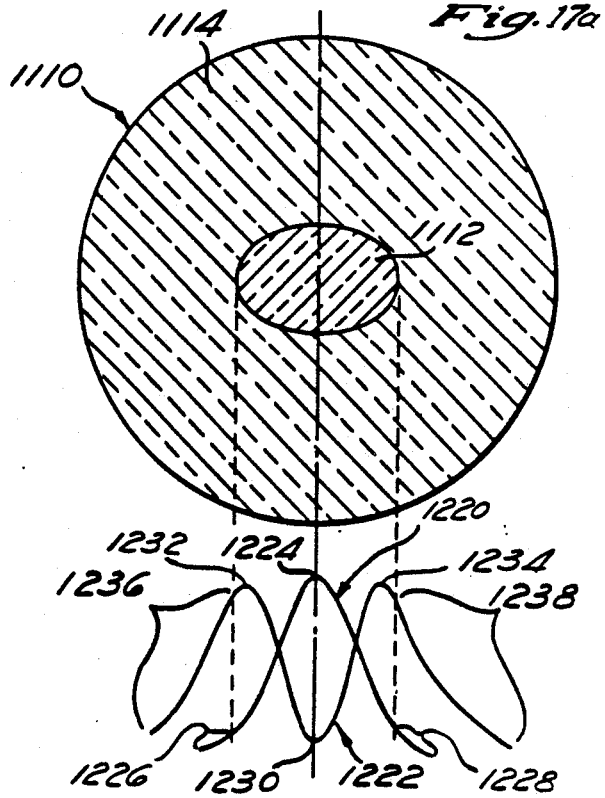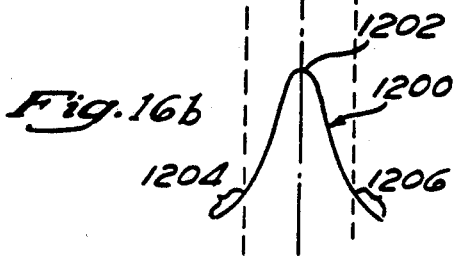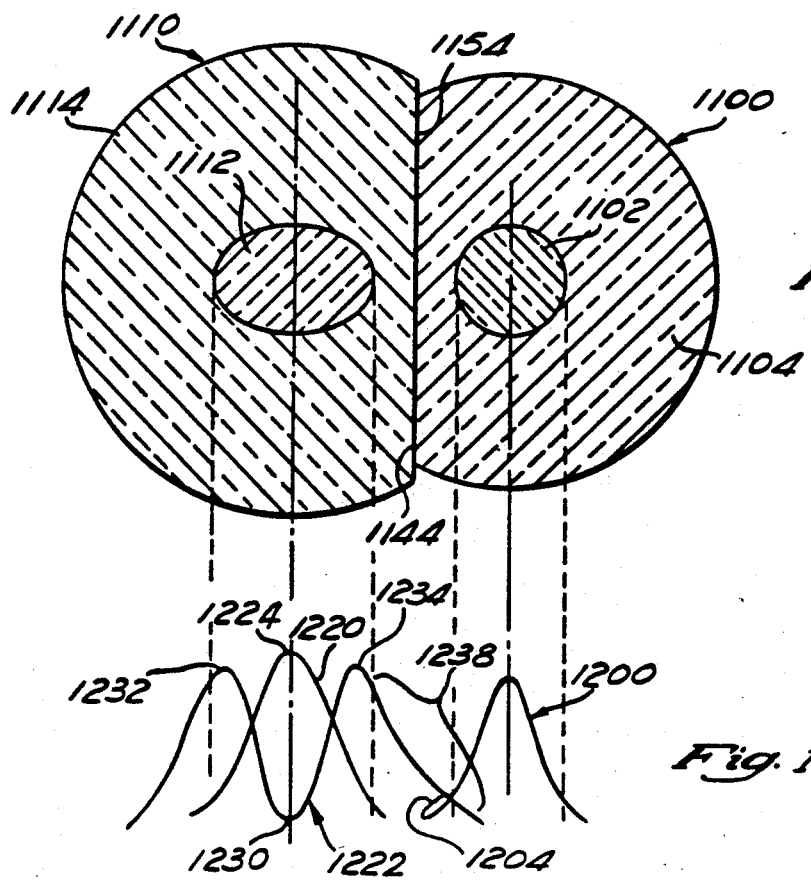

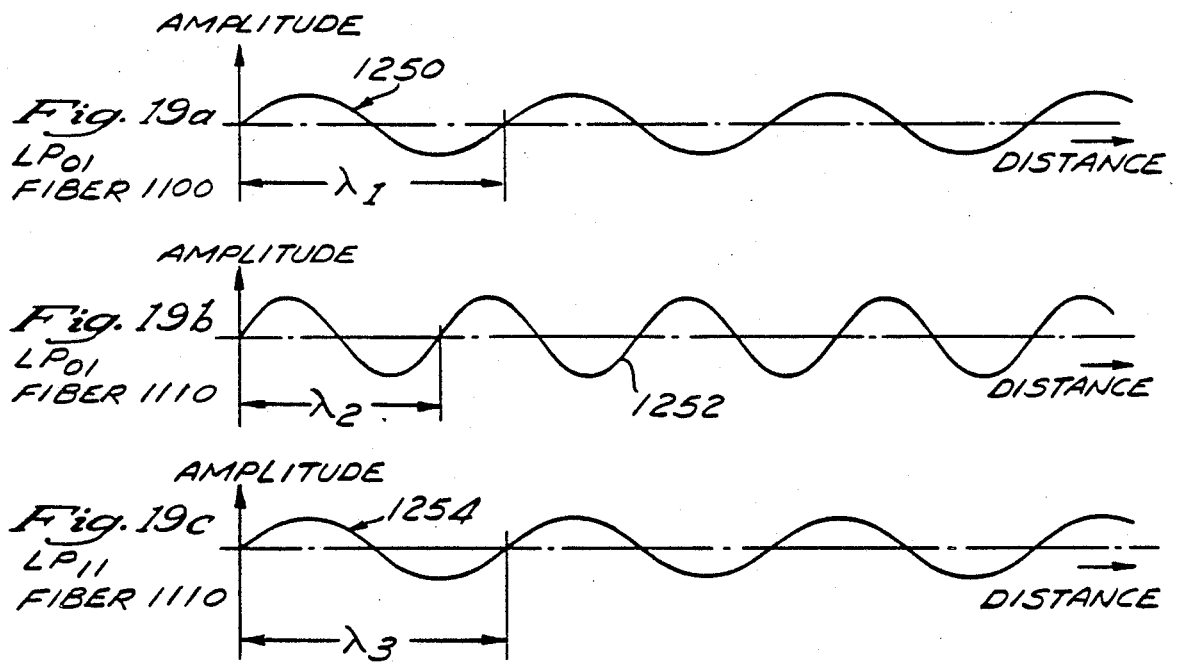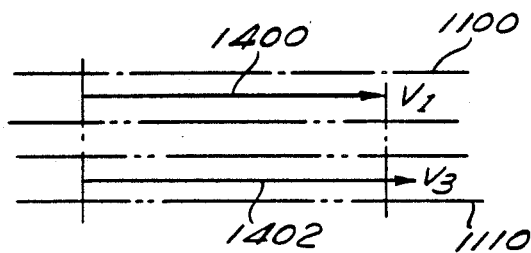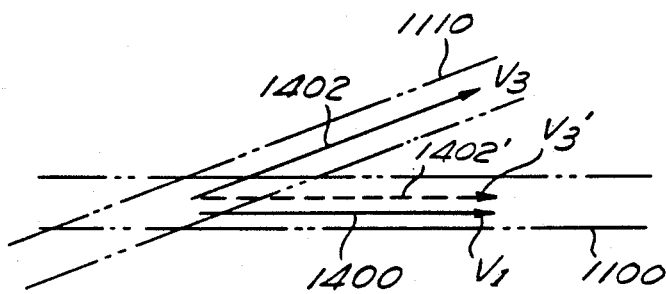

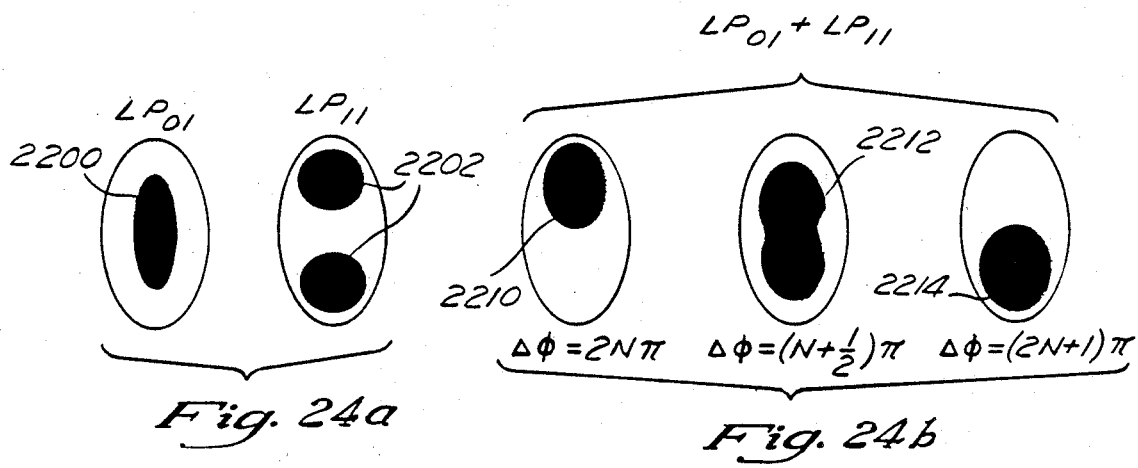
Fig. 24a
Fig. 24b
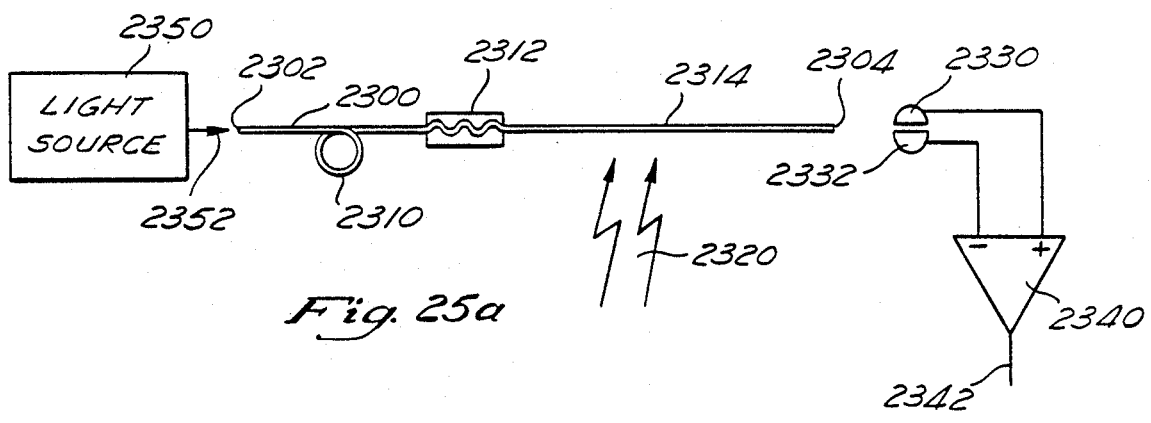
Fig. 25a
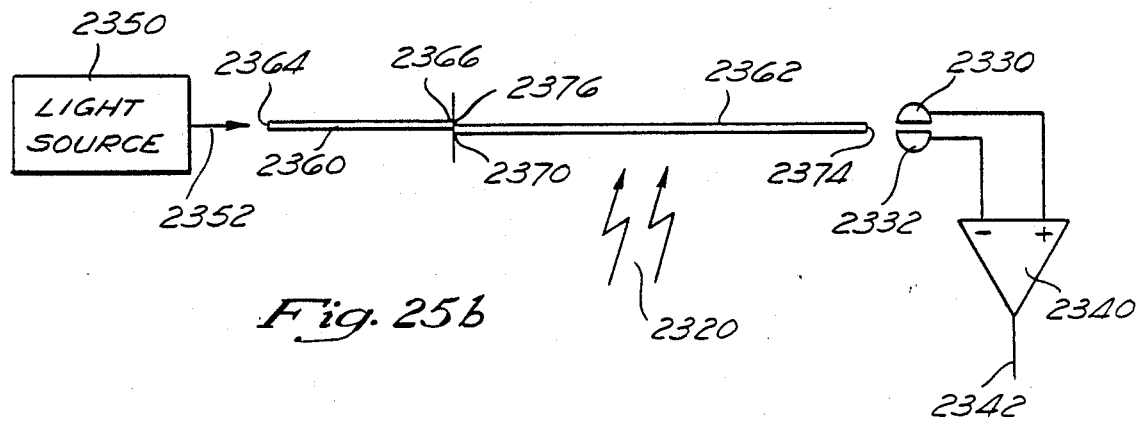
Fig. 25b

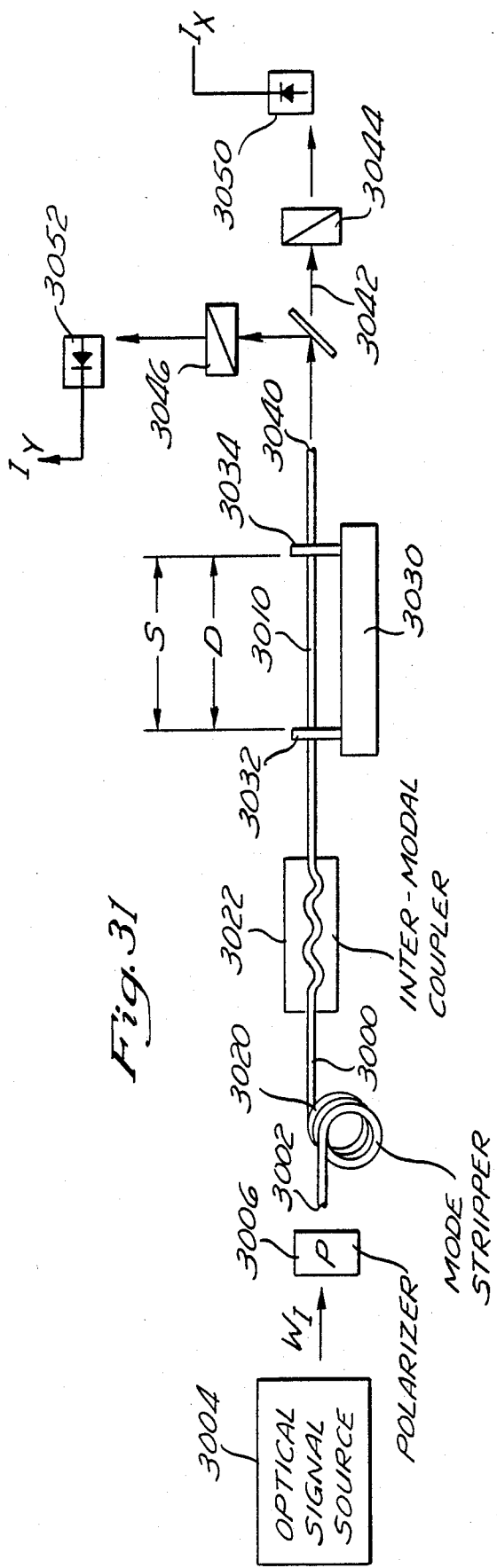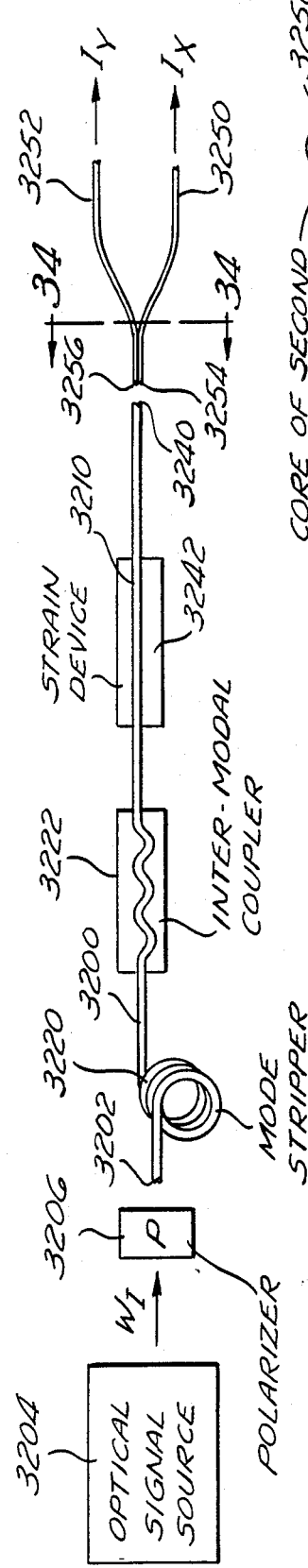

DETECTED HORIZONTALLY POLARIZED LIGHT
IN SELECTED LOBE VERSUS STRAIN

DETECTED VERTICALLY POLARIZED LIGHT
IN SELECTED LOBE VERSUS STRAIN

APPARATUS USING TWO-MODE OPTICAL WAVEGUIDE WITH NON-CIRCULAR CORE

RELATED APPLICATIONS

This application is a continuation-in-part application of U.S. patent application Ser. No. 017,882, filed on Feb. 20, 1987 now abandoned.

FIELD OF THE INVENTION

The present invention relates generally to optical waveguide devices and, more specifically, to devices which incorporate two-mode optical waveguides to control the propagation of optical energy in the two modes of the waveguides.

BACKGROUND OF THE INVENTION

An optical fiber is an optical waveguide having a central core surrounded by an outer cladding. The refractive indices of the core and cladding are selected so that optical energy propagating in the optical fiber is well-guided by the fiber.

As is well known in the art, a single optical fiber may provide one or more propagation paths under certain conditions. These propagation paths are commonly referred to as the normal modes of a fiber, which may be conceptualized as independent optical paths through the fiber. Normal modes have unique electric field distribution patterns which remain unchanged, except for amplitude, as the light propagates through the fiber. Additionally, each normal mode will propagate through the fiber at a unique propagation velocity.

The number of modes which may be supported by a particular optical fiber is determined by the wavelength of the light propagating therethrough. If the wavelength is greater that a "second order mode cutoff" wavelength (i.e., the frequency of the light is less than a cutoff frequency), the fiber will support only a single mode. If the wavelength is less than cutoff (i.e., the frequency is greater that the cutoff frequency), the fiber will begin to support higher order modes. For wavelengths less than but near cutoff, the fiber will support only the fundamental, of first order mode, and the next, or second order mode. As the wavelength is decreased, the fiber will support additional modes, for example, third order, fourth order, etc.

Each of the normal modes (e.g., first order, second order, etc.) are orthogonal, that is, ordinarily, there is no coupling between the light in these modes. The orientation of the electric field vectors of the modes defines the polarization of the light in the mode, for example, linear vertical or linear horizontal. A more complete discussion of these modes, and their corresponding electric field patterns, will be provided below.

A number of devices have been constructed to utilize the orthogonality of the modes of an optical fiber to provide selective coupling between the modes. For example, copending U.S. patent application Ser. No. 884,871, entitled "Fiber Optic Modal Coupler," assigned to the assignee of this invention, now U.S. Pat. No. 4,768,851, issued on Sept. 6, 1988, describes a device which couples optical energy from the first order mode to the second order mode, and vice versa. U.S. patent application Ser. No. 048,142, entitled "Fiber Optic Inter-Mode Coupling Single-Sideband Frequency Shifter," and assigned to the assignee of this invention, discloses frequency sifters which couple optical energy from one propagation mode to another propagation mode while shifting the frequency of the optical energy. U.S. patent application Ser. No. 820,411, entitled "Fiber Optic Mode Selector," assigned to the assignee of the present invention, discloses a device which separates optical energy propagating in one of the first order and second order propagation modes from other of the first order and second order propagation modes.

SUMMARY OF THE INVENTION

The present invention is an optical apparatus comprising a source of light and a waveguide having a core with a non-circular cross section. The source of light is arranged to introduce light signals having at least one wavelength into the waveguide for propagation therein, such that a substantial portion of the light is at one or more wavelengths less than a first predetermined cutoff wavelength of the waveguide to cause the waveguide to guide light in both a fundamental spatial propagation mode and a higher order spatial propagation mode. The waveguide is sized to provide a second predetermined cutoff wavelength for the signals, less than the first predetermined cutoff wavelength. The non-circular cross section of the core has cross-sectional dimensions selected such that light guided by the waveguide in the higher order mode at wavelengths greater than the second predetermined cutoff wavelength propagates in only a single, stable intensity pattern. Substantially all of the signals introduced into the waveguide by the source of light are at one or more wavelengths greater than the second predetermined cutoff wavelength to cause the light signals to propagate in only the single, spatial intensity pattern of the higher order mode.

The fundamental spatial mode includes two polarization modes, and preferably, the cross-sectional dimensions of the core are further selected to cause the polarization modes of the fundamental mode to be nondegenerate. The single intensity pattern of the higher order spatial mode also includes two polarization modes, and the cross-sectional dimension of the core are also preferably selected to cause these polarization modes to be nondegenerate. For many applications, the nondegeneracy between polarization modes of the fundamental mode and higher order mode preferably produces a beat length between polarization modes on the order of 10 cm, or less, for both sets of polarization modes.

In preferred embodiments of the invention, the waveguide comprises an optical fiber having a core with an elliptical cross section. The fundamental mode is the $LP_{01}$ mode of the optical fiber and the higher order mode is the $LP_{11}$ mode of the optical fiber. The single intensity pattern is the even mode intensity pattern of the $LP_{11}$ mode.

In one of the preferred embodiments, the invention includes a device for inducing a periodic stress in the optical fiber at intervals related to the beat length between the fundamental mode and the higher order mode such that light is cumulatively coupled between the fundamental and higher order modes at the intervals. Preferably, the device induces the stress by producing microbends in the fiber.

Frequency shifting is achieved in another embodiment of the invention by utilizing a generator to produce a traveling flexural wave which propagates in the fiber. The energy of the traveling flexural wave is confined to the optical fiber and has a wavelength in the direction of propagation selected in accordance with a beat length for two modes of the fiber to cause light to be cumulatively coupled from one of the modes to the other of the modes and shifted in frequency.

In a further embodiment of the invention, the waveguide comprises a first optical fiber, and the apparatus additionally comprises a second optical fiber which is dissimilar to the first fiber, and has at least one spatial propagation mode. Only two of the modes of the fibers have matching propagation velocities, one of the matching modes being in the first fiber, and other in the second fiber. The fibers are juxtaposed to form an interaction region in which light is transferred between their cores. The proximity of the fiber cores at the interaction region are selected such that light propagating in one of the matching modes in one of the fibers is coupled to the other of the fibers. The remainder of the modes all have mismatched propagation velocities such that the propagation velocity of each of the mismatched modes differ sufficiently from all the other modes to prevent substantial optical coupling between any of the mismatched modes. Preferably, the cores of each of the fibers have a cross section which is substantially the same inside the interaction region as outside the interaction region, and the length of the interaction region is at least an order of magnitude larger than the maximum cross-sectional core dimension of either of the fibers. This embodiment is highly advantageous for use as a mode selector.

The invention is also useful for interferometry. In an interferometer embodiment of the invention, a source of light is used to introduce light into the waveguide such that the light propagates in two spatial modes of the waveguide, and such that the light propagates through a sensing section of the waveguide for exposure to an ambient effect. The light output from the sensing section is detected. A photodetector is arranged to intercept only a selected portion of the spatial intensity pattern defined by a superposition of the spatial intensity patterns of the two modes. The selected portion of the spatial intensity pattern includes substantial portions of light from both of the two spatial modes such that the intensity pattern of the selected mode varies in response to the ambient effect. In accordance with another embodiment, another photodetector is arranged to intercept another portion of the spatial intensity pattern, and a comparing apparatus is used to compare the output of the two photodetectors to sense the ambient effect. In one particularly preferred embodiment, a splitting device is used to split the selected portion of the spatial intensity pattern into two light beams. A first polarizer is used to polarize one of the beams to produce a first light signal. The photodetector is positioned to receive this first light signal. A second polarizer is used to polarize the other of the beams to produce a second light signal, and a second photodetector receives this second light signal. The polarizers are oriented such that the first and second signals have orthogonal polarizations, and a comparing device is used to compare the outputs of the photodetectors. This embodiment includes a frequency shifter which couples light from one mode to the other, and frequency shifts the coupled light. The cross-sectional dimensions of the core are selected to cause the polarization modes for the fundamental mode and the polarization modes for the higher order mode to be nondegenerate.

The present invention also includes a polarization selector that can selectively provide an output signal having one of two polarizations by applying a strain to a portion of a two-mode optical fiber. In another aspect of the invention, a wavelength splitter splits an input optical signal having a pair of optical wavelengths into two output signals, each having one of the two wavelengths. In still another aspect of the invention, the differences in propagation characteristics of the two polarization orientations of each of two spatial propagation modes in a highly elliptical core optical fiber is utilized in a strain gauge that measures strain and temperature by detecting differences in the phase propagation delays in the modes.

The invention also includes a method of propagating light through an optical apparatus which comprises a source of light and a waveguide having a core with a non-circular cross section. The method includes selecting the wavelength of the light and the cross-sectional dimensions of the non-circular core such that (1) the waveguide propagates light in fundamental spatial propagation mode and a higher order spatial propagation mode and (2) substantially all of the light in the higher order mode propagates in only a single, stable intensity pattern.

BRIEF DESCRIPTION OF THE DRAWINGS

FIG. 9 is a pictorial representation of an optical fiber formed into a series of static microbends to form an inter-modal coupler.

FIG. 9a is a cross section of the optical fiber of FIG. 9 taken along the lines 9a—9a, showing the orientation of the elliptical core.

FIG. 10 is a perspective illustration of the present invention showing an optical fiber and a transducer mechanically connected to the optical fiber to induce a series of traveling microbends in the optical fiber.

FIG. 10a is a cross sectional view taken along the lines 10a—10a in FIG. 10 showing the attachment of the optical fiber to the transducer.

FIGS. 11a–11e are partial elevational views showing the operation of the transducer to generate the traveling microbends in the optical fiber.

FIG. 12 is a perspective illustration of a preferred embodiment of a transducer to generate the traveling microbends in the optical fiber.

FIG. 13 is a cross sectional view of a fiber optic mode selector using the highly elliptical core fiber of the present invention, showing a two-mode fiber and a single mode fiber juxtaposed in a directional coupler.

FIG. 14 is a perspective view of the coupler halves which comprise the present invention, and shows the facing surfaces formed on the fibers mounted in each coupler half.

FIG. 15 is a cross-sectional end View taken along the lines 15—15 in FIG. 13 showing the positional relationship between the cores and the claddings of the two fibers in FIG. 13.

FIG. 16a is a cross-sectional view of the single-mode optical fiber taken along the lines 16a—16a in FIG. 13.

FIG. 16b is a graphical representation of the electric field energy distribution of an optical signal propagating in the $LP_{01}$ mode of the single-mode optical fiber in FIG. 17a.

FIG. 17a is a cross-sectional view of the double mode fiber taken along the lines 17a—17a in FIG. 13.

FIG. 17b is a graphical representation of the electrical field energy distribution of the $LP_{01}$ propagation mode and the $LP_{11}$ propagation mode of an optical signal propagating in the two-mode fiber of FIG. 17a.

FIG. 18a shows the single-mode optical fiber and the two-mode optical fiber in juxtaposed relationship at their facing surfaces.

FIG. 18b graphically illustrates the interaction of the evanescent fields of the $LP_{11}$ propagation mode of the two-mode optical fiber with the $LP_{01}$ propagation mode of the single-mode optical fiber.

FIG. 19a is a graphical representation of the waveform of an optical signal propagating in the $LP_{01}$ mode of the single-mode optical fiber.

FIG. 19b is a graphical representation of the waveform of an optical signal propagating in the $LP_{01}$ mode of the two-mode optical fiber.

FIG. 19c is a graphical representation of the waveform of an optical signal propagating in the $LP_{11}$ mode of the two-mode optical fiber.

FIG. 20a pictorially illustrates mismatched phase propagation velocities of the single-mode and two-mode optical fibers when the core axes are parallel.

FIG. 20b pictorially illustrates the matching of phase propagation velocities by positioning one of the optical fibers at an angle with respect to the core axis of the other optical fiber.

FIG. 24a illustrates the field intensity patterns of the $LP_{01}$ modes and the $LP_{11}$ even modes for the optical fiber of FIG. 23.

FIG. 24b illustrates the field intensity patterns resulting from the superposition of the $LP_{01}$ and $LP_{11}$ modes of the optical fiber of FIG. 23 for three different phase delays between the modes, FIG. 25a illustrates an embodiment of an interferometer utilizing a single inter-modal coupler and having a separate detector for detecting the upper and lower field intensity patterns of the highly elliptical core optical fiber.

FIG. 25b is an alternative embodiment of the interferometer of FIG. 25a utilizing an offset splice in place of the inter-modal coupler.

FIG. 29b is an alternative embodiment of the interferometer of FIG. 29a in which a 50% coupler and an offset splice are used in place of the beam splitter and the inter-modal coupler in FIG. 29a.

FIG. 31 illustrates an embodiment of an exemplary polarization selector utilizing a highly elliptical core optical fiber having a strain portion that can be selectively strained to select between polarization outputs.

FIG. 33 illustrates an alternative embodiment of a polarization selector in which single-mode optical fibers are positioned proximate to the two lobes in the output intensity pattern to receive the light intensities in the two lobes.

FIG. 34 is a schematic cross-sectional view taken along the lines 34—34 in FIG. 33 illustrating the positional relationship between the cores of the two single-mode optical fibers with respect to the core of the two-mode optical fiber.

DETAILED DESCRIPTION OF THE PREFERRED EMBODIMENTS

The present invention utilizes an optical waveguide that operates at a wavelength below cutoff such that the waveguide supports both fundamental and second order guided modes. The fundamental and second order guided modes provide two orthogonal paths through the optical waveguide which permits the device to be used as a two-channel optical propagation medium. The embodiments of the present invention utilize an optical waveguide having the geometry of the core selected so that only one stable spatial orientation of the second order mode is supported in the waveguide.

Before discussing the specific embodiments of the present invention, a detailed description of the optical waveguide and a brief summary of the applicable mode theory will be presented to provide background for more fully understanding the invention.

Mode Theory

Although described below in connection with a silica glass optical fiber waveguide, one skilled in the art will understand that the concepts presented are also applicable to other optical waveguides, such as a $LiNbO_3$ optical fiber, integrated optics, or the like.

Figure 1:
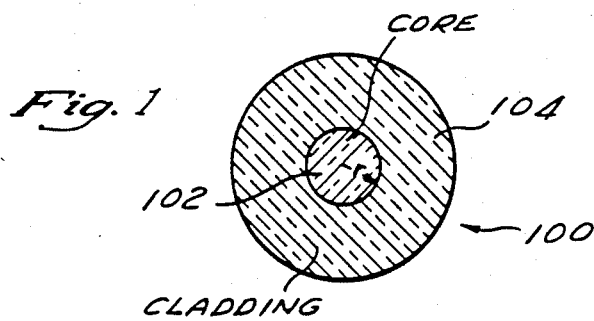
FIG. 1 is a cross-sectional view of an exemplary circular core optical fiber.

An exemplary cross-section of a silica glass optical fiber 100 is illustrated in FIG. 1. The fiber 100 comprises an inner core 102 and an outer cladding 104. The inner core 102 has a radius of r. In the exemplary fiber 100, the core has a refractive index $n_{co}$ and the cladding has a refractive index $n_{cl}$. As is well known in the art, the core refractive index $n_{co}$ is greater than the cladding index $n_{cl}$ so that an optical signal propagating in the optical fiber 100 is well-guided. The number of modes guided by the optical fiber 100 depends upon the fiber geometry and upon the wavelength of the optical signal propagating therethrough. Typically, the wavelength above which an optical fiber will propagate only the fundamental or first order mode is referred to as the "second order mode cutoff" wavelength $\lambda_c$, which may be calculated for a circular core fiber utilizing the following equation:

$$\lambda_c = \frac{2\pi r \sqrt{n_{co}^2 - n_{cl}^2}}{2.405} \tag{1}$$

If the wavelength of the optical signal is greater than the wavelength $\lambda_c$ (i.e., the frequency of the optical signal is less than a cutoff frequency), only the first order or fundamental propagation mode of the optical signal will be well-guided by the fiber and will be propagated by the fiber. If the wavelength of an optical signal is less than $\lambda_c$ (i.e., the frequency of the optical signal is greater than the cutoff frequency), higher order modes, such as the second order modes, will begin to propagate.

The true first and second order modes of a circular core optical fiber and their respective electric field amplitude distributions are illustrated in FIGS. 2a–2h. The two first order modes are the vertically polarized $HE_{11}$ mode represented by an electric field pattern 110 in FIG. 2a, and the horizontally polarized $HE_{11}$ mode, represented by an electric field pattern 112 in FIG. 2b. The outer circle in each figure represents the boundary of the core 102 of the fiber 100 of FIG. 1.

Figures 2A, 2B, 2C, 3A, 3B:
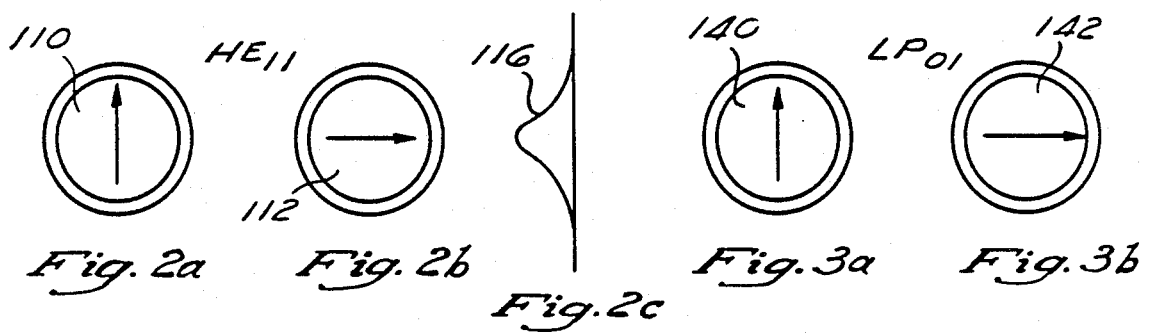
FIGS. 2a and 2b illustrate the electric field intensity distribution patterns for the vertically polarized and horizontally polarized $HE_{11}$ (fundamental) propagation modes of the circular core optical fiber of FIG. 1.
FIG. 2c is a graph of the electric field amplitude distribution corresponding to the intensity distribution patterns of FIG. 2a and 2b.
FIGS. 3a and 3b illustrate the $LP_{01}$ approximations for the first order propagation modes of the optical fiber of FIG. 1.

As illustrated in FIG. 2c, the $LP_{01}$ modes have an electric field amplitude distribution 116 that is substantially symmetrical around the center line of the core 102. The electric field amplitude distribution 116 is concentrated in the center of the core 102 and decreases as the distance from the center of the core 102 increases. A small portion of the electric field amplitude distribution 116 often extends beyond the boundaries of the core. This extended electric field is commonly referred to as the evanescent field of the guided modes.

The four true second order modes are illustrated in FIGS. 2d–2g. These four true modes are distinguished by the orientation of the transverse electric field, denoted by the directions of the arrows in FIGS. 2d–2g, and are commonly referred to as the $TE_{01}$ mode, represented by an electric field pattern 120 in FIG. 2d; the $TM_{01}$ mode, represented by an electric field pattern 122 in FIG. 2e; the $HE_{21}$ even mode, represented by an electric field pattern 124 in FIG. 2f; and the $HE_{21}$ odd mode, represented by an electric field pattern 126 in FIG. 2g.

Figures 2D, 2E, 3C, 3D:
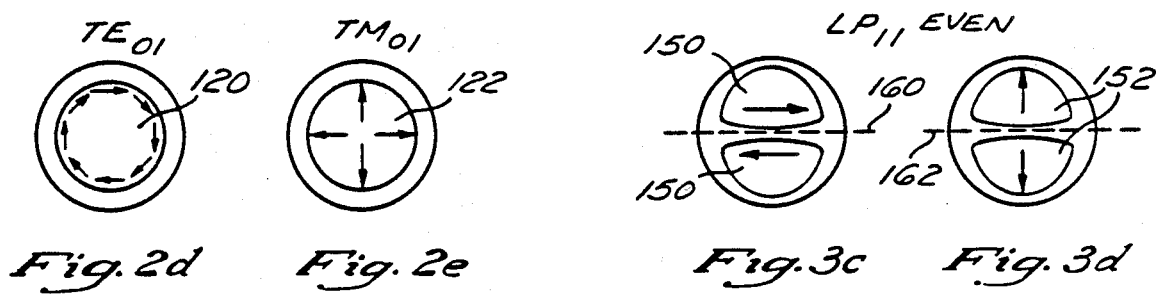
FIGS. 2d, 2e, 2f, and 2g illustrate the electric field intensity distribution patterns for the $TE_{01}$, $TM_{01}$, even $HE_{21}$ and odd $HE_{21}$ (second order) propagation modes, respectively, of the circular core optical fiber of FIG. 1.
FIGS. 3c, 3d, 3e and 3f illustrate the $LP_{11}$ approximations for the second order propagation modes of the optical fiber of FIG. 1.
Figures 2F, 2G, 2H, 3E, 3F:
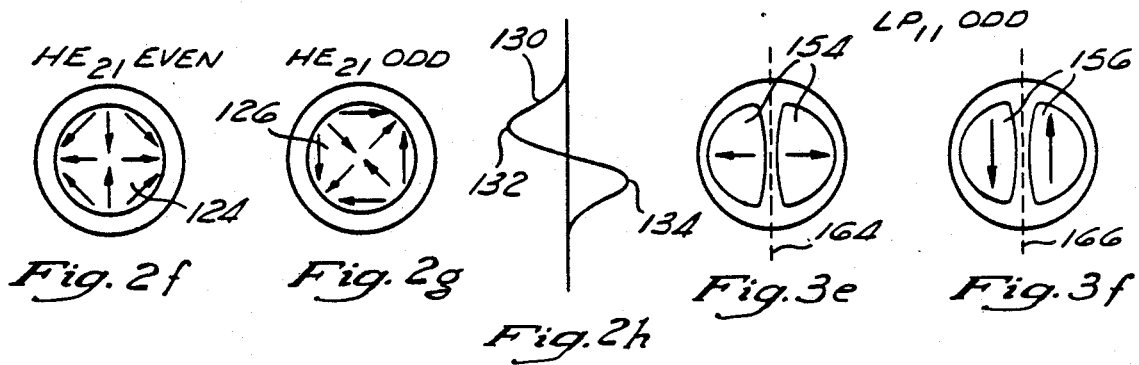
FIG. 2h is a graph of the electric field amplitude distribution patterns for the second order modes of the optical fiber of FIG. 1.

An electric field amplitude distribution 130 for an exemplary optical signal propagating in the second order modes is illustrated in FIG. 2h. As illustrated, the electric field amplitude distribution 130 is substantially equal to zero at the central line of the core, and has two maximum amplitudes 132 and 134 near the boundary of the core. As further illustrated, the two amplitude maxima 132 and 134 are 180° out of phase. Further, a greater portion of the electric field distribution extends beyond the boundary of the core in the second order modes, thus providing a larger evanescent field than for the $HE_{11}$ modes.

Each of the four true second order modes has a slightly different propagation velocity from the other of the four second order modes. Thus, when two or more of the true second order modes are co-propagating in a two-mode fiber, the intensity distribution of the second order mode varies as a function of the length of the fiber as a result of changes in the phase differences between the four modes as they propagate. The cross-sectional intensity distribution of the second order mode changes in response to environmental changes that induce differential phase shifts between the almost degenerate four modes.

In order to more easily analyze the characteristics of optical signals propagating in the second order propagation modes, the characteristics of the modes are analyzed using the LP approximations for the modes defined and described in detail in D. Gloge, "Weakly Guiding Fibers," *Applied Optics*, Vol. 10, No. 10, October 1971, pp. 2252–2258.

A better understanding of the mode theory of optical propagation in an optical fiber or other circular core waveguide can be obtained by referring to FIGS. 3a–3f, wherein the first and second modes are represented in accordance with the LP approximations described by Gloge in his paper. The outer circles in each of the illustrations again represent the cross section of the core 102 of the optical fiber 100 of FIG. 1. The outlines within the core circles represent the electric field distributions. Arrows with the inner outlines represent the direction of polarization.

FIGS. 3a–3b show the field patterns of the two polarization modes in the fundamental $LP_{01}$ set of modes. A field pattern 140 in FIG. 3a represents vertically polarized light in the $LP_{01}$ fundamental mode, and a field pattern 142 in FIG. 3b represents horizontally polarized light in the fundamental $LP_{01}$ mode.

FIGS. 3c–3f illustrate the $LP_{11}$ approximations for the second order modes. As illustrated in FIGS. 3c–3f, there are four $LP_{11}$ modes, each having two lobes for the electric field distribution. Two of the modes, represented by an $LP_{11}$ mode pattern 150 in FIG. 3c and an $LP_{11}$ mode pattern 152 in FIG. 3d, are referred to herein as the $LP_{11}$ even modes. The other two $LP_{11}$ modes, represented by an $LP_{11}$ mode pattern 154 in FIG. 3e and an $LP_{11}$ mode pattern 156 in FIG. 3f, are referred to as the $LP_{11}$ odd modes. The four $LP_{11}$ modes are distinguished by the orientation of the lobe patterns and the orientation of the electric field vectors (i.e., the polarization vectors) within the lobe patterns. For example, the first $LP_{11}$ even mode field pattern 150 (FIG. 3c) has two lobes that are symmetrically located about a horizontal zero electric field line 160. Within the two lobes, the electric field vectors are parallel to and anti-symmetric about the zero electric field line 160. For convenience, the $LP_{11}$ mode represented by the lobe pattern 150 will be referred to as the horizontally polarized $LP_{11}$ even mode.

The second $LP_{11}$ even lobe pattern 152 (FIG. 3d) is symmetrically located about a horizontal zero electric field line 142. Within the two lobes of the field pattern 152, the electric field vectors are perpendicular to and anti-symmetric about the zero electric field line 162. The $LP_{11}$ mode represented by the electric field pattern 152 will be referred to as the vertically polarized $LP_{11}$ even mode.

The first $LP_{11}$ odd mode field pattern 154 has two lobes that are symmetrically located about a vertically oriented zero electric field line 164. Within the two lobes, the electric field vector is perpendicular to and anti-symmetric about the zero electric field line 164, and are thus oriented horizontally. The $LP_{11}$ mode represented by the field pattern 154 will thus be referred to as the horizontally polarized $LP_{11}$ odd mode.

The electric field pattern 156 of the second $LP_{11}$ odd mode has two lobes that are symmetrically located about a vertically oriented zero electric field line 166. Within the two lobes, the electric field vectors are parallel to and anti-symmetric about the zero electric field line 166. Thus, the $LP_{11}$ mode represented by the electric field pattern 156 will be referred to as the vertically polarized $LP_{11}$ odd mode.

In the LP-mode approximations, each of the six electric field patterns in FIGS. 3a–3f, namely, the two $LP_{01}$ patterns and the four $LP_{11}$ patterns, are orthogonal to each other. In other words, in the absence of perturbations to the optical waveguide, there is substantially no coupling of optical energy from one of the field patterns to any of the other field patterns. Thus, the six electric field patterns may be viewed as independent optical paths through the optical waveguide, which ordinarily do not couple with each other.

If the indices of the core 102 and the cladding 104 of the optical fiber 100 are approximately equal, the two $LP_{01}$ modes will travel through the fiber at approximately the same propagation velocity, and the four second order $LP_{11}$ modes will travel through the fiber at approximately the same propagation velocity. However, the propagation velocity for the fundamental $LP_{01}$ set of modes will be slower than the propagation velocity for the second order $LP_{11}$ set of modes. Thus, the two sets of modes, $LP_{01}$ and $LP_{11}$, will move in and out of phase with each other as the light propagates through the fiber. The propagation distance required for the two sets of modes to move out of phase by 360° (i.e., $2\pi$ radians) is commonly referred to as the beat length of the fiber, which may be mathematically expressed as:

$$L_B = \frac{\lambda}{\Delta n} = \frac{2\pi}{\Delta \beta} \quad (2)$$

where $L_B$ is the beat length, $\lambda$ is the optical wavelength in a vacuum, $\Delta n$ is the difference in the effective refractive indices of the two sets of modes, and $\Delta \beta$ is the difference in the propagation constants for the two sets of modes.

It has been previously shown that coherent power transfer between the two sets of the modes, $LP_{01}$ and $LP_{11}$, can be achieved by producing periodic perturbations in the optical fiber that match the beat length of the two modes. A number of optical devices have been constructed to control the coupling of optical energy between the two modes to provide useful devices for selective coupling, filtering and frequency shifting of an optical signal. See, for example, W. V. Sorin, et al., "Highly selective evanescent modal filter for two-mode optical fibers," *OPTICS LETTERS*, Vol. 11, No. 9, September 1986, pp. 581-583; R. C. Youngquist, et al., "All-fiber components using periodic coupling," *IEEE Proceedings*, Vol. 132, Pt. J, No. 5, October 1985, pp. 277-286; R. C. Youngquist, et al., "Two-mode fiber modal coupler," *OPTICS LETTERS*, Vol. 9, No. 5, May 1984, pp. 177-179; J. N. Blake, et al., "Fiber-optic modal coupler using periodic microbending," *OPTICS LETTERS*, Vol. 11, No. 3, March 1986, pp. 177-179; B. Y. Kim, et al., "All-fiber acousto-optic frequency shifter," *OPTICS LETTERS*, Vol. 11, No. 6, June 1986, pp. 389-391; and J. N. Blake, et al., "All-fiber acousto-optic frequency shifter using two-mode fiber," *Proceedings of the SPIE*, Vol. 719, 1986. The present invention provides substantial improvement to many of those devices and provides a number of new devices that utilize coupling between the modes to further control an optical signal.

Although the four $LP_{11}$ modes provide four orthogonal channels for the propagation of optical energy through an optical fiber or other waveguide, it has often been found to be difficult to fully utilize the four channels independently. As set forth above, the $LP_{11}$ modes are approximations of real modes and are nearly degenerate in a circular core fiber 100. This makes the $LP_{11}$ modes very sensitive to couplings caused by perturbations in the optical fiber, such as bending, twisting and lateral stressing. Furthermore, since the $LP_{11}$ modes are only an approximation of the real modes, there will be a slight amount of coupling even in the absence of perturbations of the fiber 100. The net result is that the propagation of an $LP_{11}$ mode electric field pattern in a given mode is not stable. In like manner, the electric field patterns of the two $LP_{01}$ polarization modes are likewise unstable.

Figure 4:
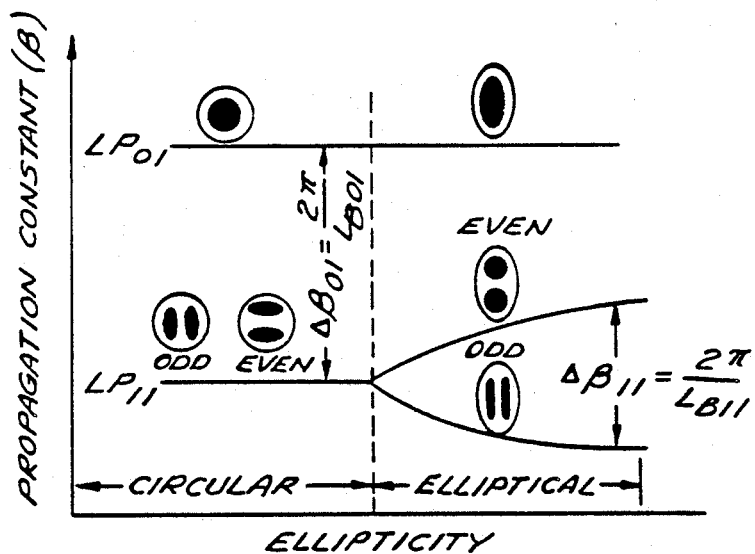
FIG. 4 is an unscaled graph of the propagation constant of an optical waveguide versus the ellipticity of the core of the optical waveguide.

It has been previously shown that the use of an elliptical core cross-section in an optical fiber or other waveguide can introduce birefringence and separate the propagation constants for the two polarizations of the $LP_{01}$ first order mode. The separation of the propagation constants locks the polarization of the signal to a principle axis of the core cross-section. It has also been shown that an elliptical core also increases the separation between the propagation constants of the $LP_{11}$ mode patterns. This tends to enhance modal stability. This is illustrated in FIG. 4 which is an unscaled representation of the propagation constant $\beta$ versus the ellipticity of the core of an optical waveguide. As illustrated, the $LP_{01}$ propagation mode has a larger propagation constant than the $LP_{11}$ propagation mode. From Equation (2), this difference in the propagation constants is related to the beat length $L_B$ between the $LP_{01}$ and $LP_{11}$ propagation modes as follows:

$$\Delta \beta_{01} = \frac{2\pi}{L_{B01}} \quad (3)$$

where $\beta \Delta_{01}$ is the difference in the propagation constants between the $LP_{01}$ mode and the $LP_{11}$ mode and $LB_{01}$ is the beat length between the $LP_{01}$ and $LP_{11}$ modes.

As illustrated in the left-hand portion of FIG. 4, when the core of the optical waveguide is substantially circular, the $LP_{11}$ odd and even modes have substantially the same propagation constant. However, when the core of the optical waveguide is elliptical, the propagation constants of the odd and even $LP_{11}$ modes are different. This is illustrated by the propagation constant difference $\Delta \beta_{11}$ in the right half of FIG. 4. As illustrated, the difference in the propagation constants of the odd and even $LP_{11}$ modes ($\Delta \beta_{11}$) increases as the ellipticity increases. The use of an elliptical core optical fiber has been suggested as a means of avoiding the degeneracy of the orthogonal lobe orientations of the $LP_{11}$ modes. See, for example, J. N. Blake, et al., "All-fiber acousto-optic frequency shifter using two-mode fiber," *Proceedings of the SPIE*, Vol. 719, 1986.

The foregoing differences in the propagation constants between the $LP_{01}$ mode and the odd and even $LP_{11}$ modes when the core of the optical fiber is elliptical, also results in a change in the cutoff wavelength and the corresponding cutoff frequency. For example, for a circular core optical fiber, the cutoff wavelength is related to the radius of the fiber core, as set forth in Equation (1) above. Thus, optical signals having wavelengths above the second order mode cutoff wavelength $\lambda_c$ (i.e., frequencies below the second order mode cutoff frequency) will not propagate in the second order or higher modes in the optical fiber. Optical signals having wavelengths less than the cutoff wavelength $\lambda_c$ will propagate in the second order modes. If the wavelength is further reduced to a wavelength $\lambda_{c2}$, third order and higher modes will be supported by the optical waveguide. For a circular core optical waveguide, $\lambda_{c2}$ can be found by the following equation:

$$\lambda_{c2} = \frac{2\pi r \sqrt{n_{co}^2 - n_{cl}^2}}{3.832} \quad (4)$$

where r, $n_{co}$ and $n_{cl}$ are as set forth above for Equation (1). One skilled in the art will understand that the foregoing can also be represented by cutoff frequencies. For example, the first cutoff wavelength $\lambda_c$ corresponds to a first cutoff frequency $f_c$, and the second cutoff wavelength $\lambda_{c2}$ corresponds to a second cutoff frequency $f_{c2}$ that is grater than the first cutoff frequency $f_c$.

Specifically, for the circular core optical waveguide, if the first cutoff frequency $f_c$ is normalized to 2.405, the second cutoff frequency $f_{c2}$ will be normalized to 3.832. In other words, the second cutoff frequency will be 1.59 times greater than the first cutoff frequency (e.g., $f_{c2}/f_c = 3.832/2.405 = 1.59$). Thus, an optical signal having a normalized frequency less than 2.405 will propagate in the optical waveguide only in the $LP_{01}$ mode. An optical signal having a normalized frequency in the rage of 2.405 to 3.832 will also propagate in the second order $LP_{11}$ mode. An optical signal having a normalized frequency greater than 3.832 will propagate in higher order modes.

The foregoing relationships also apply when the core of the optical waveguide is elliptical or has some other non-circular geometry. For example, Allan W. Snyder and Xue-Heng Zheng, in "Optical Fibers of Arbitrary Cross-Sections," *Journal of the Optical Society of America A*, Vol. 3, No. 5, May 1986, pp. 600-609, set forth the normalization factors for a number of different waveguide cross sections. For example, an elliptical core waveguide having a major axis that is twice the length of the minor axis, will have a normalized cutoff frequency $f_c$ of 1.889 when the minor axis has the same length as the diameter of a corresponding circular core optical fiber of the same material construction. In other words, below the normalized frequency of 1.889, only first order $LP_{01}$ modes will propagate. Similarly, Snyder and Zheng suggest that the $LP_{11}$ even mode will have a normalized cutoff frequency of 2.505, and the $LP_{11}$ odd mode will have a normalized cutoff frequency of 3.426.

Snyder and Zheng generalize the foregoing concept for an elliptical core optical waveguide with varying ratios between the length of the minor axis and the length of the major axis as follows:

$$f_c = 1.700(1+(b/a)^2)^{\frac{1}{2}} \quad (5a)$$

$$f_{c2even} = 1.916(1+3(b/a)^2)^{\frac{1}{2}} \quad (5b)$$

$$f_{c2odd} = 1.916(3+(b/a)^2)^{\frac{1}{2}} \quad (5c)$$

where $f_c$ is the normalized cutoff frequency for the $LP_{01}$ mode, below which optical energy will propagate only in the $LP_{01}$ mode in the elliptical core optical fiber; where $f_{c2even}$ is the normalized cutoff frequency for optical energy propagating the $LP_{11}$ even mode, below which optical energy will propagate only in the $LP_{11}$ even mode but not in the $LP_{11}$ odd mode; and where $f_{c2odd}$ is the normalized cutoff frequency for the $LP_{11}$ odd mode, below which optical energy will propagate in the $LP_{11}$ odd mode as well as the $LP_{11}$ even mode, but not in any of the higher order modes; b is one-half the length of the minor axis of the elliptical core; and a is one-half the length of the major axis of the elliptical core. Equations (5a), (5b) and (5c) can be evaluated for an elliptical core fiber having a major axis length 2a of twice the minor axis length 2b to obtain the normalized frequencies 1.889, 2.505 and 3.426, set forth above. Equations (5a), (5b) and (5c) can be further evaluated for b=a (i.e., for a circular core) to obtain the $LP_{01}$ cutoff frequency of 2.405 and the $LP_{11}$ cutoff frequency of 3.832 for both the odd and even modes, as set forth above.

The foregoing properties of the elliptical core optical waveguide are advantageously utilized in the present invention to improve the operating characteristics of the optical waveguide by eliminating the $LP_{11}$ odd propagation mode and thus provide only one spatial orientation for the electric field pattern of the second order mode. This is illustrated in FIGS. 5 and 6a–6g.

Figure 5:
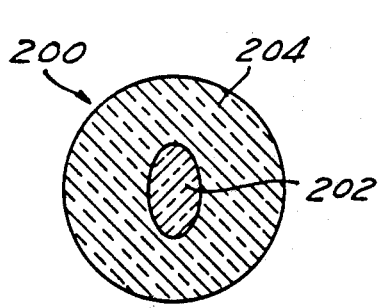
FIG. 5 is a cross-sectional view of an exemplary optical fiber of the present invention having a highly elliptical core.

FIG. 5 illustrates an exemplary optical fiber 200 having an elliptical core 202 and a surrounding cladding 204. The dimensions of the elliptical core 202 are selected so that the cutoff wavelengths and frequencies for the two orthogonal lobe patterns of the second order mode are well separated. An optical signal is applied to the fiber 200 that is within a frequency range selected to be above the cutoff frequency $f_{c2even}$ and to be below the cutoff frequency $f_{c2odd}$. For example, in an exemplary optical fiber, having a first cutoff frequency $f_c$ that is normalized to 1.889, and second frequency $f_{c2even}$ of 2.505, the frequency of the input optical signal is selected to have a normalized frequency in the range of 1.889 to 2.505. Thus, a light source is selected so that substantially all of the light produced by the light source has a normalized frequency that is substantially less than the second cutoff frequency $f_{c2even}$, and that has a substantial portion of the light that has a normalized frequency that is greater than the first cutoff frequency $f_c$. In terms of wavelength, substantially all of the light produced by the light source has one of more wavelengths that are greater than the second cutoff wavelength $\lambda_{c2even}$, and wherein a substantial portion of the light has at least one wavelength that is less than the first cutoff wavelength $\lambda_c$. Thus, the light entering the optical fiber is caused to propagate only in either the first order $LP_{01}$ mode or the $LP_{11}$ even mode. Since the frequency of the optical signal is selected to be less than the cutoff wavelength for the $LP_{11}$ odd mode, substantially no light propagates in the $LP_{11}$ odd mode.

Figures 6A, 6B, 6C:
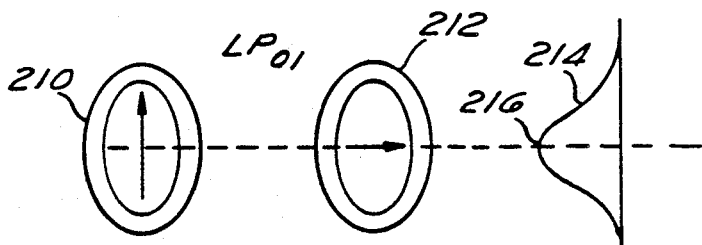
FIGS. 6a and 6b illustrate the electric field intensity patterns for the $LP_{01}$ (fundamental) propagation modes of the elliptical core optical fiber of FIG. 5.
FIG. 6c is a graph of the electric field amplitude distribution for the $LP_{01}$ propagation mode of the elliptical core optical fiber of FIG. 5.

The foregoing is illustrated in FIGS. 6a–6g. In FIGS. 6a and 6b, the two polarization modes for the $LP_{01}$ first order mode are illustrated. An electric field pattern 210 in FIG. 6a represents the electric field for the vertically polarized $LP_{01}$ mode, and an electric field pattern 212 in FIG. 6b represents the electric field for the horizontally polarized $LP_{01}$ mode. One skilled in the art will understand that the optical fiber 200 (FIG. 5) is birefringent for the first order $LP_{01}$ mode, and that the horizontally polarized $LP_{01}$ mode will propagate at a greater velocity than the vertically polarized $LP_{01}$ mode. An electric field amplitude distribution 214 for the $LP_{01}$ propagation modes is illustrated in FIG. 6c. As illustrated, the electric field amplitude distribution 214 is similar to the electric field amplitude distribution 116 in FIG. 2b, for a circular core fiber and has a peak amplitude 216 proximate to the center line of the core 203.

Figures 6D, 6E, 6F:
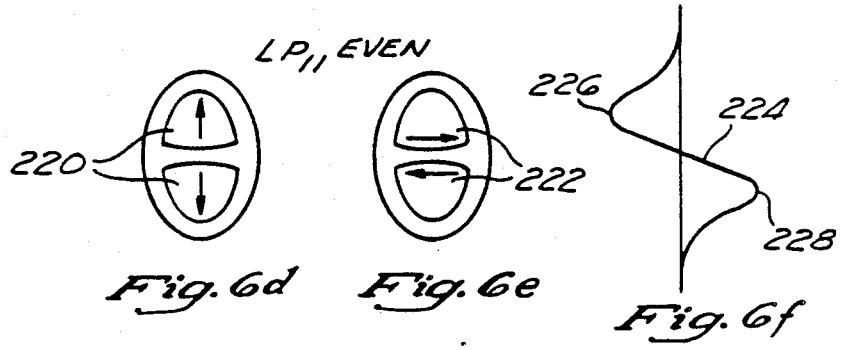
FIGS. 6d and 6e illustrate the electric field intensity patterns for the even $LP_{11}$ propagation modes of the elliptical core optical fiber of FIG. 5.
FIG. 6f is a graph of the electric field amplitude distribution for the even $LP_{11}$ propagation modes of the elliptical core optical fiber of FIG. 5.
Figures 6G, 6H:
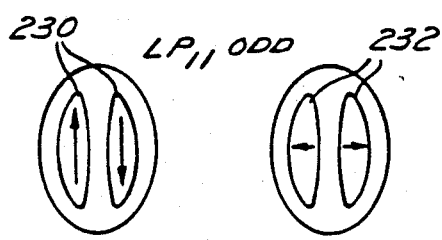
FIGS. 6g and 6h illustrate the electric field intensity patterns for the odd $LP_{11}$ propagation modes of the elliptical core optical fiber of FIG. 5.

FIGS. 6d and 6e illustrate the $LP_{11}$ even modes for the elliptical core fiber 200. As illustrated in FIG. 6d and FIG. 6e, respectively, a vertically polarized even mode electric field pattern 220 and a horizontally polarized even mode electric field pattern 222 are both well-guided by the optical fiber 200. As illustrated in FIG. 6f, the $LP_{11}$ even modes have an electric field amplitude distribution, represented by a curve 224, that has a first maxima 226 proximate to one boundary of the core, and that has a second maxima 228 proximate to an opposite boundary of the core, and wherein the first maxima 226 and the second maxima 228 are 180° out of phase.

The $LP_{11}$ odd vertical polarization mode, represented by an electric field pattern 230 (FIG. 6f), and the $LP_{11}$ odd horizontal polarization mode, represented by an electric field pattern 232 (FIG. 6g), are not guided by the optical fiber 200 when the optical wavelength is selected to be above the second cutoff wavelength $\lambda_{c2even}$. Thus, the optical energy in the $LP_{11}$ odd modes, represented by the field patterns 230 and 232, will not propagate. Thus, rather than providing four degenerate optical communication channels, such as provided by a circular core waveguide or a slightly elliptical core waveguide, the highly elliptical core 202 of the optical fiber 200 provides only two $LP_{01}$ mode propagation channels and two $LP_{11}$ even mode propagation channels. Furthermore, the communication channels are well-defined and stable and, in the absence of a perturbation in the optical fiber 200, there is no coupling between any of the four channels. Therefore, an optical signal can be launched in the second order $LP_{11}$ mode and it will propagate only in the $LP_{11}$ even mode. It is not necessary to avoid exciting the odd lobe patterns of the second order $LP_{11}$ mode because optical energy in those lobe patterns will not propagate. Futhermore, optical energy will not be coupled to the odd lobe patterns.

Because of the stability of the electric field intensity patterns of the $LP_{01}$ mode and the $LP_{11}$ even modes, the performances of fiber optic devices previously developed to utilize the second order $LP_{11}$ mode will be increased. Specific examples of devices utilizing the highly elliptical core waveguide will be set forth hereinafter.

Description of an Inter-Modal Coupler

Figure 7:
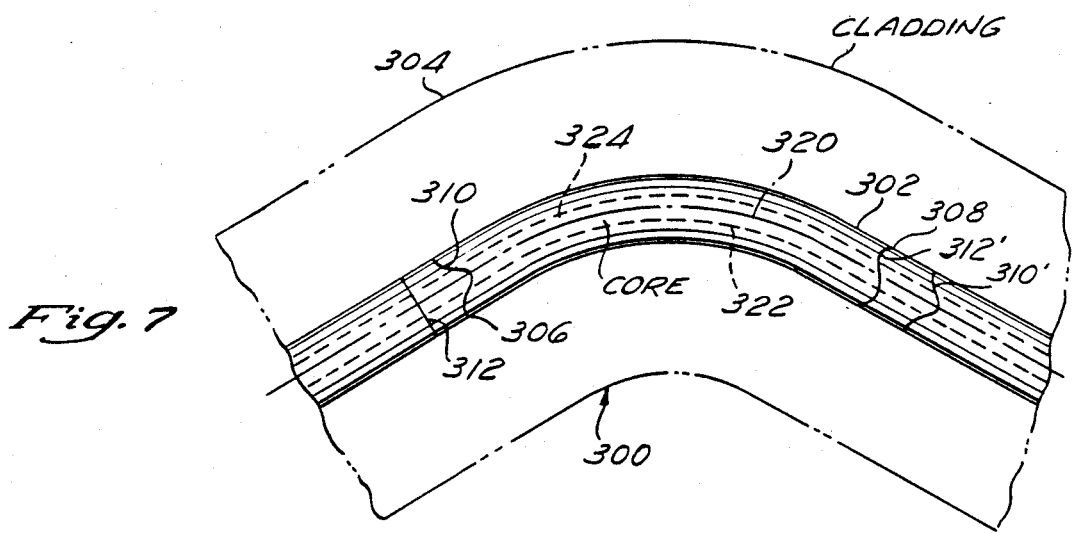
FIG. 7 is a partial cross sectional view of a bend in an optical fiber pictorially illustrating the coupling effect from the $LP_{01}$ optical mode to the $LP_{11}$ optical mode.

It has been found that if a fiber 300, having a core 302 and a cladding 304, is bent, as illustrated in cross section in FIG. 7, a portion of the optical energy entering the bent portion of the fiber in one mode (e.g., the first order $LP_{01}$ mode) is coupled to the orthogonal mode (e.g., the second order $LP_{11}$ mode) as the optical energy propagates through the bent portion of the fiber 300. One explanation for this effect is that the optical energy traveling through the core 302 of the fiber 300 on the inside of the bend has a shorter path than the light traveling on the outside of the bend. Referring to FIG. 7, location 306 designates the beginning of the bent portion of the fiber 300. Location 308 designates the end of the bent portion of the fiber 300. An electric field amplitude distribution curve 310 is superimposed upon the cross section of the fiber 300 at the location 306 and illustrates that the optical energy is in the $LP_{01}$ mode (i.e., the electric field amplitude distribution is symmetrical about the center of the fiber). The curve 312 generally corresponds to the curve 214 in FIG. 6c. A second optical amplitude curve 312 illustrates the amplitude of the optical energy in the $LP_{11}$ mode. In this example, it will be assumed that there is no light in the second order $LP_{11}$ mode at the location 306, and thus, the electric field distribution amplitude curve 312 is shown as having zero magnitude. Thus, all of the optical energy is concentrated in the $LP_{01}$ mode at the location 306 of the fiber 300.

In the straight portion of the optical fiber before the location 306, the $LP_{01}$ and $LP_{11}$ modes are orthogonal and no coupling occurs. As the optical signal travels from the location 306 to the location 308, a portion of the optical signal travels along the center of the core, illustrated in phantom lines by a path 320. A portion of the optical signal also travels along an inner path 322, illustrated in dashed lines, which has a shorter radius than the path 320 in the center of the fiber core and thus has a shorter path length. Additionally, a portion of the optical signal travels along a path 324, also illustrated by dashed lines, which has a larger radius than the path 320 and thus has a longer path length. Thus, an optical signal traveling along the path 322 or any other path having a radius smaller than the radius of the center of the core will travel a shorter distance from the location 306 to the location 308 than an optical signal traveling along the path 324 or any other path having a radius greater than the radius of the path 320. Because of the difference in the lengths of the paths from the location 306 to the location 308, the optical signal which was in phase across a cross-section of the fiber 300 at the location 306, is no longer in phase when it reaches the location 308. Thus, the amplitude distribution of the optical signal at the location 308 does not correspond to the symmetrical distribution shown in FIG. 6c. Therefore, the optical signal is no longer entirely orthogonal to the $LP_{11}$ mode, and a portion of the optical signal is coupled to the $LP_{11}$ mode. As illustrated in FIG. 7, at location 308 the amplitude of the signal in the $LP_{01}$ mode, depicted by a curve 310' has been reduced in amplitude. Furthermore, a curve 312', representing the optical amplitude in the $LP_{11}$ mode, no longer has a zero magnitude. Thus, a portion of the optical energy is transferred from the $LP_{01}$ mode to the $LP_{11}$ mode. The fraction of energy transferred from the $LP_{01}$ mode to the $LP_{11}$ mode depends upon the radius of the bend of the fiber core 302 and upon the length of the fiber core 302 which is so bent. The foregoing effect is reciprocal in that light energy input into the fiber such that it is initially traveling in the $LP_{11}$ mode is coupled to the $LP_{01}$ mode.

Figure 8:
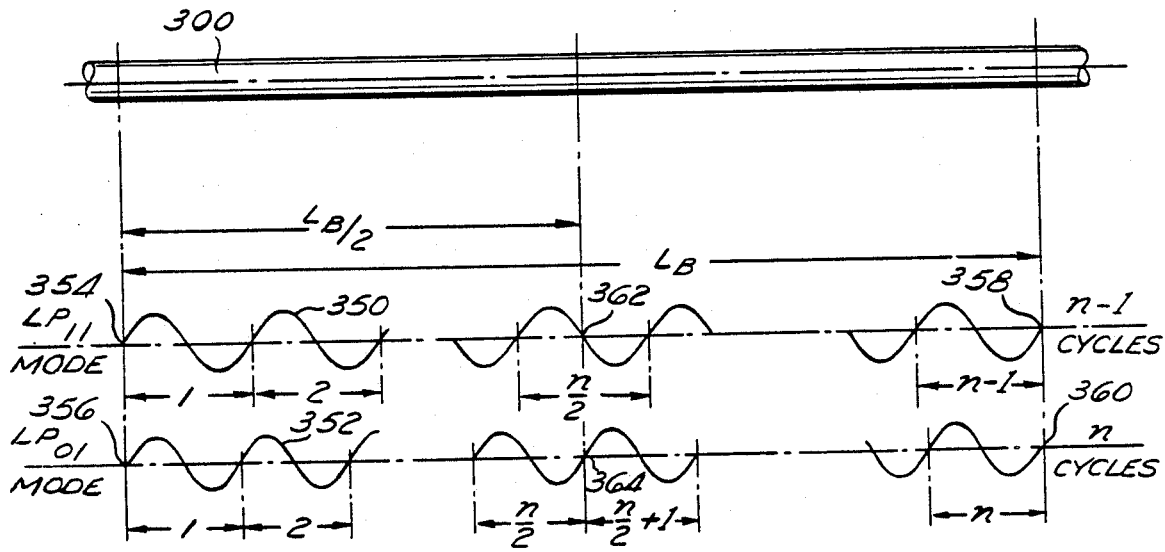
FIG. 8 is a pictorial illustration of the phase relationships between the optical signals traveling in the two propagation modes of the optical fiber of FIG. 7.

When an optical signal is traveling in the core 302 of the fiber 300 in two different propagation modes, light traveling in the first order $LP_{01}$ mode travels at a slower phase propagation velocity than light traveling in the second order $LP_{11}$ mode. Thus, if the light in the two modes is from the same source and has the same frequency, light traveling a distance $L_B$ in the first order $LP_{01}$ mode will take more time to travel the distance $L_B$ than the light traveling the same distance in the second order $LP_{11}$ mode. Thus, the phase of the light in the $LP_{01}$ mode will lag the phase of the light in the $LP_{11}$ mode through the distance $L_B$. This is pictorially illustrated in FIG. 8. The light traveling in the $LP_{11}$ mode is represented as a series of waves 350 and the light traveling in the $LP_{01}$ mode is represented as a series of waves 352. The length $L_B$ is selected such that if an optical wavefront traveling in the $LP_{01}$ mode completes exactly n cycles in traveling the distance L hd B, the light traveling in the $LP_{11}$ mode will complete exactly n-1 cycles. This is illustrated in FIG. 8. Thus, when the light in the $LP_{11}$ mode is exactly in phase with the light in the $LP_{01}$ mode at the beginning of the distance $L_B$, designated as the locations 354 and 356 on the curves 350 and 352, respectively, the light will also be in phase at the end of a distance $L_B$, illustrated as locations 358 and 360 on the curves 350 and 352, respectively. Similarly, when the light has traveled a distance of $L_B/2$, the light in the $LP_{11}$ mode is 180° ($\pi$ radians) out of phase with the light in the $LP_{01}$ mode, as illustrated by the locations 362 and 364 on the curves 350 and 352, respectively. The distance $L_B$ is referred to as the beat length of the fiber 300 for the two propagation modes at a selected frequency. The distance $L_B$ is calculated as set forth above in Equation (2) as:

$$L_B = \frac{2\pi}{\Delta\beta} \quad (2)$$

where $\Delta\beta$ is the difference in the propagation constants of the two modes along the fiber. As is well known, the propagation constant, $\beta$, is $2\pi$ times the number of cycles of a signal in a unit length, and is calculated as follows:

$$\beta = \frac{2\pi}{\lambda} \quad (6)$$

where $\lambda$ is the wavelength in the medium in which the signal is propagating. As set forth above, a signal propagating in the first order $LP_{01}$ mode propagates at a lower velocity and thus has more cycles per unit length than the second order or $LP_{11}$ mode. Thus, a given signal at a given frequency propagating in the first order $LP_{01}$ mode will have a higher propagation constant $\beta_{01}$ than a propagation constant $\beta_{11}$ of the same signal propagating at the same frequency in the second order $LP_{11}$ mode. Returning to Equation (2), above, the beat length $L_B$ is thus inversely proportional to the difference ($\Delta\beta = \beta_{01} - \beta_{11}$) in the propagation constants in the two modes. A greater difference $\Delta\beta$ in the propagation constant results in a smaller beat length, and vice versa. Typically, the difference in the propagation constants between the first order $LP_{01}$ propagation mode and the second order $LP_{11}$ propagation mode is greater than the differences in the propagation constants between two polarization modes of a signal in a birefringent fiber. Thus, the beat lengths of the two spatial propagation modes are shorter than the beat lengths of the two polarization modes.

It has been found that if an optical frequency, referred to as a center frequency, is selected to provide a minimum beat length for the first and second order propagation modes, the frequency of the optical signal can be varied substantially above and below the center frequency without causing a significant change in the difference between the propagation constants of the two modes. Thus, the beat length of the two propagation modes does not vary significantly at frequencies near the center frequency. Therefore, the beat length is relatively insensitive to changes in optical frequency over a relatively broad optical frequency range in comparison to the sensitivity of the beat length between two polarization modes of a birefringent fiber.

It has been discovered that when an optical fiber is formed into a series of periodic bends which are spaced by a beat length, then the coupling between the two spatial propagation modes of an optical signal traveling through the fiber will have a cumulative effect. As illustrated in FIG. 9, a length of a fiber 400 has a series of small bends 402, 404, 406, 408, 410, 412, 414, 416, 418 and 420, referred to as microbends, which are spaced apart such that the distance between corresponding bends (i.e., between bends in the same direction) is substantially equal to $L_B$, the beat length of an optical signal passing through the fiber 400. The effect of each section having a length of $L_B$ is cumulative with each other section having a length of $L_B$ to cause a cumulative coupling of optical energy from one mode to another mode in the fiber 400. This effect was demonstrated in theory in Henry F. Taylor, "Bending Effects in Optical Fibers," *Journal of Lightwave Technology*, Vol. LT-2, pp. 616-633 (1984). In that paper, the periodic microbends were introduced by statically positioning the fiber between opposing periodic structures. Thus, the coupling between the modes was a static coupling which did not effect any change in the frequency of the optical signal in the coupled mode.

The optical fiber 400 of FIG. 9 is preferably an optical fiber having a highly elliptical core 420 (see FIG. 9a) such as the optical fiber 200 that was described above in connection with FIGS. 5 and 6a-6h. The bends 402, 404, 406, etc. can be advantageously formed by bending the optical fiber 400 between two ridge structures 430 and 432. For example, the two ridge structures 430 and 432 can be formed by wrapping plural turns of copper wires 434, 436, or the like around respective supporting frames 440, 442. The center-to-center spacing of the turns of the copper wires 434, 436 determines the spacing of the bends and is preferably closely matched to the beat length $L_B$ of the optical fiber 400. As illustrated in FIG. 9, the small bends 402, 404, 406, etc. formed in the optical fiber 400 lie in a plane. The optical fiber 400 is positioned so that the elliptical core 422 has its major axis lying in the plane of the bends and oriented in the direction of the bends. Thus, referring to FIGS. 6d and 6e, the lobes of the $LP_{11}$ field pattern will propagate through the optical fiber 400 along the insides and outsides of the curves formed by the bends, thus maximizing the effects of the bends on the coupling of optical energy between the fundamental $LP_{01}$ and second order $LP_{11}$ modes.

The amount of coupling between the two modes is dependent upon a number of factors such as bend radius, fiber construction, the number of bends, and the lateral pressure applied to the fibers. Preferably, a combination of these factors are varied to achieve a desired percentage of coupling, such as 50% coupling.

Description of a Frequency Shifter Using the Present Invention

FIG. 10 illustrates an embodiment of the present invention in which a traveling periodic microbend is introduced into a multimode fiber to cause light to be coupled from one mode to another and to be shifted in frequency. The present invention comprises an optical fiber 500, having a highly elliptical core as illustrated in FIGS. 5 and 6a-6h. The optical fiber 500 has a first end portion 502 into which an optical signal, represented by an arrow 504, is introduced at a first angular frequency $\omega_0$ (i.e., $\omega_0 = 2\pi f_0$). The fiber 500 is secured to a transducer 510. In FIG. 10, the transducer 510 is preferably a shear transducer comprising PZT (lead-zirconium-titanate), lithium niobate (LiNbO$_3$) or another piezoelectric material. As shown in FIG. 10a, the fiber 500 may advantageously have a small portion of its outer cladding removed to form a flat surface 512 which rests on a top surface 514 of the transducer 510 to thereby provide additional mechanical contact between the transducer 510 and the fiber 500. The fiber 500 can be secured to the transducer 510 by epoxy 516 or other securing means.

The transducer 510 is driven by an electrical signal source 520 (shown schematically), which, in the preferred embodiment, is an a.c. source. When activated by the source 520, the transducer 510 operates in the shear mode as illustrated in FIGS. 11a-11e. The transducer 510 is shown in cross section in FIG. 11a with the fiber 500 mounted to the top surface 514 of the transducer 510. The transducer 510 has a first side 524 and a second side 526. At rest, the cross section of the transducer 510 is substantially rectangular. When the electrical signal 520 is applied to the transducer 510 with a first polarity, the transducer 510 operates in the shear mode causing the first side 524 and the second side 526 to be displaced in opposite directions indicated by the arrows 528 and 530, respectively, in FIG. 11b. This causes the fiber 500 to be displaced at an angle with respect to the rest position shown in FIG. 11a. When the a.c. electrical signal applied to the transducer 510 reaches a zero crossing, the first side 524 and second side 526 return to their rest positions as illustrated in FIG. 11c, thus returning the fiber 500 to its rest position. When the a.c. electrical signal is applied to the transducer 510 with the opposite polarity to the polarity applied in FIG. 11b, the first side 524 and the second side 526 are displaced in directions indicated by the arrows 532, 534 in FIG. 11d. This displacement is opposite to the displacement illustrated in FIG. 11b. Thus, the fiber 500 is displaced at an angle opposite the angle of displacement in FIG. 11b. When the a.c. electrical signal again reaches zero crossing, the first side 524 and the second side 526 again return to their rest positions and the fiber 500 thus returns to its rest position as illustrated in FIG. 11e. In the preferred embodiment, the a.c. electrical signal is applied to the transducer 510 so that the fiber 500 is periodically displaced to thereby induce a flexural wave in the fiber 500 which propagates as a series of traveling microbends along the length of the fiber 500 away from the transducer 510. The traveling microbends have a frequency that is determined by frequency of the a.c. source 520.

The optical fiber 500 is preferably oriented so that the major axis of the elliptical core is aligned with the movement of the transducer 510 and thus the major axis lies on the plane of the traveling microbends. As set forth above, this maximizes the coupling induced by the microbends.

The present invention preferably includes a first damper 536 formed of damping material which surrounds the fiber 500 at a location proximate to the side 524 of the transducer 510. Thus, any flexural wave which travels away from the transducer 510 in the direction towards the damper 536 is suppressed. Therefore, the flexural waves travel away from the transducer 510 in one direction only, as indicated by an arrow 540 in FIG. 10. The damper 536 can advantageously be supported by a first support block 542. Conventional optical fibers often have an outer plastic jacket that protects the cladding of the fiber. In the present invention, the plastic jacket is removed to expose the cladding that is to propagate the acoustic wave. It has been found that the damper 536 can be advantageously formed by leaving a portion of the plastic jacket on the fiber outside the interaction region of the fiber with the acoustic wave. The first support block 542 can also serve as a mounting block for the transducer 510 to hold the transducer 510 in a fixed relationship to the damper 536. The present invention also preferably includes a second damper 544, formed of damping material (such as the plastic jacket of the fiber) through which the fiber 500 passes, to thereby suppress any further propagation of the traveling microbends so that the microbends have no further effect beyond the second damper 544. The second damper 544 is preferably supported by a second support block 546. The second damper 544 is positioned so that only a selected length of the optical fiber 500 is affected by the traveling microbends, thus defining an interaction length of the optical fiber 500. In some applications, in which a long interaction length may be desired, the second damper 544 may not be necessary as the traveling microbend wave will be attenuated by the length of the fiber 500. The optical fiber 500 can be suspended in air, vacuum or another medium between the first support block 542 and the second support block 546. The medium can be any material which does not attenuate the traveling microbend waves and which does not conduct any of the energy away from the optical fiber 500. It is not necessary that the fiber 500 be taut between the first and second support blocks 542, 546, nor is it necessary that the fiber be straight so long as the fiber 500 is not bent with a radius sufficiently small so that the optical signal in the fiber 500 is perturbed by the bend.

The frequency of the electrical signal applied to the transducer 510 is chosen so that the flexural wave thus produced has a wavelength along the fiber which is substantially equal to the beat length $L_B$ as indicated in FIG. 10. Thus, as discussed above, the coupling of optical energy from one propagation mode to the other propagation mode will be reinforced in each section of the fiber. However, unlike the previously discussed static microbend device, the microbends in the fiber 500 propagate along the length of the fiber 500 at a velocity $v_p$. The propagation velocity $v_p$ is determined by the particular characteristics of the fiber 500. The frequency of the electrical signal applied to the transducer 510 (referred to hereinafter as $f_a$) is selected so that the wavelength (referred to hereinafter as $\lambda_a$) of the propagating microbend is substantially equal to the beat length $L_B$. Since the frequency $f_a$ is equal to the velocity $v_p$ divided by the wavelength $\lambda_a$, then the frequency $f_a$ is determined by:

$$f_a = \frac{v_p}{\lambda_a} = \frac{v_p}{L_B} \quad (7)$$

The angular frequency $\omega_a$ of the electrical signal is $\omega_a = 2\pi f_a$.

It has been shown that when a propagating acoustic wave causes a periodic, traveling stress on an optical fiber, the effect of the traveling acoustic wave is to cause light to be coupled from one polarization mode to another polarization mode and be shifted in frequency. See for example W. P. Risk, et al., "Single-Sideband Frequency Shifting in Birefringent Optical Fiber," *SPIE Vol. 478-Fiber Optic and Laser Sensors II* (1984), pp. 91–97, in which this effect is discussed with respect to coupling between polarization modes in a birefringent fiber. A similar effect has been described for multimode fibers for an externally applied stress to the fiber. See for example, copending U.S. application Ser. No. 556,636, "Single-mode Fiber Optic Single-sideband Modulator," filed Nov. 30, 1983, and assigned to the same assignee as the present application, now U.S. Pat. No. 4,684,215, issued on Aug. 8, 1987. Thus, an optical signal, illustrated as an arrow 550, exiting from a second end portion 552 of the fiber 500 exits at an angular frequency $\omega_S$, which is shifted in frequency from the angular frequency $\omega_0$ which was input at the first end portion 502 of the fiber 500. The frequency $\omega_S$ is equal to the angular frequency $\omega_0$ plus or minus the angular frequency $\omega_a$ of the signal applied to the transducer 510 (i.e., $\omega_S = \omega_0 \pm \omega_a$). Whether the frequency $\omega_a$ is added to or subtracted from the frequency $\omega_0$ is determined by whether the signal is input in the first order $LP_{01}$ mode or the second order $LP_{11}$ mode and whether or not the optical signal is propagating in the same direction as the propagating microbend. The embodiment of FIG. 10 is bidirectional in that the optical signal $\omega_0$ can be introduced into the second end portion 552 and thereby be caused to propagate towards the first end portion 502 in a direction opposite the direction of propagation of the traveling microbend.

As set forth in the above-referenced paper, "Single-Sideband Frequency Shifting in Birefringent Optical Fiber," by W. P. Risk, et al., when a traveling acoustic wave stresses an optical fiber having an optical signal propagating therein in the same direction as the traveling acoustic wave, the frequency of the traveling acoustic wave will be subtracted from the frequency of the optical signal if the optical signal is initially traveling in the slow optical mode (a first polarization mode in the Risk paper). On the other hand, if the optical signal is initially traveling in the fast optical mode (a second polarization mode in the Risk paper), the frequency of the acoustic wave is added to the original frequency $\omega_0$ of the optical signal. A similar effect occurs when the fiber is flexed by the traveling microbend having a frequency $\omega_a$ in the present invention. The light input in the slow $LP_{01}$ optical mode at the frequency $\omega_0$ is coupled from the slow $LP_{01}$ optical mode to the fast $LP_{11}$ optical mode and is downshifted in frequency by an amount $\omega_a$ to a frequency shown as $\omega_{11}$ (i.e., $\omega_{11} = \omega_0 - \omega_a$). On the other hand, light initially input at the frequency $\omega_0$ in the fast $LP_{11}$ optical mode is shifted upward in frequency by an amount $\omega_a$ to a frequency $\omega_{01}$ (i.e., $\omega_{01}=\omega_0+\omega_a$) in the $LP_{01}$ optical mode.

When the acoustic wave is traveling in the opposite direction of the light wave, the coupling from the fast $LP_{11}$ optical mode to the slow $LP_{01}$ optical mode causes a downshift in the frequency from the original frequency $\omega_0$ to a new frequency $\omega_{01}$ (i.e., $\omega_{01}=\omega_0-\omega_a$). This is the opposite effect from the frequency shift that occurs when the optical signal and the microbends are propagating in the same direction. Similarly, when the light initially travels in the slow $LP_{01}$ optical mode, the light is coupled to the fast $LP_{11}$ optical mode and shifted upward in frequency. The coupled light has a frequency $\omega_0$ (i.e., $\omega_{11}=\omega_0+\omega_a$).

The foregoing can also be considered in terms of the summation of the propagation constants of the two optical modes and the traveling microbends. For proper phase matching between the traveling microbends and the optical signal, the propagation constants must satisfy the following mathematical relationship:

$$\beta_{11}+\beta_a=\beta_{01} \qquad (8)$$

Thus, when the optical signal is initially traveling in the $LP_{11}$ mode, the propagation constant $\beta_a$ of the traveling microbends is added to the propagation constant $\beta_{11}$ of the optical signal in the $LP_{11}$ optical mode to obtain the propagation constant $\beta_{01}$ of the $LP_{01}$ optical mode as set forth in Equation (8) above. Similarly, when the optical signal is initially traveling in the $LP_{01}$ optical mode, the propagation constant $\beta_a$ of the traveling microbends is subtracted from the propagation constant $\beta_{01}$ of the $LP_{01}$ mode to obtain the propagation constant $\beta_{11}$ of the $LP_{11}$ optical mode as follows:

$$\beta_{01}-\beta_a=\beta_{11} \qquad (9)$$

The resulting frequency of the coupled optical signal depends upon whether the velocity of the traveling microbends is in the same direction as the direction of propagation of the optical signal, or in the opposite direction of the propagation of the optical signal.

The frequency shifting can be expressed mathematically by representing the light in the fast $LP_{11}$ optical mode as $\cos(\omega_0 t - \beta_{11} Z)$, where $\omega_0$ is the initial frequency of the input light, t is time, and Z is the distance in the direction of propagation 540 of the traveling microbends along the fiber 500. The traveling microbends may be represented as $\cos(\omega_a t - \beta_a Z)$, where $\omega_a$ is the frequency of the traveling microbends, $\beta_a$ is the propagation constant of the traveling microbends and Z is the distance along the axis of the fiber 500 in the direction of propagation of the microbends. The interaction of the optical signal with the traveling microbends leads to a product term proportional to the following expression:

$$\tfrac{1}{2}\{\cos[(\omega_0+\omega_a)t-(\beta_{11}+\beta_a)Z]+\cos[(\omega_0-\omega_a)t-(\beta_{11}-\beta_a)Z]\} \qquad (10)$$

The second term of Expression (10) does not satisfy the phase matching condition of either Equation (8) or Equation (9) above. The first term in the expression is phase matched in accordance with Equation (8). This match explicitly indicates that the optical signal in the $LP_{01}$ mode is upshifted in frequency to the frequency $\omega_{01}=\omega_0+\omega_a$. A similar analysis for interaction of an optical signal in the $LP_{01}$ mode leads to a product term proportional to the following expression:

$$\tfrac{1}{2}\{\cos[(\omega_0-\omega_a)t-(\beta_{01}-\beta_a)Z]+\cos[(\omega_0+\omega_a)t-(\beta_{01}+\beta_a)Z]\} \qquad (11)$$

The second term in Expression (11) is not phase matched in accordance with either Equation (8) or Equation (9) above. The first term does meet the phase matching requirements of Equation (9). This explicitly indicates that the $LP_{11}$ mode is downshifted in frequency to the frequency $\omega_{11}=\omega_0-\omega_a$.

If the optical signal propagates in the opposite direction as the traveling microbends, the traveling microbend can be represented as $\cos(\omega_a t+\beta_a Z)$. The interaction of an optical signal in the $LP_{11}$ mode with the traveling microbend leads to a product term proportional to the following expression:

$$\tfrac{1}{2}\{\cos[(\omega_0+\omega_a)t-(\beta_{11}-\beta_a)Z]+\cos[(\omega_0-\omega_a)t-(\beta_{11}+\beta_a)Z]\} \qquad (12)$$

The first term in Expression (12) does not provide proper phase matching in accordance with either Equation (8) or Equation (9). The second term does provide proper phase matching in accordance with Equation (8). Thus, when the optical signal propagates in the opposite direction to the traveling microbends, the light coupled to the $LP_{01}$ mode is downshifted in frequency from the light input in the $LP_{11}$ mode to a frequency $\omega_{01}=\omega_0-\omega_a$ instead of being upshifted as discussed above with regard to Expression (10) for light propagating in the same direction. When the optical signal is initially in the $LP_{01}$ mode and propagates in the opposite direction as the traveling microbends, the interaction of the optical signal and the microbends leads to a product term proportional to the following expression:

$$\tfrac{1}{2}\{\cos[(\omega_0-\omega_a)t-(\beta_{01}+\beta_a)Z]+\cos[(\omega_0+\omega_a)t-(\beta_{01}-\beta_a)Z]\} \qquad (13)$$

The first term in Expression (13) is not properly phase matched in accordance with either Equation (8) or Equation (9). The second term is properly phase matched in accordance with Equation (9). Thus, the optical energy coupled from the $LP_{01}$ mode to the $LP_{11}$ mode is shifted upward in frequency to a frequency $\omega_{11}=\omega_0+\omega_a$.

The present invention has many advantages. For example, the present invention uses a highly elliptical core two-mode fiber, and is operated at a frequency wherein the $LP_{11}$ odd mode is cut off. Thus, optical energy in the $LP_{11}$ mode will propagate only in the $LP_{11}$ even mode. Thus, the present invention does not require precise alignment of the major axis of the elliptical core with the input light source.

The present invention is particularly advantageous in that it operates over a broad range of optical frequencies for the input optical signal. This advantage results from the use of the spatial propagation modes for coupling. As set forth above, the beat length of the two spatial propagation modes (e.g., the $LP_{01}$ and $LP_{11}$ modes) does not vary significantly over a broad optical frequency range. Thus, the beat length will match the wavelength of the traveling microbend wave even when the optical frequency of the input optical signal (i.e., $f_0=\omega_0/2\pi$) is varied over a broad frequency range about the selected center frequency where the optical beat length and the wavelength of the traveling microbends match exactly. In order to take full advantage of the characteristics of the highly elliptical core optical fiber 500, the center frequency $f_0$ is preferably selected to be in the central portion of the frequency range between the first cutoff frequency $f_c$ and the second cutoff frequency $f_{c2}$, and the frequency shifter is operated well within the range of frequencies between $f_c$ and $f_{c2}$.

The frequency of the a.c. signal modulation applied to the transducer 510 (FIG. 10) can also be varied over a relatively broad range in the present invention. The broad range of modulation frequencies results from two features of the present invention. The first feature of the present invention that provides for operation over a broad modulation frequency range is that it couples optical energy between the spatial propagation modes. The beat length of the two spatial propagation modes is substantially smaller than the beat length between the polarization modes of an optical signal at the same frequency. Thus, the present invention operates at a higher absolute modulation frequency than an exemplary device which couples optical energy between polarization modes. The present invention operates with optical beat lengths of approximately 50 μm to 500 μm and thus can operate with a microbend frequency of approximately 3 MHz to 50 MHz.

The second feature of the present invention that provides for operation over a broad modulation frequency range is that the modulation energy from the transducer 510 (FIG. 10) is coupled directly into the fiber 500 to induce the traveling, periodic microbend wave. The present invention does not require a substrate or other medium external to the fiber 500 to conduct the modulation energy to the fiber 500. Thus, a relatively large percentage of the modulation energy acts upon the fiber 500 to create the traveling microbend wave. Therefore, for a given modulation energy input, it is believed that a larger percentage of the optical energy is transferred from one spatial propagation mode to the other spatial propagation mode in each beat length. Thus, relatively fewer beat lengths of interaction between the optical signal and the traveling microbend wave are required to couple substantially all of the optical energy from one spatial propagation mode to the other spatial propagation mode. It has been shown that coupling between the spatial propagation modes will occur even when there is a small percentage of deviation from the modulation wavelength which corresponds exactly with the beat length of the two spatial propagation modes so long as the deviation is not allowed to accumulate to a large total percentage of deviation over a large number of beat lengths. Thus, since relatively few beat lengths are required in the present invention to couple the optical energy from one spatial propagation mode to the other spatial propagation mode, the acceptable percentage of deviation in one beat length can be relatively large (relative to a device requiring a large number of beat lengths). The relatively large percentage of acceptable deviation in wavelength combined with the relatively large absolute modulation frequency results in a relatively broad range for the modulation frequency.

The present invention is particularly advantageous in that the energy required to cause the coupling between the modes is concentrated entirely within the fiber 500. Substantially all of the energy applied to the transducer 510 is transferred to the optical fiber 500 to produce the periodic microbends. Thus, very little, if any, energy is wasted in the present invention. Thus, the mechanical energy generated by the transducer 510 is utilized very efficiently.

FIG. 12 illustrates a preferred embodiment of the frequency shifter of the present invention in which the transducer 510 of FIG. 10 is replaced with a transducer 700 particularly adapted t generate the periodic microbends described above. The transducer 700, in the preferred embodiment comprises a rod of fused quartz having a substantially circular cross section throughout its length. A first end 702 of the transducer 700 has a diameter substantially equal to the diameter of the fiber 500. For example, in one embodiment of the present invention, the diameter of the fiber 502 and of the first end 702 of the transducer 700 is approximately equal to 100 μm. Preferably, the transducer 700 and the optical fiber 500 are fused together at a location 704 to provide good acoustic contact between the fiber 500 and the second end 702 of the transducer 700.

The transducer 700 has a second end 710 which has a diameter which is substantially larger than the diameter of the first end 702. For example, the second end 710 can have a diameter of approximately two millimeters. In the preferred embodiment, the transducer 700 is formed from a hollow tube of fused quartz having an initial diameter of two millimeters or larger and by drawing the quartz tube into a form which gradually tapers from the second end 710 to the smaller first end 702. Thus, the transducer 700 is hollow at the second end 710 and is substantially closed off (i.e., solid) at the first end 702. Further details of the construction of the preferred embodiment of the transducer 700 are set forth in copending U.S. patent application Ser. No. 048,142, entitled "FIBER OPTIC INTER-MODE COUPLING SINGLE-SIDEBAND FREQUENCY SHIFTER," filed on May 11, 1987, a continuation of U.S. patent application Ser. No. 909,503, filed on Sept. 19, 1986, now abandoned, and assigned to the assignee of the present application. The details of the copending application are incorporated herein by reference.

A piezoelectric material 712, such as PZT, is bonded to the second end 710 of the transducer 700 in a manner well-known to the art. When an electrical signal, represented schematically as a signal generator 714, is applied to the piezoelectric material 712, the piezoelectric material 712 expands and contracts in the directions indicated by the double-headed arrow 716 and generates a series of acoustic wavefronts which propagate through the transducer 700 from the second end 710 to the first end 702, as indicated by an arrow 718. At the first end 702, the acoustic energy in the transducer 700 is coupled directly to the optical fiber 500 at the location 704 to cause up and down movement of the fiber 500, thus inducing a vibration in the fiber 500 which propagates away from the location 704 as a traveling flexural wave or traveling microbend as described above with respect to FIG. 10. The surface of the quartz transducer 700 acts as an acoustic funnel which concentrates the acoustic energy developed at the second end 710. Furthermore, substantially all of the acoustic energy applied to the second end 710 is conducted to the first end 702 and is used to induce the traveling microbend in the fiber 700.

As in FIG. 10, the embodiment of FIG. 12 further includes the first damper 536, proximate to the location 704, to limit the travel of the microbend in the fiber 502 to one direction, indicated by an arrow 720, away from the damper 536. The embodiment of FIG. 12 also preferably includes the second damper 544 to suppress propagation of the microbends beyond a selected length of the fiber 500 as discussed above.

Detailed Description of the Mode Selector

As shown in FIGS. 13-20b, an inter-mode selector comprises a first optical fiber 1100 and a second fiber 1110. The first optical fiber 1100 has an inner core 1102 and an outer cladding 1104. The second optical fiber 1110 has a highly elliptical inner core 1112 and a outer cladding 1114. The core 1102 of the first optical fiber 1100 has a core refractive index $n_{core1}$, and the cladding 1104 has a cladding refractive index $n_{cladding1}$. The core refractive index and the cladding refractive index of the first fiber 1100 are chosen such that the core refractive index is greater than the cladding refractive index (i.e., $n_{core1} > n_{cladding1}$. Therefore, light propagating in the core 1102 will propagate at a slower phase velocity than light propagating in the cladding 1104. In like manner, the core 1112 of the second optical fiber 1110 has a core refractive index $n_{core2}$ and the cladding has a cladding refractive index cladding $n_{cladding2}$ which are selected so that the core refractive index is greater than the cladding refractive index (i.e., $n_{core2} > n_{cladding2}$). In the preferred embodiment, the core refractive index, the cladding refractive index, and the diameter of the core of the first optical fiber 1100 are selected so that the first optical fiber 1100 is a single-mode optical fiber at a selected optical frequency $f_0$. The core refractive index, the cladding refractive index, and the diameter of the core of the second optical fiber 1110 are selected so that the second optical fiber 1110 is a multimode (i.e., a two-mode) optical fiber at the same selected optical frequency $f_0$. Thus, the first optical fiber 1100 will propagate only light in the first order $LP_{01}$ mode at the selected optical frequency. The second optical fiber 1110 will propagate light in the first order $LP_{01}$ mode and will also propagate light in a higher order mode, namely, the second order $LP_{11}$ propagation mode. As illustrated in FIGS. 15, 17a, and 18a, the core 1112 of the second optical fiber 1110 preferably is highly elliptical in accordance with FIG. 5, and FIGS. 6a-6h, above. The ellipticity of the core 1112 is selected so that, at the frequency $f_0$ only the even lobe patterns of the $LP_{11}$ propagation mode will propagate in the optical fiber 1110. The wavelength of the optical signal at $f_0$ is above the cutoff wavelength for the $LP_{11}$ odd modes so that the $LP_{11}$ odd modes do not propagate.

The first optical fiber 1100 is arcuately mounted in a first mounting block 1120. The second optical fiber is arcuately mounted in a second mounting block 1130. In the preferred embodiment, the first and second mounting blocks 1120, 1130 are constructed in accordance with the teachings of U.S. Pat. No. 4,536,058, which is incorporated herein by reference. The first mounting block 1120 has a flat mounting surface 1140 into which an arcuate slot 1142 is cut to provide a guide for the first optical fiber 1100. As described in U.S. Pat. No. 4,536,058, the slot 1142 has a depth with respect to the mounting surface 1140 at each of two ends of the first mounting block 1120 that is greater than the depth at the middle of the mounting surface 1140 so that when the first optical fiber 1100 is positioned in the slot 1142, a portion of the cladding 1104 on one side of the first optical fiber 1100 is proximate to the mounting surface 1140. The mounting surface 1140 is polished so that the cladding 1104 of the first optical fiber 1100 is gradually removed with the surface 1140 to form a facing surface 1144 on the cladding 1104 which has a general oval shape that is coplanar with the surface 1140, as illustrated in FIG. 14. The polishing is continued until a sufficient amount of the cladding 1104 is removed so that the facing surface 1144 is within a few microns of the core 1102 of the first optical fiber 1100. In like manner, an arcuate slot 1152 is formed in a mounting surface 1150 of the second mounting block 1130 and the second optical fiber 1110 is positioned in the slot 1152. The mounting surface 1150 and the cladding 1114 of the second fiber 1110 are polished in the above-described manner to form a facing surface 1154.

As illustrated in FIG. 15, the facing surface 1144 of the first optical fiber 1100 is positioned in juxtaposed relationship with the facing surface 1154 of the second optical fiber 1110 to form an interaction region 1156 (labelled in FIG. 14) for transferring light between the fibers. The core 1102 of the first optical fiber 1100 and the core 1112 of the second optical fiber 1110 are spaced apart by the thin layer of the cladding 1104 remaining between the facing surface 1144 and the core 1102, and the thin layer of the cladding remaining between the facing surface 1154 and the core 1112. The removal of the cladding is preferably performed in accordance with the method described in U.S. Pat. No. 4,536,058. The oil drop test described in U.S. Pat. No. 4,536,058 is advantageously used to determine the amount of cladding removed and the proximity of the facing surfaces 1114, 1154 to the cores 1102, 1112, respectively. As discussed hereinafter, cladding is removed from the first fiber 1100 and the second fiber 1110 until the evanescent field penetration of the facing surfaces 1144, 1154 for the selected guided modes of the fibers is sufficient to cause coupling of light between the two guided modes.

As further illustrated in FIG. 16, the two-mode optical fiber 1110 is preferably oriented so that the major axis of the elliptical core 1112 is normal to the facing surface 1154.

When the facing surface 1144 and the facing surface 1154 are superimposed, as illustrated in FIG. 13, the first fiber 1100 and the second fiber 1110 converge near the center of the mounting blocks 1120 and 1130 and diverge gradually as the distance away from the center of the blocks 1120 and 1130 increases. The rate of convergence and divergence of the two fibers is determined by the radius of curvature of the two arcuate grooves, which, in one preferred embodiment, is selected to be 25 centimeters. This radius of curvature permits the cores of the two fibers to be positioned in close proximity to permit the evanescent fields to interact while limiting the length of the interaction region 1156. As explained in detail by Digonnet, et al., in "Analysis of Tunable Single Mode Optical Fiber Coupler," *IEEE Journal of Quantum Electronics*, Vol. QE-18, No. 4, April 1982, pp. 746-754, and in U.S. Pat. No. 4,556,279, the teachings of which are incorporated herein by reference, the length of an interaction region of two juxtaposed fibers is defined principally by the radii of curvature of the fibers, while the strength of coupling is defined principally by the proximity of the cores in the interaction region, particularly the minimum core spacing (i.e., the distance between the cores at the centers of the facing surfaces 1144 and 1154). The length of the interaction region is preferably at least an order of magnitude larger than the maximum cross-sectional dimension of the core of either of the fibers so that there is a substantial amount of light transferred, and preferably a complete transfer of light between the two fibers. The interaction region length increases with increasing radii of curvature and the strength of coupling increases with decreasing core spacing. The radii of curvature are preferably selected to be sufficiently large so that little, if any bending effect is introduced into the fibers. Further, the core spacing is preferably no less than zero so that the diameters of the cores 1102, 1112 are uniform throughout the length of the apparatus of the invention, and thus, no modal perturbations are introduced by changes in the characteristics of the fiber.

The operation of the present invention can be more fully understood by referring to FIGS. 16a-b, 17a-b, 18a-b, 19a-c and 20a-b. FIGS. 16a and 16b illustrate the electric field intensity distribution for the $LP_{01}$ propagation mode of an optical signal propagating in the single-mode optical fiber 1100. As illustrated in FIG. 16b, the field intensity distribution is defined by an electric field intensity distribution graph 1200 which has a maximum 1202 substantially in the center of the core 1102. The intensity decreases as the distance from the center of the core 1102 increases. Most of the electric field energy of the $LP_{01}$ propagation mode is concentrated in the core 1102 of the fiber 1100. However, a portion of the electric field energy extends into the cladding 1104, as illustrated by a field portion 1204 and a field portion 1206 of the graph 1200. The portion of the electric field energy outside the core 1102 is referred to as the evanescent field. The interaction of the evanescent fields of two guided modes within the interaction region 1156 provides the means for coupling optical energy between the two fibers 1100, 1110, as described in U.S. Pat. No. 4,536,058. The amount of coupling is determined principally by the length of the interaction region and the distance between the respective cores of the two fibers.

FIGS. 17a and 17b illustrate the electric field intensity distribution for light propagating in the $LP_{01}$ and $LP_{11}$ modes of the two-mode fiber 1110 at the selected frequency. The electric field intensity distribution of the $LP_{01}$ propagation mode is illustrated by a graph 1220, and the electric field distribution of the $LP_{11}$ propagation mode is illustrated by graph 1222. As discussed above with regard to the graph 1200 in FIG. 16b, the electric field of an optical signal propagating in the $LP_{01}$ propagation mode is concentrated in the core 1112 near the center of the fiber 1110, as illustrated by a maximum 1224, and the intensity diminishes as the distance from the center of the core 1112 increases. A portion of the electric field intensity distribution of the $LP_{01}$ propagation mode extends into the cladding 1114 as an evanescent field, designated as portions 1226 and 1228.

The electric field intensity distribution graph 1222 for the light propagating in the $LP_{11}$ propagation mode has a minimum intensity 1230 near the center of the core 1112 and the intensity increases gradually as the distance from the core 1112 increases. The maximum electric field intensity occurs at maxima 1232 and 1234 which are proximate to the interface between the core 1112 and the cladding of the optical fiber 1110. Note that the intensity distribution is proportional to the square of the amplitude distribution so that the polarity of both maxima are the same. Thus, the evanescent field of an optical signal propagating in the $LP_{11}$ propagation mode, represented by electric field energy distribution portions 1236 and 1238, extends further into the cladding than the evanescent field of the portion of an optical signal propagating in the $LP_{01}$ mode of the second optical fiber 1110.

As illustrated in FIG. 17b, the optical signal propagating in the $LP_{01}$ propagation mode of the second optical fiber 1110 has very little evanescent field extending beyond the core 1112 of the fiber 1110 (see the portions 1226 and 1227 of the graph 1220). In contrast, the evanescent field of an optical signal propagating in the $LP_{11}$ propagation mode extends well into the cladding 1114 of the second optical fiber 1110 (see the portions 1236 and 1238 of the graph 1222). Thus, when a portion of the cladding is removed from each of the two optical fibers so that the cores 1112 and 1102 can be closely juxtaposed, there is a relatively large evanescent field intensity for the $LP_{11}$ propagation mode available to interact with the core 1102 of the first optical fiber 1100. This is illustrated in FIGS. 18a and 18b, wherein the electric field intensity distribution graphs 1220 and 1222 of the second optical fiber 1110 are shown in relation to the electric field intensity distribution graph 1200 of the first optical fiber 1100 when the two fibers are juxtaposed at their respective facing surfaces 1154 and 1144. As illustrated, there is substantially no overlap of the $LP_{01}$ electric field intensity distribution 1220 of the second optical fiber 1110 with the $LP_{01}$ electric field intensity distribution 1200 for of the first optical fiber 1100. However, there is relatively large overlap of the evanescent field portion 1238 of the $LP_{11}$ electric field intensity distribution 1222 of the second optical fiber 1110 with the evanescent field portion 1204 of the $LP_{01}$ electric field intensity distribution 1200 of the first optical fiber 1100. Thus, the $LP_{11}$ propagation mode of the second optical fiber 1110 and the $LP_{01}$ propagation mode of the first optical fiber 1110 interact strongly as compared to the interaction between the $LP_{01}$ modes of the two fibers. Due to the strong interaction between the $LP_{11}$ mode of the two-mode fiber 1110 and the $LP_{01}$ mode of the single-mode fiber 1100, a relatively large amount of optical energy is coupled between the $LP_{11}$ propagation mode of the fiber 1110 and the $LP_{01}$ propagation mode of the fiber 1100. However, since there is substantially no interaction between the $LP_{01}$ modes of the two fibers 1100, 1110, there is substantially no optical energy coupled between the $LP_{01}$ propagation mode of the fiber 1110 and the $LP_{01}$ mode of the fiber 1100. As discussed hereinafter, coupling between the $LP_{11}$ mode of the fiber 1110 and the $LP_{01}$ mode of the fiber 1100 is enhanced by selecting the fibers such that the propagation constants of these two modes are the same. Similarly, coupling between the $LP_{01}$ modes of the fiber is inhibited by ensuring that the $LP_{01}$ modes of the fibers have substantially different propagation constants.

As set forth above, the two-mode optical fiber 1110 has a highly elliptical core 1112 in which only the $LP_{11}$ even mode lobes can propagate in the fiber 1110 at the selected frequency of the optical signal. By orienting the major axis of the elliptical core 1112 so that it is normal to the facing surface 154, maximum coupling will be provided from the $LP_{11}$ mode, two-mode fiber 1110 to the $LP_{01}$ mode of the single-mode fiber 1110.

As discussed above, the energy of an optical signal propagating in the $LP_{01}$ mode of a fiber is confined mostly within the core of the fiber. Thus, an optical signal in the $LP_{01}$ propagation mode propagates at a phase propagation velocity which is largely determined by the refractive index of the core of the fiber. The effective refractive index seen by the light propagating in the $LP_{01}$ propagation mode has a value close to the value of the refractive index of the core. In contrast to the $LP_{01}$ mode, the $LP_{11}$ propagation mode propagates a larger fraction of optical energy in the cladding of the fiber. Thus, the phase propagation velocity of an optical signal propagating in the $LP_{11}$ propagation mode is determined by an effective refractive index which has a value less than the refractive index of the core and greater than the refractive index of the cladding. Accordingly, the effective refractive index for light in the $LP_{11}$ propagation mode has a value which is less than that for light in the $LP_{01}$ propagation mode. Thus, the phase propagation velocity of an optical signal propagating in the $LP_{11}$ propagation mode is faster than the phase propagation velocity of an optical signal propagating in the $LP_{01}$ mode. Due to the difference in phase velocities of the $LP_{01}$ and $LP_{11}$ modes, these modes do not easily couple; rather, they tend to function as two independent optical paths. In the preferred embodiment, selective coupling between the $LP_{11}$ mode of the fiber 1110 and the $LP_{01}$ mode of the fiber 1100 is accomplished by utilizing dissimilar fibers such that the phase propagation velocity of the $LP_{11}$ mode of the fiber 1110 matches the phase propagation velocity of the $LP_{01}$ mode of the fiber 1100, while the phase propagation velocities of all other pairs of modes are not matched.

From the foregoing, it will be understood that the propagation velocity of an optical signal propagating in the $LP_{01}$ mode of the first (single-mode) optical fiber 1100 is determined in part by a combination of the refractive index of the core 1102, the refractive index of the cladding 1104, and the diameter of the core 1102. Similarly, the phase propagation velocities of optical signals propagating in the $LP_{01}$ mode and the $LP_{11}$ mode of the second (two-mode) optical fiber 1110 are determined by the combination of the refractive index of the core 1122, the refractive index of the cladding 1124, and the diameter of the core 1122. As set forth the above, the phase propagation velocity of an optical signal propagating in the $LP_{11}$ mode in the optical fiber 1110 will be greater than the phase propagation velocity of an optical signal propagating in the $LP_{01}$ mode of the optical fiber 1110. In the present invention, the first optical fiber 1100 and the second optical fiber 1110 are selected to have characteristics (i.e., refractive indices and core dimensions) such that the phase propagation velocity of an optical signal in the $LP_{11}$ propagation mode of the second optical fiber 1110 is matched to the phase propagation velocity of an optical signal in the $LP_{01}$ propagation mode of the first optical fiber 1100. Thus, the phase propagation velocity of an optical signal propagating in the $LP_{01}$ mode in the second optical fiber will be slower than the phase propagation velocity of an optical signal propagating in the $LP_{11}$ mode of the second optical fiber 1110 and will also be slower than the phase propagation velocity of an optical signal propagating in the $LP_{01}$ mode of the first optical fiber 1100. The relationship among the phase propagation velocities is illustrated in FIGS. 19a, 19b, and 19c.

In FIG. 19a, a traveling wave 1250 represents the phase propagation of a signal propagating in the $LP_{01}$ propagation mode of the first (single-mode) optical fiber 1100. The traveling wave 1250 has a first wavelength $\lambda_1$ which is defined by a velocity $V_1$ of the optical signal in the $LP_{01}$ propagation mode of the fiber 1100 and the selected optical frequency $f_0$ (i.e., $\lambda_1 = V_1/f_0$). Similarly, FIG. 19b illustrates a traveling wave 1252 that represents the phase propagation of a signal traveling in the $LP_{01}$ propagation mode of the second (two-mode) optical fiber 1110 at the selected optical frequency $f_0$. The traveling wave 1252 has a wavelength $\lambda_2$ which is defined by a velocity $V_2$ of the optical signal in the $LP_{01}$ propagation mode of the second optical fiber 1110 and the selected optical frequency $f_0$ (i.e., $\lambda_2 = V_2/f_0$). FIG. 19c illustrates a traveling wave 1254 which represents the phase propagation of a signal traveling in the $LP_{11}$ propagation mode of the optical fiber 1110 at the selected optical frequency $f_0$. The traveling wave 1254 has a wavelength $\lambda_3$ which is defined by a velocity $V_3$ of the optical signal in the $LP_{11}$ propagation mode of the second optical fiber 1110 and the selected optical frequency $f_0$ (i.e., $\lambda_3 = V_3/f_0$). As set forth above, the characteristics of the first optical fiber 1100 and the second optical fiber 1110 are chosen so the velocity $V_1$ is substantially equal to the velocity $V_3$. Thus, the velocity $V_2$, which must be less than the velocity $V_3$, is less than the velocity $V_1$. Therefore, the wavelength $\lambda_3$ matches the wavelength $\lambda_1$ and the wavelength $\lambda_2$ does not match the wavelength $\lambda_1$. Accordingly, as illustrated in FIGS. 19a and 19c, light traveling in the $LP_{11}$ propagation mode of the second optical fiber 1110 will have a substantially fixed phase relation to light traveling in the $LP_{01}$ propagation mode of the first optical fiber 1100. On the other hand, as illustrated in FIGS. 19a and 19b, light traveling in the $LP_{01}$ propagation mode of the second optical fiber 1110 will have a continually varying phase relation to light traveling in the $LP_{01}$ propagation mode of the first optical fiber 1100.

It has been shown that to couple light from a mode of one fiber to a mode of another fiber, the modes should interact through their evanescent fields over an interaction length, and the phase propagation velocities of the two optical signal should be substantially equal. In the preferred embodiment, the phase propagation velocity $V_3$ of the $LP_{11}$ propagation mode of the second optical fiber 1110 at the selected frequency is substantially equal to the phase propagation velocity $V_1$ of the $LP_{01}$ propagation mode of the first optical fiber 1100. Thus, the apparatus of the present invention provides a means for coupling optical energy between the $LP_{11}$ propagation mode in the second optical fiber 1110 and the $LP_{01}$ propagation mode in the first optical fiber 1100. An optical signal propagating in the $LP_{01}$ propagation mode in the second optical fiber 1110 is not coupled to the first optical fiber 1100 because the phase propagation velocity $V_2$ for light propagating in the $LP_{01}$ mode in the second optical fiber 1110 does not match the phase propagation velocity $V_2$ for light propagating in the $LP_{01}$ propagation mode of the first optical fiber 1100. Thus, the apparatus of the present invention provides selection between optical energy propagating in the $LP_{01}$ mode of the second optical fiber 1110 and optical signal propagating in the $LP_{11}$ mode of the second optical fiber 1110. Accordingly, as shown in FIG. 13, when optical energy is input into a first end 1300 of the second optical fiber 1110 in the $LP_{01}$ propagation mode, represented by an arrow 1302, and in the $LP_{11}$ propagation mode, represented by an arrow 1304, the optical energy in the $LP_{11}$ propagation mode will be coupled to the first optical fiber 1100 and will exit from an end 1310 of the first optical fiber 1100 in the $LP_{01}$ propagation mode of the first optical fiber 1100, as represented by an arrow 1312. In contrast, the optical energy in the $LP_{01}$ propagation mode of the second optical fiber 1110 will remain in the second optical fiber 1110 and will exit from a second end 1320 of the second optical fiber 1110, as represented by an arrow 1322. The first optical fiber 1100 therefore provides an output signal which corresponds to the optical signal incident to the interaction region 1156 of the two fibers propagating in the $LP_{11}$ propagation mode of the second optical fiber 1110.

The foregoing properties of the present invention are reciprocal in that an optical signal introduced into an end of the first optical fiber 1100 in the $LP_{01}$ propagation mode of the first optical fiber 1100 interacts with $LP_{11}$ propagation mode of the second optical fiber 1110 in the interaction region between the first facing surface 1144 and the second facing surface 1154 to couple optical energy into the $LP_{11}$ propagation mode of the second optical fiber 1110. This reciprocal effect has advantages in many applications.

The apparatus of the present invention can be finetuned by orienting the two fibers 1100, 1110 so that the longitudinal axis of the two fibers are not exactly parallel. Thus, if the phase propagation velocities $V_1$ and $V_3$ are not precisely the same at the selected frequency, the second optical fiber 1110, for example, can be positioned so that the longitudinal axis of the core 1112 of the second optical fiber 1110 is at an angle with respect to the longitudinal axis of the core 1102 of the first optical fiber 1100 such that the magnitude of the component of the phase velocity $V_3$ in the direction of the longitudinal axis of the core 1102 of the first optical fiber 1100 is the same as the phase velocity $V_1$ along the longitudinal axis of the core 1102 of the first optical fiber 1100. This is illustrated in FIGS. 20a and 20b, wherein a vector 1402 represents the phase propagation velocity $V_3$ of the $LP_{11}$ propagation mode of the second optical fiber 1110 (shown in phantom) and a vector 1400 represents the phase propagation velocity $V_1$ of the propagation mode $LP_{01}$ in the first optical fiber 1100 (shown in phantom). In FIG. 20a, the two vectors are positioned in parallel and the magnitude of the vector 1400 is smaller than the magnitude of the vector 1402. Thus, the phase propagation velocities $V_3$ and $V_1$ do not match and efficient coupling cannot occur. In FIG. 20b, the second optical fiber 1110 is oriented at a small angle with respect to the first optical 1100 so that the phase propagation velocity vector 1400 is oriented at a small angle with respect to the phase propagation velocity vector 1402. The component of the phase propagation velocity vector 1402 in the direction of the phase propagation velocity vector 1400 is shown in dashed lines as a vector 1402' that represents a velocity $V_3'$. The vector 1402' has substantially the same magnitude as the vector 1400 and thus the phase propagation velocities $V_3'$ and $V_1$, represented by the vectors 1402' and 1400, match at the angle shown. Thus, efficient coupling can occur from the $LP_{11}$ propagation mode of the second optical fiber 1110 to the $LP_{01}$ propagation mode of the first optical fiber 1100. Although, for clarity of illustration, the angle between the fibers is shown as a significant angle in FIG. 20b, it is preferable that the angle between the two fibers 1100 and 1110 be very small so that the fibers are substantially parallel at the interaction region 1156. In the present invention, it is desirable to avoid large angles between the fibers to prevent a significant reduction in the interaction length. As used herein, the interaction length means the length in the direction of the fiber axis of one of the fiber (e.g, the fiber 1100) through which the core of the one fiber (e.g., the fiber 1100) is positioned within the evanescent field of the other fiber (e.g., the fiber 1110).

Figure 21:
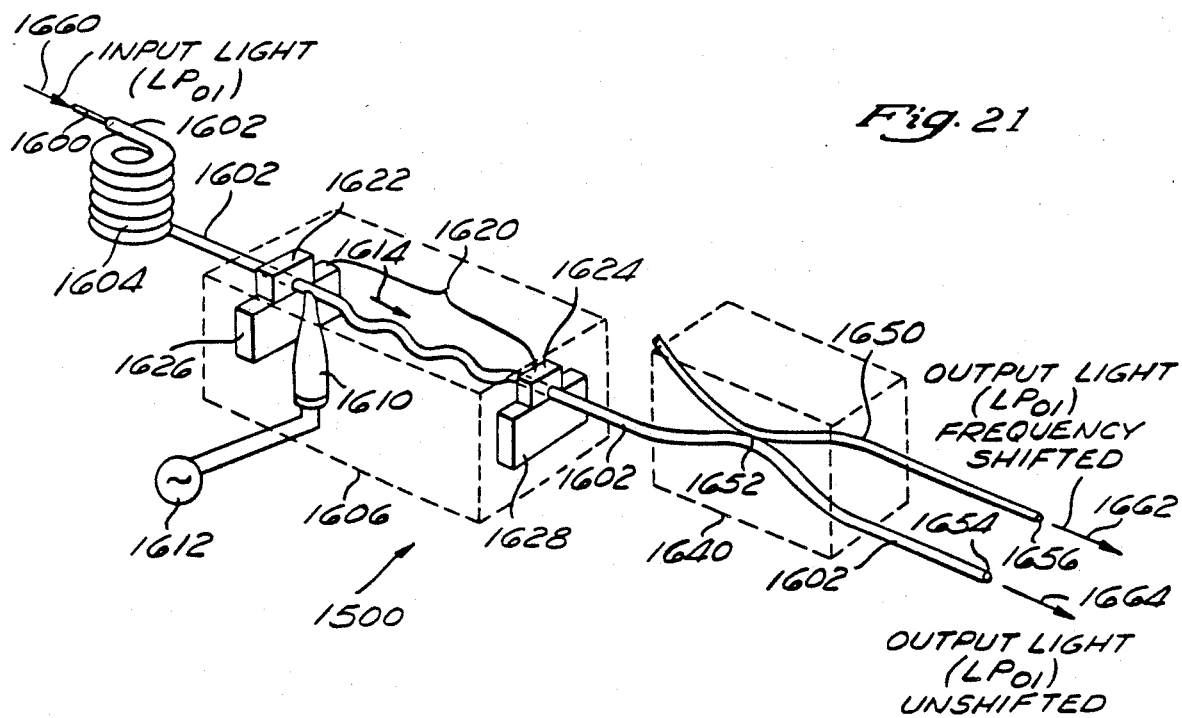
FIG. 21 is a pictorial illustration of an inter-mode frequency modulator that uses the apparatus of the present invention to separate frequency-shifted light in the $LP_{11}$ propagation mode from unshifted light in the $LP_{01}$ propagation mode.

An exemplary application for the frequency shifter and mode selector of the present invention is illustrated for an inter-mode frequency shifter 1500 in FIG. 21. The inter-mode frequency shifter 1500 preferably includes an input optical fiber 1600 which is advantageously a single-mode optical fiber. The input optical fiber 1600 is butt-spliced to a two-mode optical fiber 1602. A first portion of the two-mode optical fiber 1602 is formed into a coil 1604 which operates as a mode stripper in a manner known to the art. Alternative mode strippers could by used. A second portion of the two-mode optical fiber 1602 interconnects the mode stripper 1604 with an inter-mode frequency shifter 1606. The inter-mode frequency shifter 1606 is preferably constructed in accordance with the frequency shifter described above in connection with FIGS. 9-12. A transducer 1610, driven by a modulation source 1612, induces vibrations into the fiber 1602 which propagate in a single direction 1614 away from the transducer 1610 as a flexural wave comprising a series of traveling microbends in an interaction region defined between a first damper 1622 and a second damper 1624, supported by a first support 1626 and a second support 1628, respectively. The inter-mode frequency shifter 1606 operates to couple light from a first propagation mode (e.g., the $LP_{01}$ mode) to a second propagation mode (e.g., the $LP_{11}$ mode) and to cause the light to be shifted in frequency by an amount determined by a modulation signal applied to the transducer 1610 of the frequency shifter 1606 from the modulation source 1612. After passing through the frequency shifter 1606, the two-mode optical fiber 1602 interconnects the frequency shifter 1606 with a mode selector 1640 constructed in accordance with FIGS. 13-20b. In the mode selector 1640, the two-mode optical fiber 1602 is juxtaposed with a single-mode optical fiber 1650 at an interaction region 1652 in the manner described above. The two-mode optical fiber 1602 has an output end portion 1654. The single-mode optical fiber 1650 has an output end portion 1656.

The inter-mode frequency modulator operates in the following manner. An optical signal, represented by an arrow 1660, is introduced into the input optical fiber 1600. Preferably, the optical signal is propagating solely within the $LP_{01}$ propagation mode for the input optical fiber 1600. The optical signal propagates through the input optical fiber 1600 and is coupled to the two-mode optical fiber 1602 and propagates within the two-mode optical fiber 1062 in the $LP_{01}$ propagation mode. Any optical signal propagating in the $LP_{11}$ propagation mode in the fiber 1602 is stripped from the two-mode optical fiber 1602 in the mode stripper 1604 in a manner known to the art. Thus, after passing through the mode stripper 1604, the optical signal remaining in the two-mode optical fiber 1602 is propagating solely in the $LP_{01}$ propagation mode. The optical signal propagates in the $LP_{01}$ propagation mode through the two-mode optical fiber 1602 to the frequency shifter 1606. In the frequency shifter 1606, the optical signal propagating in the $LP_{01}$ propagation mode is coupled to the $LP_{11}$ propagation mode and is shifted in frequency by an amount determined by the frequency of the modulation source 1612. As set forth above, the optical signal coupled to the $LP_{11}$ propagation mode can be shifted upward in frequency or downward in frequency in accordance with the direction of propagation of traveling flexure waves in the frequency shifter 1606, and thus in accordance with the location of the transducer 1610 on the optical fiber 1602. The frequency shifted light in the $LP_{11}$ propagation mode and any light remaining in the $LP_{01}$ propagation mode propagates from the frequency shifter 1606 to the mode selector 1640 through the two-mode optical fiber 1602. Within the mode selector 1640, the light propagating in $LP_{11}$ propagation mode is coupled to the $LP_{01}$ propagation mode of the single-mode optical fiber 1650 and propagates to the end portion 1656 where it exits as frequency shifted light, represented by the arrow 1662. The light propagating in the $LP_{01}$ mode in the fiber 1602 at the original unshifted frequency propagates to the end portion 1654 of the two-mode optical fiber 1602 and exits as unshifted light, represented by an arrow 1664.

As set forth above, the mode selector 1640 of the present invention is reciprocal so that an optical signal can be input into the end portion 1656 of the single-mode optical fiber 1650 in the $LP_{01}$ propagation mode. The light in the $LP_{01}$ propagation mode of the single-mode optical fiber 1650 is coupled to the $LP_{11}$ propagation mode of the two-mode optical fiber 1602 within the mode selector 1640. Thereafter, the light propagates through the optical fiber 1602 to the frequency shifter 1606 where it is shifted in frequency and is coupled to the $LP_{01}$ mode of the optical fiber 1602. The optical signal propagates from the frequency shifter 1606 through the two-mode optical fiber 1602 to the mode stripper 1604 wherein any optical signal remaining in the $LP_{11}$ propagation mode is stripped from the optical fiber 1602. Thus, the optical signal propagating from the mode stripper 1604 to the single-mode optical fiber 1600 (which now operates as an output optical fiber) is propagated solely in the $LP_{01}$ propagation mode and is shifted in frequency from the optical signal input at the end portion 1656 of the optical fiber 1650.

Figure 22:
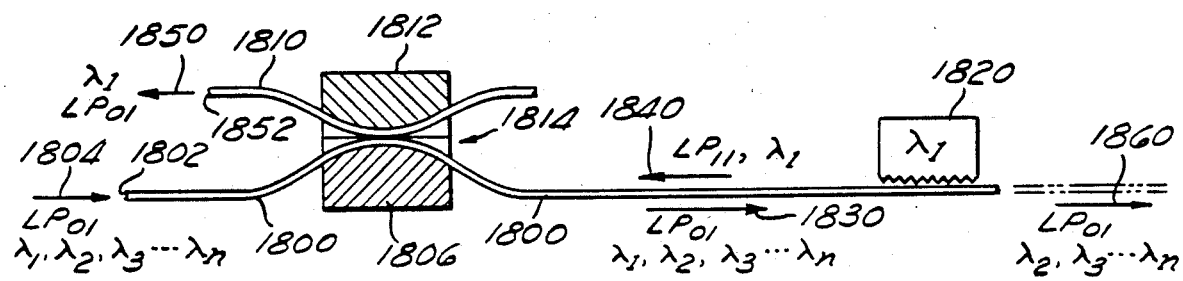
FIG. 22 is a system incorporating the mode selector of the present invention and an evanescent field grating reflector that separates light propagating at a particular frequency from light at other frequencies.

FIG. 22 illustrates a system which incorporates a mode selector built in accordance with the present invention into a system that separates light propagating at a plurality of frequencies in one fiber into a plurality of light signals at discrete frequencies propagating in separate fibers. The system includes a first optical fiber 1800 which, in the embodiment shown, has only two propagation modes and has a highly elliptical core. This fiber 1800 includes a first end 1802 which receives input light, represented by an arrow 1804. The input light 1804 is comprised of a plurality of optical signals having discrete optical wavelengths $\lambda_1, \lambda_2, \ldots \lambda_n$. Preferably, the optical signals are propagating in the $LP_{01}$ propagation mode of the fiber. A portion of the optical fiber 1800 is positioned in a coupler half 1806 constructed in accordance with the present invention, and it is preferably oriented in the coupler half 1806 so that the major axis of its elliptical core is normal to the facing surface of the coupler half 1806. A second optical fiber 1810, which is preferably a single-mode optical fiber, is positioned in a second coupler half 1812, also constructed in accordance with the present invention. The two coupler halves 1806, 1812 are positioned so that facing surfaces formed on fibers 1800 and 1810 are juxtaposed to provide coupling between the propagation modes of the two fibers and thereby form a mode selector 1814 of the present invention. A second portion of the first two-mode optical fiber 1800 is incorporated into an evanescent field grating reflector 1820, constructed in accordance with copending U.S. patent application Ser. No. 147,095, entitled "Optical Fiber Evanescent Grating Reflector," filed on Jan. 20, 1988, a continuation of U.S. patent application Ser. No. 754,271, filed on July 15, 1985, now abandoned, and assigned to the assignee of the instant application. This application is incorporated herein by reference. The two-mode optical fiber 1800 is preferably oriented so that the major axis of its elliptical core is normal to the surface of the grating reflector 1820.

As disclosed in the copending application, by properly selecting the periodicity of the grating of the grating reflector 1820, light incident on the grating reflector in the $LP_{01}$ propagation mode of the optical fiber 1800 as represented by an arrow 1830, is reflected by the grating reflector 1820 and is caused to propagate in the reverse direction in the $LP_{11}$ propagation mode, as illustrated by an arrow 1840. As set forth in the copending patent application, the grating reflector 1820 can be constructed to have a series of periodic gratings with a periodicity of $\Lambda$ (wherein $\Lambda$ is the distance between parallel lines forming the grating) so that light incident upon the grating reflector 1820 in the $LP_{01}$ mode with a wavelength of $\lambda_{01}$ (wherein $\lambda_{01}$ refers to the wavelength at the input frequency in the $LP_{01}$ propagation mode) will be reflected back into the fiber 1800 in the opposite direction at a wavelength of $\lambda_{11}$ which corresponds to the wavelength of a signal at the same frequency in the $LP_{11}$ propagation mode. In order to achieve this reflection characteristic, the periodicity $\Lambda$ of the grating reflector 1820 is selected in accordance with the following equation:

$$\frac{1}{\Lambda} = \frac{1}{\lambda_{01}} + \frac{1}{\lambda_{11}} \tag{14}$$

As set forth in the copending patent application, the grating reflector 1820 acts as an inter-mode coupler when the periodicity of the grating is selected in accordance with Equation (14). The grating reflector 1820 is particularly advantageous in that it is frequency selective and can separate light propagating in a plurality of frequencies such that the light propagating in the reverse direction, represented by the arrow 1840, will only have a selected one of the plurality of frequencies. That frequency (having a wavelength of $\lambda_1$, representing the free space wavelength of an optical signal at the selected frequency) is the frequency wherein the $LP_{01}$ mode wavelength $\lambda_{01}$ and the $LP_{11}$ mode wavelength $\lambda_{11}$ satisfy Equation (14) for the periodicity $\Lambda$ of the grating reflector 1820. Thus, although the input light signal incident upon the first end 1802, as represented by the arrow 1804, has a plurality of optical frequencies (i.e., $\lambda_1, \lambda_2, \lambda_3 \ldots \lambda_n$) only the optical signal having the wavelength $\lambda_1$, having propagation mode wavelengths $\lambda_{01}$ and $\lambda_{11}$ satisfying the Equation (14), will be reflected by the grating reflector 1820.

The system in FIG. 22 operates as follows. The light incident to the first end 1802 of the first optical fiber 1800 in the $LP_{01}$ mode propagates to the mode selector 1814. The mode selector 1814 is constructed with the fibers 1800 and 1810 selected so that the phase propagation velocities are matched only for coupling from the $LP_{11}$ mode of the first two-mode optical fiber 1800 to the second $LP_{01}$ mode of the second single-mode optical fiber 1810. Thus, optical signals propagating in the $LP_{01}$ mode of the first optical fiber 1810 pass through the interaction region of the mode selector 1814 with little coupling to the second optical fiber 1810. The light incident to the grating reflector 1820, represented by the arrow 1830, thus comprises substantially all of the input light at the input frequencies $\lambda_1, \lambda_2, \lambda_3 \ldots \lambda_n$ in the $LP_{01}$ mode. At the grating reflector 1820 the input light at the frequency $\lambda_1$, which satisfies the Equation (14) for the wavelength $\lambda_{01}$ for the $LP_{01}$ propagation mode and the wavelength $\lambda_{11}$ for the $LP_{11}$ propagation mode is reflected by the grating reflector 1820 and propagates in the reverse direction in the $LP_{11}$ propagation mode as indicated by an arrow 1840. When this light is incident upon the mode selector 1814, the optical signal in the $LP_{11}$ propagation mode of the first optical fiber 1800 is coupled to the $LP_{01}$ propagation mode of the second optical fiber 1810 and is provided as an output signal, represented by an arrow 1850, from an end 1852 of the second optical fiber 1810. The input optical signals at the other frequencies (represented by $\lambda_2, \lambda_3 \ldots \lambda_n$ are not reflected by the grating reflector 1820 and continue to propagate in the $LP_{01}$ propagation mode of the first optical fiber 1800 in the original forward direction as indicated by an arrow 1860. Thus, the mode selector 1814 and the grating reflector 1820 act together to select the optical signal at the frequency corresponding to the wavelength $\lambda_1$, and provide it as a discrete output signal from the end 1852 of the second optical fiber 1810 in the $LP_{01}$ propagation mode. Additional pairs of mode selectors and grating reflectors (not shown) constructed for the other wavelengths (i.e., $\lambda_2, \lambda_3, \ldots \lambda_n$) can be formed on the first optical fiber 1800 to select the other wavelengths and provide them as discrete output signals. Thus, the embodiment of FIG. 22 provides an advantageous means for separating optical frequencies from an input light having a plurality of input frequencies.

From the discussions relating to the embodiments set forth above, it will be understood that the mode selector of the present invention utilizes two dissimilar optical fibers, one of which is multimode, while the other may be either single-mode or multimode. The multimode fibers of the present invention, however, are a special class of multimode fibers, referred to herein as "few-mode fibers," which propagate light in no more than about five to ten spatial modes. Those skilled in the art will recognize that it is difficult to accomplish the propagation velocity matching and mismatching discussed above in fibers that have more than about five to ten modes, since the difference between the propagation velocities decreases as the number of modes increases. Further, the propagation velocity difference for higher order modes is ordinarily less than for lower order modes. For example, the propagation velocity difference between the 99th order mode and the 100th order mode of a hundred mode fiber is very small compared to the propagation velocity difference between the first and second order modes of a double mode fiber. Thus, it is particularly advantageous to use few mode fibers in the present invention.

Description of Interferometer Using Highly Elliptical Core Waveguides

The fundamental and second order guided modes of a highly elliptical core optical fiber provide two orthogonal paths through the fiber which permits the device to be used as a two-channel medium, e.g., as an in-line Mach-Zehnder interferometer, and as a two channel medium in data systems.

Figure 23:
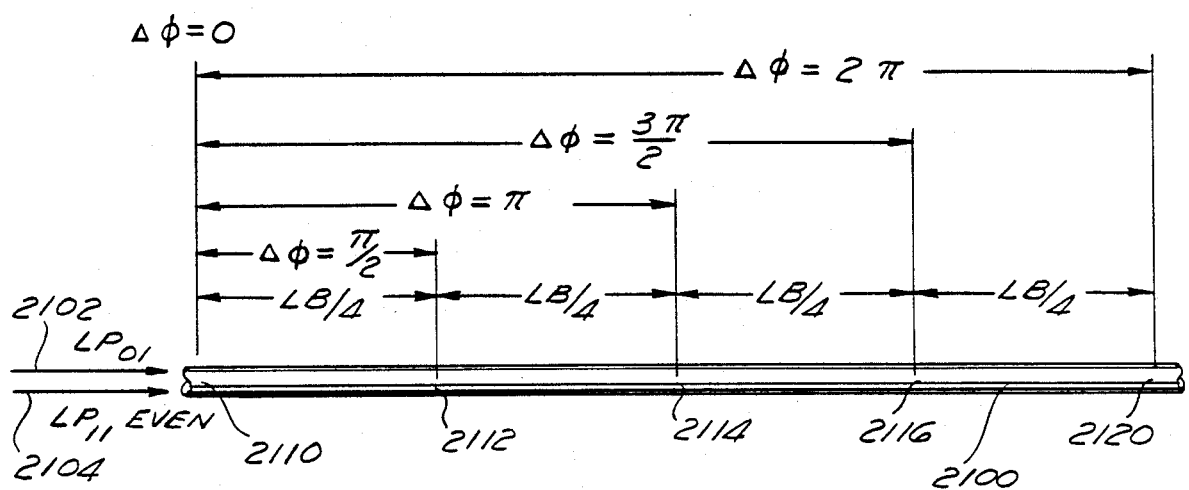
FIG. 23 illustrates an exemplary segment of a two-mode optical fiber of the present invention showing the interrelationship of the optical beat length between the $LP_{01}$ propagation modes and the $LP_{11}$ even propagation modes and the phase delay between the $LP_{01}$ modes and the $LP_{11}$ even modes.

The principle of using the highly elliptical core optical fiber as an interferometer is illustrated in FIGS. 23 and 24a–24b. An exemplary section of an optical fiber 2100 having a highly elliptical core, as described above, is illustrated in FIG. 23. An optical signal is input into the optical fiber 2100 with energy in the $LP_{01}$ modes and the $LP_{11}$ even modes, as illustrated by the arrows 2101 and 2104, respectively. Both modes propagate in the optical fiber 2100. The two modes have a beat length $L_B$, as discussed above. Five locations 2110, 2112, 2114, 2116 and 2118, that are spaced apart by one-quarter beat length (i.e., $L_B/4$) are indicated in FIG. 23.

In FIG. 24a, a first field intensity pattern 2200 represents the distribution of optical energy in the core for the $LP_{01}$ propagation mode, and a second field intensity pattern 2202 represents the distribution of optical energy in the core for the $LP_{11}$ propagation mode. In each case, the optical fiber is aligned so that the major axis of the elliptical core is vertically aligned, as viewed in FIGS. 24a and 24b. When light is input into the highly elliptical core optical fiber 2100 with equal intensities in the $LP_{01}$ and $LP_{11}$ propagation modes, the light in the optical fiber 2124 at any particular location will have a field intensity pattern that represents the superposition of the $LP_{01}$ and $LP_{11}$ modes, and the shape and intensity of the radiation pattern will be dependent upon the relative phase of the two modes at that location. The field intensity patterns for the optical fiber at three locations representing three different phases are illustrated in FIG. 24b. A first output field intensity pattern 2210, having the field intensity concentrated in the upper half of the optical fiber 2124 (when oriented as shown) represents a phase difference ($\Delta\phi$) between the two modes of $2N\pi$ (i.e., $0, 2\pi, 4\pi$, etc.). Approximately half of the first output field intensity pattern 2210 is light and approximately half of the first output field intensity pattern 2210 is dark. (For convenience, the illustrations of the field intensity patterns in FIGS. 24a and 24b have the areas of maximum light intensity shaded and the areas of minimum light intensity unshaded). For purposes of illustration, it is assumed that the $LP_{01}$ modes and the $LP_{11}$ even modes are in phase at the location 2110 (FIG. 23). Thus, the two modes will be in phase again at the location 2120 that is separated by one beat length $L_B$ from the location 2110.

A second output field intensity pattern 2212, having the field intensity distributed between the upper and lower half of the optical fiber, represents a phase difference ($\Delta\phi$) between the two modes of $(N+\frac{1}{2})\pi$ (i.e., $\pi/2$, $3\pi/2$, $5\pi/2$, etc.). This intensity pattern will occur, for example, at the location 2112 ($L_B/4$ from the location 2110) and the location 2116 ($3L_B/4$ from the location 2110).

A third output field intensity pattern 2214, having the field intensity concentrated in the lower half of the optical fiber, represents a phase different ($\alpha\phi$) between the two modes of $(2N+1)\pi$ (i.e., $\pi$, $3\pi$, $5\pi$, etc.). This intensity pattern will occur at the location 2114 ($L_B/2$ away from the location 2110).

Thus, by monitoring the output field intensity patterns in the upper and lower halves of the optical fiber 2100, the changes in the optical phase difference (i.e., the differential phase shift) between the two modes can be measured. The differential phase shift between the two modes can result from perturbations to the optical fiber 2100, such as axial strain of the fiber, twists in the fiber, bending of the fiber, changes in the temperature of the fiber, lateral stress of the fiber, acoustic pressure on the fiber, and the like. Exemplary interferometers for measuring the differential phase shifts caused by external perturbations to the optical fiber are illustrated hereinafter.

FIG. 25a illustrates an interferometer having a highly elliptical core two-mode optical fiber 2300. The optical fiber 2300 has a first end portion 2302 and a second end portion 2304. A mode stripper 2310 is formed in the optical fiber 2300 proximate to the first end portion 2302 by wrapping a number of turns of the fiber 2300 around a mandrel, or the like. An inter-modal coupler 2312, such as described above in connection with FIGS. 9 and 9a, is formed on the optical fiber 2300 proximate to the mode stripper 2310 and between the mode stripper 2310 and the second end portion 2304. An intermediate portion 2314 of the optical fiber 2300 between the inter-modal coupler 2312 and the second end portion 2304 is exposed to an external perturbation such as an acoustic wave, a strain, or the like. The external perturbation is represented in general by a pair of jagged arrows 2320.

A first optical detector 2330 and a second optical detector 2332 are positioned proximate to the second end portion 2304 of the optical fiber 2300. The first optical detector 2330 and the second optical detector 2332 can be conventional photodetectors, each of which provides an electrical output signal that is responsive to the intensity of the optical energy incident on it. Preferably, the first detector 2330 is positioned to receive optical energy emitted from the upper half of the second end portion 2304 of the optical fiber 2300, and the second detector 2332 is positioned to receive optical energy emitted from the lower half of the second end portion 2304 of the optical fiber 2300. "Upper half" and "lower half," as used herein, refer to the upper half of the second end portion 2304 of the optical fiber 2300 when the second end portion 2304 is aligned so as to provide the intensity patterns in the orientations shown in FIGS. 24a and 24b (i.e., the major axis of the elliptical core is vertical). Of course, the second end portion 2304 can be aligned so that the major axis of the elliptical core is other than vertical so long as the two detectors 2330 and 2332 are aligned with the major axis. The electrical output of the first detector 2330 is electrically connected to the negative input of a differential amplifier 2340, and the electrical output of the second detector 2332 is electrically connected to the positive input of the amplifier 2340. The differential amplifier 2340 compares the two inputs and provides an output on an output line 2342 that is proportional to the difference in intensity of the optical energy incident upon the first detector 2330 and the second detector 2332. Although two detectors are shown, one skilled in the art will understand that a single one of the two detectors can be used to detect only the upper or the lower signal output to obtain the same information. The two detectors 2330 and 2332 and the differential amplifier 2340 are advantageously used to increase the sensitivity of the embodiment of FIG. 25a.

A light source 2350, which can be a laser light source, a broadband source (such as a superluminescent diode), or the like, provides a source output signal, represented by an arrow line 2352, and is positioned to direct its output into the input end portion 2302 of the source optical fiber 2300. The light source 2350 is selected so that the wavelength of the source output signal 2352 is less than the cutoff wavelength for the $LP_{11}$ even mode of the optical fiber 2300, and greater than the cutoff wavelength for the $LP_{11}$ odd mode of the optical fiber 2300. Thus, only the $LP_{01}$ modes and the $LP_{11}$ even modes of the optical signal entering the first end portion 2303 of the optical fiber 2300 ill be supported by the optical fiber 2300. Preferably, the light source 2350 is oriented so that substantially all of the source optical energy entering the first end portion 2302 of the optical fiber 2300 is in the $LP_{01}$ mode. However, any optical energy in the $LP_{11}$ even mode will be stripped by the mode stripper 2310. Thus, substantially all of the optical energy in the portion of the optical fiber 2300 between the mode stripper 2310 and the inter-modal coupler 2312 will be in the $LP_{01}$ propagation mode. The inter-modal coupler 2312 is preferably adjusted so that approximately 50% of the optical energy in the $LP_{01}$ propagation mode is coupled to the $LP_{11}$ propagation mode. Thus, the optical energy entering the portion of the optical fiber 2300 between the inter-modal coupler 2312 and the second end portion 2304 will initially have approximately equal intensities in the $LP_{01}$ and $LP_{11}$ propagation modes. The optical energy will propagate to the second end portion 2304 and will be emitted therefrom onto the first detector 2330 and the second detector 2332. The optical intensity pattern of the optical energy emitted by the second end portion 2304 will depend upon the phase delay between the two propagation modes caused by the difference in phase propagation velocities between the $LP_{01}$ and the $LP_{11}$ propagation modes. So long as the optical fiber 2300 is not perturbed by an acoustic signal, a temperature change, or the like, the phase delay will remain constant, and the electrical output signal on the line 2342 from the differential amplifier 2340 will remain stable. When a perturbation occurs, the length of the optical path between the inter-modal coupler 2312 and the second end portion 2304 will change, thus causing a change in the phase difference between the $LP_{01}$ and the $LP_{11}$ propagation modes. This phase difference causes a change in the electrical output signal on the line 2342 from the differential amplifier 2340.

The use of two-mode optical fibers in the interferometer of FIG. 25a is advantageous because of the unique characteristics of the group propagation velocities and the phase propagation velocities of the optical signal in the fiber. Although the phase propagation velocities are different for the wavelength of light selected to propagate only the $LP_{01}$ mode and the $LP_{11}$ even mode, the group propagation velocities of the two modes will be substantially the same near a particular optical wavelength. Thus, the optical path length of the two transmission paths provided by the two propagation modes is substantially the same. For conventional interferometers having two separate arms to provide the two optical paths, care must be taken to assure that the coherence length of the source of optical energy is greater than the optical path difference in the two arms. This optical path difference in the two-arm interferometers is caused by differences in the group delay in the optical signals propagating in the two arms. In the present invention, the group delay for both modes is the same, and an optical signal source having a short coherence length can be used, even when the phase delays are large. Thus, a longer optical fiber can be used to increase the sensitivity of the interferometer without causing a significant increase in noise. The use of the highly elliptical core optical fiber 2300 provides a means for maintaining a stable orientation of the field intensity patterns of the second order mode, which is very difficult to do when using circular core fiber.

Because the optical energy propagating in the two modes propagates at the same group velocity, an optical pulse containing energy propagating in the two modes will not undergo modal dispersion as it propagates. Thus, the optical pulse will not spread in time as it propagates down the fiber 2300. This allows the present invention to be used with a pulsed light source as well as with a continuous light source, since light propagating in both modes will reach the second end portion 2304 of the optical fiber 2300 simultaneously and will thus interfere.

FIG. 25b illustrates an alternative embodiment of the interferometer of FIG. 25a. In FIG. 25b, the light source 2350, the source optical signal 2352, the first detector 2330, the second detector 2332 and the differential amplifier 2342 operate as described above for FIG. 25a. In FIG. 25b, the optical waveguide portion of the interferometer is formed from two optical fibers, a first optical fiber 2360 that is preferably a single-mode optical fiber and a second optical fiber 2362 that is preferably a two-mode optical fiber having a highly elliptical core. The first optical fiber 2360 has a first end portion 2364 and a second end portion 2366. The first end portion 2364 is positioned proximate to the light source 2350 to receive the source optical signal 2352 generated by the light source 2350. The second optical fiber 2362 has a first end portion 2370 and a second end portion 2374. The second end portion 2374 of the second optical fiber is positioned proximate to the first and second detectors 2330 and 2332 that are vertically aligned as before. The major axis of the elliptical core of the second optical fiber 2362 is preferably aligned with the vertical alignment of the first and second detectors 2330 and 2332.

The second end portion 2366 of the first optical fiber 2360 and the first end portion 2370 of the second optical fiber 2362 are butt-spliced to form an offset splice 2376. The offset splice 2376 is shown in more detail in FIG. 26, wherein the cores of the first optical fiber 2360 and the second optical fiber 2362 are represented by outlines 2380 and 2382, respectively. The core 2380 of the first optical fiber has a center line 2384 (shown in phantom), and the core 2382 of the second optical fiber has a centerline 2386 (also shown in phantom). As illustrated, the centerlines of the two cores are offset with respect to each other so that the centerlines 2384, 2386 are not aligned. Preferably, the two centerlines are offset along the major axis of the elliptical core of the second optical fiber 2362.

Figure 26:
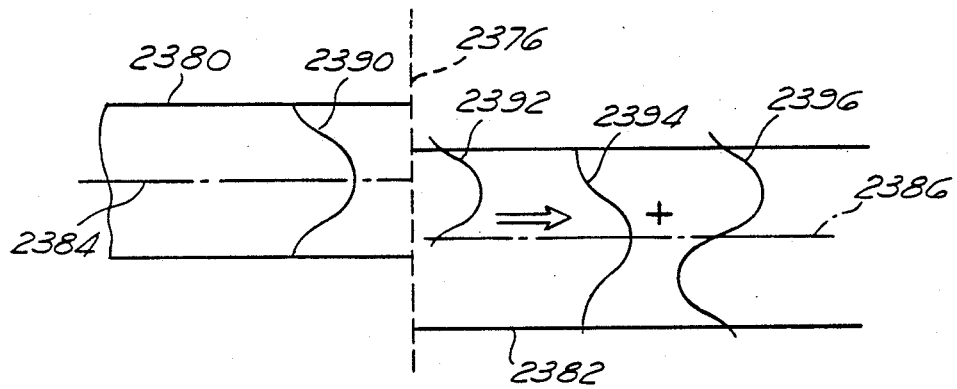
FIG. 26 illustrates an exemplary offset splice used in the interferometer of FIG. 25b.

The effect of the offset centerlines of the two cores is to cause optical energy propagating in the $LP_{01}$ mode of the first optical fiber 2360 to be coupled to the $LP_{01}$ and the $LP_{11}$ modes of the second optical fiber. This is illustrated in FIG. 26 by the superposition of exemplary electric field amplitude distribution graphs on the core outlines 2380 and 2382. The first distribution graph 2390 represents the amplitude distribution of the $LP_{01}$ propagation mode in the core 2380 of the first optical fiber 2360 proximate the offset splice 2376. As illustrated, the amplitude distribution in the first (single-mode) fiber 2360 is symmetrical about the centerline 2382. When the optical energy in the first optical fiber 2360 crosses the offset splice 2376 into the second (two-mode) optical fiber 2362, it enters the second optical fiber 2362 with the optical energy asymmetrically distributed with respect to the centerline 2386 of the second optical fiber 2362, as represented by an amplitude distribution graph 2392. The amplitude distribution graph 2392 represents the sum of the optical energy in the $LP_{01}$ *propagation mode, represented by an amplitude distribution graph* 2394, *and the optical energy in the* $LP_{11}$ propagation mode, represented by an amplitude distribution graph 2396. The amount of the offset of the two centerlines 2384 and 2386 is selected so that the optical energy in the second optical fiber 2362 is substantially evenly distributed between the two propagation modes (i.e., approximately 50% of the optical energy is in the $LP_{01}$ propagation mode and approximately 50% is in the $LP_{11}$ propagation mode). Because of the alignment of the offset with the major axis of the elliptical core of the second optical fiber 2362, the optical energy will preferentially enter the $LP_{11}$ even mode of the second optical fiber 2362. Furthermore, any optical energy entering into the $LP_{11}$ odd mode will not be supported by the second optical fiber 2362 and thus will not propagate.

The apparatus of FIG. 25b operates in substantially the same manner as the apparatus of FIG. 25a. The optical energy propagates in the single-mode fiber 2360 in only the $LP_{01}$ mode. Thus, it is not necessary to use a mode stripper to eliminate the $LP_{11}$ mode. The offset splice 2376 is adjusted to couple 50% of the optical energy into each of the $LP_{01}$ mode and the $LP_{11}$ even mode. The detection in changes in the phase difference between the two modes caused by perturbations to the second optical fiber 2362 is accomplished in the same manner as described above for FIG. 25a.

Figure 27A:
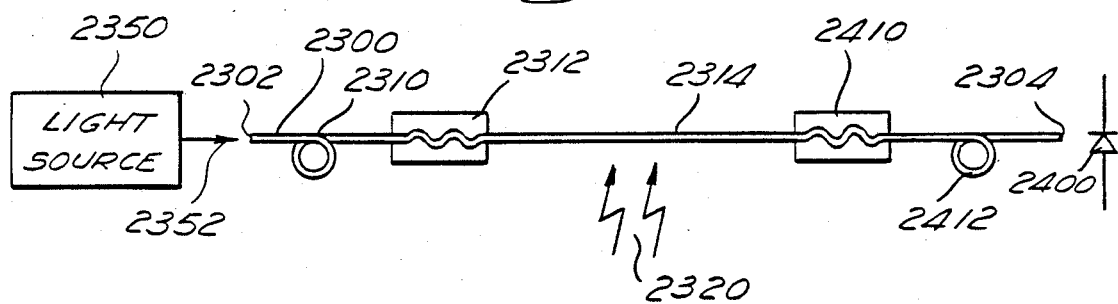
FIG. 27a illustrates an alternative embodiment of an interferometer utilizing the highly elliptical core optical fiber and a pair of inter-modal couplers.

FIG. 27a illustrates an alternative embodiment of the interferometer of FIG. 25a that requires only one detector 2400. As in FIG. 25a, the interferometer of FIG. 27a includes the light source 2350 that produces the source optical input signal 2352. The optical input signal is incident upon the first end portion 232 of the optical fiber 2300. Any optical energy in the $LP_{11}$ propagation mode entering the first end portion 2302 is stripped by the mode stripper 2310. Thereafter, the inter-modal coupler 2312 causes 50% of the optical energy to be coupled to the $LP_{11}$ propagation mode so that the optical energy propagating in the intermediate fiber portion 2314 after the inter-modal coupler 2312 has substantially equal intensity in the two propagation modes. The intermediate fiber portion 2314 of the optical fiber 2300 is subjected to the perturbations 2320, as before. Unlike the interferometer of FIG. 25a, the interferometer of FIG. 27a includes a second inter-modal coupler 2410 that is formed on the optical fiber 2300 between the intermediate fiber portion 2314 and the second end portion 2304. The interferometer of FIG. 27a further includes a second mode stripper 2412 formed on the optical fiber 2300 between the second inter-modal coupler 2410 and the second end portion 2304. The second inter-modal coupler 2410 is preferably adjusted to provide 50% coupling and operates to combine the optical energy from the two propagation modes. The optical intensity in the $LP_{01}$ propagation mode and in the $LP_{11}$ propagation mode after passing through the second inter-modal coupler 2410 is determined by the differential phase shift of the two modes caused by the perturbations of the intermediate fiber portion 2314. The second mode stripper 2412 strips off the optical energy propagating in the $LP_{11}$ mode so that only the optical energy propagating in the $LP_{01}$ mode is emitted from the second end portion 2304 of the optical fiber 2300. This optical energy is detected by the detector 2400 and will have a sinusoidal dependency upon the differential phase shift between the two modes. Thus, the electrical output of the detector 2400 can be monitored and analyzed to determine the amount of phase shift and thus the magnitude of the perturbations to the intermediate portion 2314 of the optical fiber 2300.

Figure 27B:
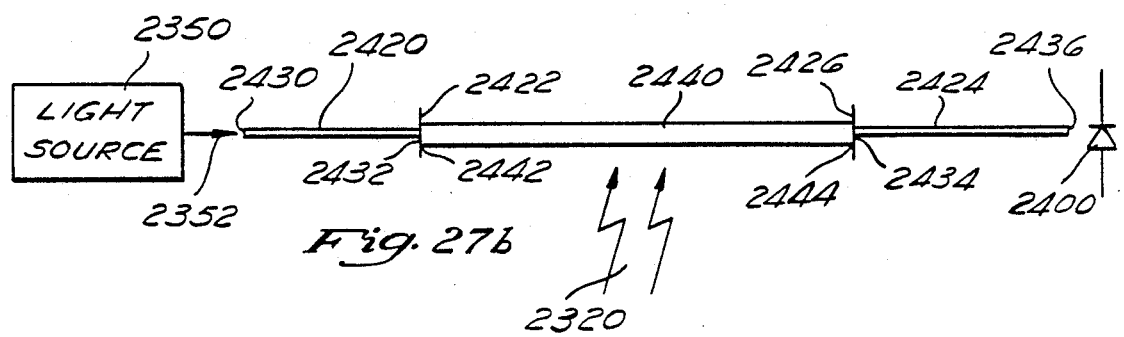
FIG. 27b illustrates an alternative embodiment of the interferometer of FIG. 27a that utilizes a modal filter or mode selector to separate the optical energy in the two propagation modes.

FIG. 27b illustrates the interferometer of FIG. 27a wherein a first single mode optical fiber 2420 and an offset splice 2422 replace the first mode stripper 2310 and the first inter-modal coupler 2312 in FIG. 27a, and a second single-mode optical fiber 2424 and a second offset splice 2426 replace the second inter-modal coupler 2410 and the second mode stripper 2412. The first single-mode fiber 2420 has a first end portion 2430 positioned to receive the optical signal 2352 generated by the light source 2350 and has a second end portion 2432 forming part of the first offset splice 2422. The second single-mode fiber 2424 has a first end portion 2434 forming part of the second offset splice 2426 and has a second end portion 2428 positioned proximate to the detector 2400. A two-mode optical fiber 2440, having a highly elliptical core, has a first end portion 2442 forming a part of the first offset splice 2422 and has a second end portion 2444 forming a part of the second offset splice 2426. The first single-mode fiber 2420 and the first offset splice 2422 operate in the manner described above for FIG. 25b to cause the light entering the first end portion 2442 of the two-mode optical fiber 2440 to have substantially equal optical intensities in each of the $LP_{01}$ and the $LP_{11}$ propagation modes. The light propagating in each of the two modes will experience a phase difference that depends upon the perturbations to the two-mode fiber 2440, represented by the arrows 2320. At the second offset splice 2426, the optical energy in the two-mode optical fiber 2440 is coupled to the $LP_{01}$ propagation mode of the second single-mode optical fiber 2424, and the optical energy in the second single-mode optical fiber 2424 will have an intensity that varies in accordance with variations in the phase difference of the two propagation modes in the two-mode optical fiber 2440 at the second offset splice 2426. The intensity of the optical energy in the second single-mode optical fiber 2424 is detected by the detector 2400 that provides an electrical output signal that is responsive to changes in the intensity nd thus to changes in the phase difference in the two propagation modes in the two-mode fiber 2440.

Figure 28C:
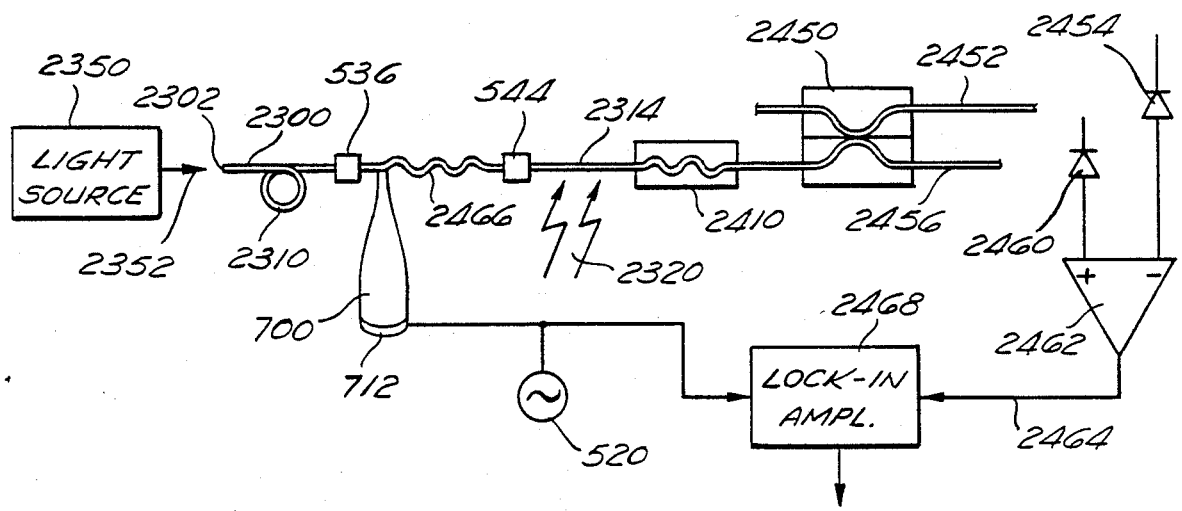
FIG. 28c illustrates an alternative embodiment of the interferometer of FIG. 28a which includes an intermodal frequency shifter and a synchronous (lock-in) amplifier to reduce or eliminate signal fading.
Figure 28A:
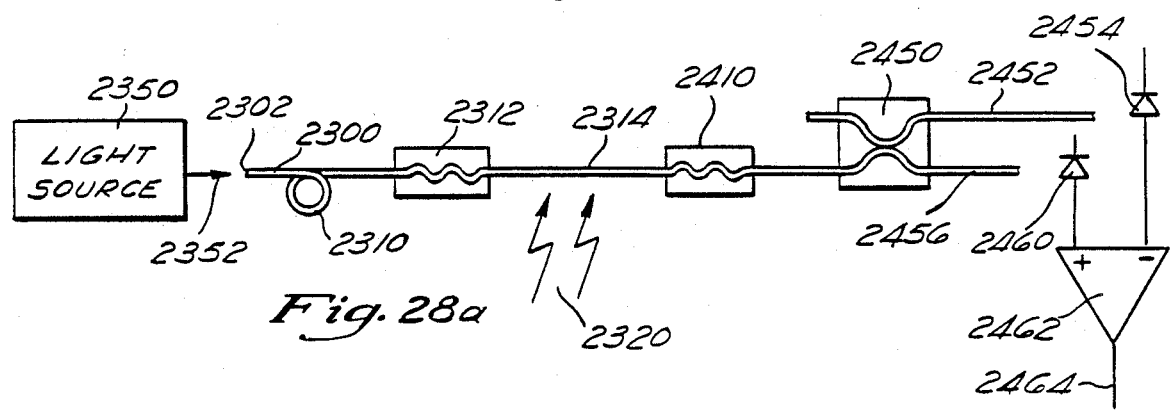
FIG. 28a illustrates an alternative embodiment of the interferometer of FIG. 27a that utilizes a modal filter or mode selector to separate the optical energy in the two propagation modes.

FIG. 28a illustrates a further alternative interferometer utilizing the highly elliptical core two-mode optical fiber. In FIG. 28a, the sensing portion of the interferometer comprises the light source 2350, the two-mode optical fiber 2300, the mode stripper 2310, the first inter-modal coupler 2312, the intermediate portion 2314 of the optical fiber 2300 and the second inter-modal coupler 2410, interconnected as in FIG. 27a. However, rather than including the second mode stripper 2412 of FIG. 27a, the embodiment of FIG. 28a includes a modal filter or mode selector 2450 such as was described above. The modal filter 2450 is used to separate the optical energy in the two propagation modes. The optical energy in the $LP_{01}$ propagation mode is provided as an output on a single-mode optical fiber 2452 and is directed to a first detector 2454. The optical energy in the $LP_{11}$ propagation mode is provided as an output on a two-mode optical fiber 2456 that can advantageously be a continuation of the optical fiber 2300. The optical energy output from the two-mode optical fiber 2456 is directed to a second detector 2460. The first detector 2454 provides an electrical output signal that is provided to the negative input of a differential amplifier 2462, and the second detector 2460 provides an electrical output that is provided to the positive input of the differential amplifier 2462. The differential amplifier provides an output on a line 2464 that represents the difference in intensity of the optical energy detected by the first and second detectors 2454, 2460, and is thus responsive to changes in the phase difference between the two propagation modes in the intermediate portion 2314 of the optical fiber 2300 caused by perturbations 2320.

Figure 28B:
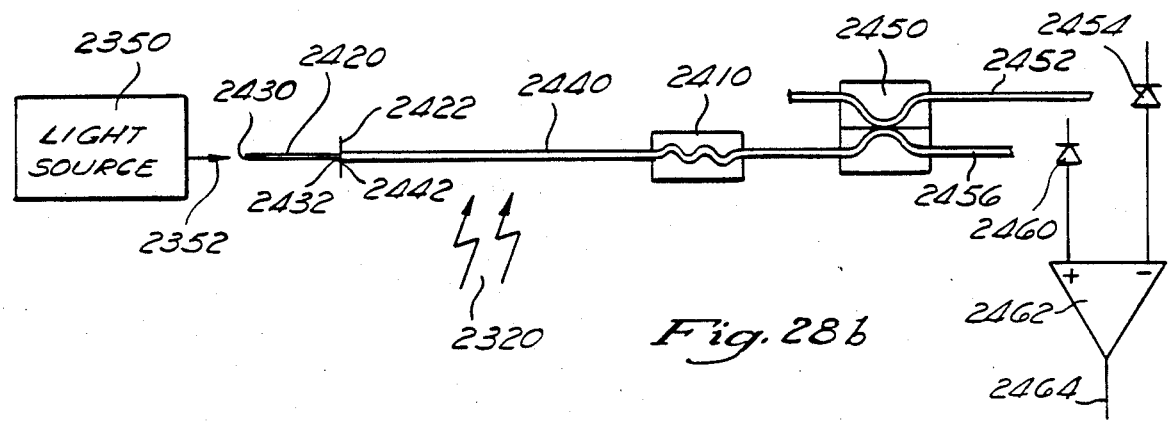
FIG. 28b illustrates an alternative embodiment of the interferometer of FIG. 28a in which the first intermodal coupler is replaced with an offset splice.

FIG. 28b is an alternative embodiment of the interferometer of FIG. 28a in which the mode stripper 2310 and the first inter-modal coupler 2312 are replaced with the single-mode optical fiber 2420 and the offset splice 2422, as in FIG. 27b. The interferometer of FIG. 28b operates in a similar manner to the interferometer of FIG. 28a.

FIG. 28c is a further alternative embodiment of the interferometer of FIG. 28a wherein an optical frequency shifter, such as the frequency shifter described above in connection with FIG. 12, is substituted for the first inter-modal coupler 2312. As set forth above, the frequency shifter comprises the transducer 700 driven by a piezoelectric acoustic generator 712. The small end of the transducer 700 is secured to the optical fiber 2300 as set forth in connection with FIG. 12. The first acoustic damper 536 is positioned on the optical fiber 2300 on one side of the connection between the optical fiber 2300 and the transducer 700. The second acoustic damper 544 is positioned on the optical fiber 2300 at a location displaced away from the connection between the transducer 700 and the optical fiber 2300 so as to provide a frequency shifter portion 2466 of the optical fiber 2300 that is positioned in the effect of the acoustic waves produced by the transducer 700. The piezoelectric generator 712 of the transducer 700 is electrically driven by the output of the signal source 520, as before. The output of the signal source 520 is also provided as one input to a lock-in amplifier 2468. The lock-in amplifier 2468 has a second input that is connected to the output line 2464 of the differential amplifier 2462.

The frequency shifter in FIG. 28c operates to cause the light coupled from the $LP_{01}$ propagation mode to the $LP_{11}$ propagation mode in the frequency shifter portion 2466 of the optical fiber 2300 to vary in time in accordance with the frequency of the signal source 520. Thus, the optical intensities detected by the first detector 2454 and the second detector 2460 will each have a component that varies in accordance with the frequency of the signal source 520 as well as a component that varies in accordance with the perturbations, represented by the arrows 2320. The lock-in amplifier 2468 is synchronized with the signal source 520 and thus provides an output signal that varies only in accordance with the changes in optical intensity caused by the perturbations 2320. The use of heterodyne detection such as this substantially reduces or eliminates any signal fading that may occur as a result of environmentally-induced phase drift.

Figure 29A:
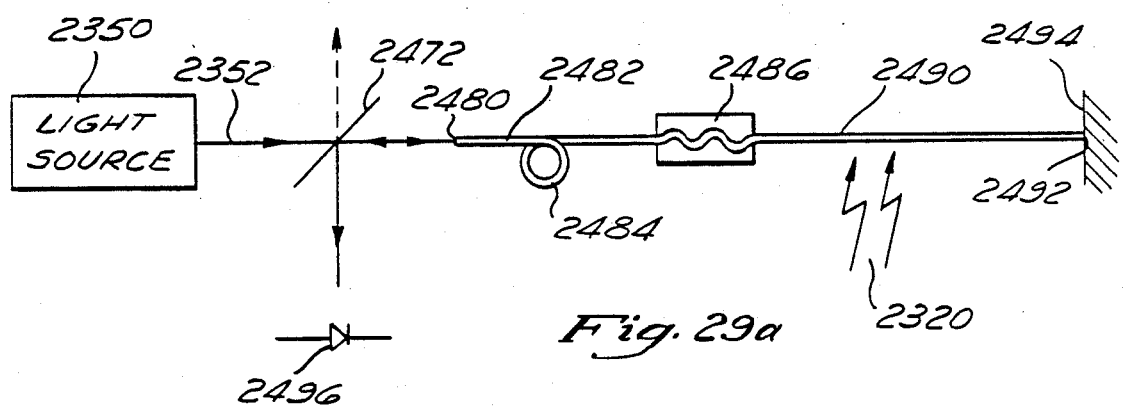
FIG. 29a illustrates an alternative embodiment of the interferometer of FIG. 27a that includes a reflective surface at one end of the sensing portion of the two-mode optical fiber so that only one inter-modal coupler is needed.

FIG. 29a illustrates an alternative interferometer in which only one inter-modal coupler 2312 and one mode stripper is required. In FIG. 29a, the source optical signal 2352 from the light source 2350 is directed toward a beam splitter 2470. A portion of the source optical signal 2352 passes through the beam splitter 2470 and is provided as an input to a first end portion 2480 of a highly elliptical core optical fiber 2482. A portion of the optical fiber 2482 proximate to the first end portion 2480 is formed into a mode stripper 2484, as described above. Another portion of the optical fiber 2482 is formed into an inter-modal coupler 2486 that is adjusted for 50% coupling. The mode splitter 2484 and the inter-modal coupler 2486 operate as described above such that optical energy that has passed through the mode splitter 2484 and the inter-modal coupler 2486 has substantially equal intensities in each of the $LP_{01}$ and the $LP_{11}$ even propagation modes. After passing through the inter-modal coupler 2486, the optical energy propagates in a sensing portion 2490 of the two-mode optical fiber 2482. The sensing portion 2490 is positioned so that it is perturbed by an external perturbation, such as an acoustic signal, temperature, or the like, represented by the arrows 2320, as before. The two-mode optical fiber 2482 has a second end portion 2492 that is terminated at a highly reflective surface 2494. The highly reflective surface 2494 can be a mirror, or the like, or it can advantageously be formed by polishing the second end portion 2492 of the optical fiber 2482 so that substantially all of the optical energy reaching the second end portion 2492 is reflected back into the sensing portion 2490 of the optical fiber 2482 and propagates toward the first end portion 2480. The reflected optical energy passes through the inter-modal coupler 2486 and the mode stripper 2484 and is emitted from the first end portion 2480. The optical energy emitted from the first end portion 2480 is directed by the beam splitter 2470 onto a detector 2496. The effect of the passage of the optical energy back through the inter-modal coupler 2486 and the mode stripper 2484 is substantially the same as the effect of the passage of the optical energy through the second inter-modal coupler 2410 and the second mode stripper 2412 in FIG. 27a. Thus, the optical energy detected by the detector 2496 will have a sinusoidal dependency upon the differential phase shift between the modes. The electrical output of the detector 2496 can be monitored and analyzed to determine the amount of phase shift and thus the magnitude of the perturbations to the sensing portion 2490 of the optical fiber 2482.

Figure 29B:
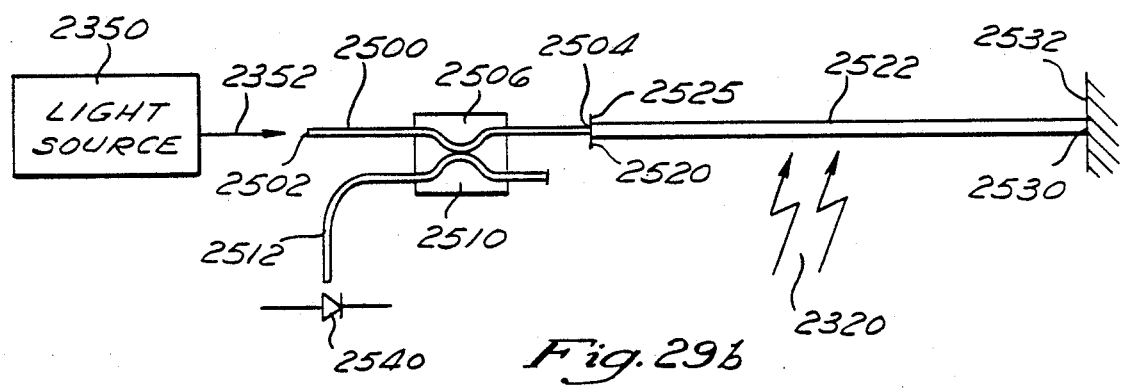

FIG. 29b illustrates a further alternative embodiment of an interferometer similar to the interferometer of FIG. 29a. In FIG. 29b, a single-mode optical fiber 2500, having a first end portion 2502, and a second end portion 2504 is provided. Intermediate the first end portion 2502 and the second end portion 2504, a portion of the first single-mode optical fiber 2500 is formed into a coupler half 2506 and is juxtaposed with a coupler half 2510 formed on a second single-mode optical fiber 2512. The coupler halves 2506 and 2510 are advantageously constructed in accordance with U.S. Pat. No. 4,536,058, as described above, and are adjusted to provide approximately 50% coupling between the first single-mode optical fiber 2500 and the second single-mode optical fiber 2512. The second end portion 2504 of the first single-mode optical fiber 2500 is juxtaposed with a first end portion 2520 of a highly elliptical core two-mode optical fiber 2522 at an offset splice 2524, such as was described above. The two-mode optical fiber 2522 has a second end portion 2530 that is terminated at a highly reflective surface 2532 that may advantageously be formed by polishing the second end portion 2530. In operation, the source optical signal 2352 from the light source 2350 is input into the first end portion 2502 of the first single-mode optical fiber 2500. At the coupler halves 2506, 2510, approximately 50% of the optical energy in the first single-mode optical fiber 2500 remains in the first single-mode optical fiber 2500 and is propagated to the second end portion 2504 at the offset splice 2524. At the offset splice 2524, the optical energy is coupled into the first end portion 2520 of the two-mode optical fiber 2522 with approximately equal intensities in each of the $LP_{01}$ and $LP_{11}$ even propagation modes of the two-mode optical fiber 2522. The optical energy propagates to the second end portion 2530 and is reflected back to the offset splice 2524 where the optical energy is coupled back to the first single-mode optical fiber 2500. The intensity of the optical energy coupled back to the first single-mode optical fiber 2500 will vary in accordance with the changes in the phase difference between the $LP_{01}$ and the $LP_{11}$ even propagation modes in the two-mode optical fiber 2522 caused by the external perturbations presented by the arrows 2320. Approximately 50% of the optical energy in the first single-mode optical fiber 2500 is coupled to the second single-mode optical fiber 2512 at the coupler halves 2506, 2510, and the coupled optical energy is emitted from the second single-mode optical fiber 2512 onto a detector 2540. The detector 2540 provides an electrical output signal that varies in accordance with the intensity of the optical energy incident upon it and thus varies in accordance with changes in the phase difference between the $LP_{01}$ and $LP_{11}$ even propagation modes in the two-mode optical fiber 2522 caused by the perturbations.

Figure 30:
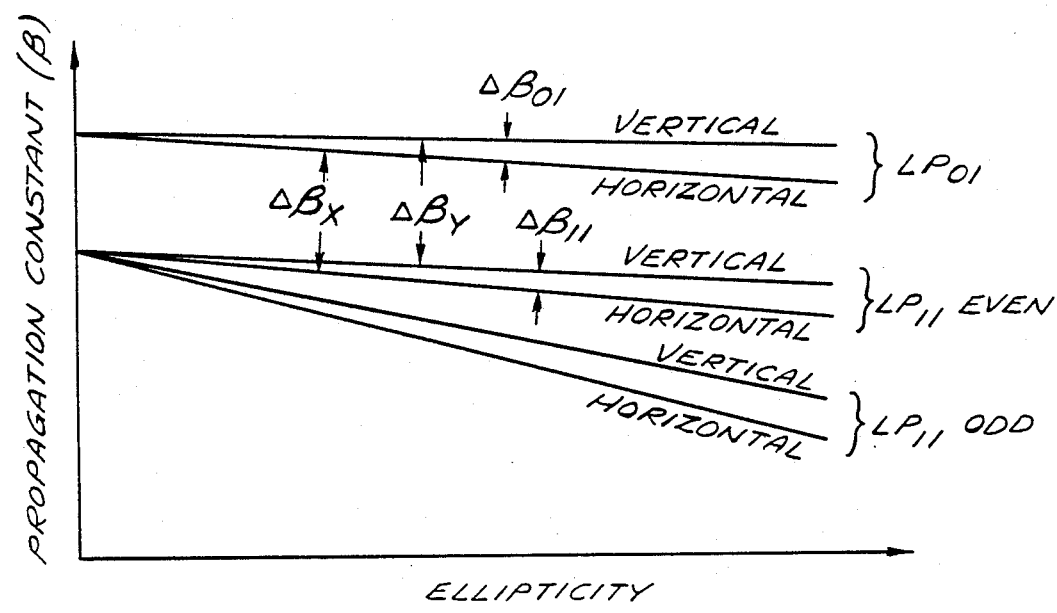
FIG. 30 illustrates the effect of increasing ellipticity on the propagation constants of the polarization modes within the spatial propagation modes of the highly elliptical core optical fiber.

Description of Inventions Utilizing Propagation Differences Between Polarizations in Two Spatial Modes Heretofore, only the differentiation in the propagation constants and thus the propagation velocities of the $LP_{01}$ mode and the even and odd $LP_{11}$ modes have been considered. However, within each of the spatial modes, there is also a difference between the propagation constants and velocities of the two polarization states within the modes that becomes more apparent as the ellipticity or other asymmetry in the core of the optical waveguide increases. This is illustrated in FIG. 30 which is an unscaled graph of the propagation constants versus ellipticity for the modes in a highly elliptical core optical waveguide such as was described in FIG. 5 and in FIGS. 6a–6h. As previously explained, the propagation constant for the $LP_{01}$ mode is greater than the propagation constant for the $LP_{11}$ mode. Furthermore, within the $LP_{11}$ mode, the propagation constant for the $LP_{11}$ even mode is greater than the propagation constant for the $LP_{11}$ odd mode. The difference in the propagation constant for the $LP_{11}$ odd and even modes allows an optical signal to be selected that has a wavelength that can propagate in the $LP_{11}$ even mode although it cannot propagate in the $LP_{11}$ odd mode. As further illustrated in the graph of FIG. 30, the propagation constant of the vertically polarized $LP_{01}$ mode of the elliptical core waveguide is larger than the propagation constant of the horizontally polarized $LP_{01}$ mode. (Horizontal and vertical are defined in accordance with the orientation of the elliptical core fiber as illustrated in FIGS. 6a–6h, such that the horizontally polarized light has its polarization axis aligned with the minor axis of the elliptical core and the vertically polarized light has its polarization aligned with the major axis of the elliptical core.) Similarly, the propagation constant of the vertically polarized $LP_{11}$ even mode is larger than the propagation constant of the horizontally polarized $LP_{11}$ even mode. Although exaggerated in FIG. 30 to emphasize the differences in the propagation constant, it should be understood that the differences in the propagation constants for the two polarization modes within each spatial propagation mode is typically much smaller than the difference in the propagation constants for the $LP_{01}$ and $LP_{11}$ spatial propagation modes. The two polarization modes in the $LP_{01}$ propagation mode and the two polarization modes in the $LP_{11}$ even mode provide a total of four propagation paths in an optical waveguide for an optical signal having a selected wavelength between the $LP_{11}$ even and the $LP_{11}$ odd cutoff wavelengths. Each of these four paths has a different propagation velocity and provides a different amount of optical phase delay for an optical signal propagating through the waveguide.

The operational characteristics of the above-described devices are based upon the difference in propagation constants between the light propagating in the $LP_{01}$ and $LP_{11}$ spatial propagation modes, as illustrated in FIGS. 4 and 30. The difference in propagation constants of the two polarizations for each of the two spatial modes can be advantageously used to provide additional devices. For example, the differences in propagation constants can be used to construct a polarization selector, a wavelength splitter and a strain gauge, as will be discussed hereinafter.

Description of a Polarization Selector

An exemplary polarization selector comprising an optical fiber 3000 is illustrated in FIG. 31. The optical fiber 3000 is preferably a two-mode optical fiber having a core geometry that is selected to support the fundamental spatial propagation mode and to support the $LP_{11}$ even spatial propagation mode at a predetermined optical wavelength. For example, the optical fiber 3000 advantageously has a highly elliptical core as discussed above. The optical fiber 3000 has an input end 3002. An optical signal source 3004 provides an optical input signal $W_I$ to the polarization selector at the predetermined optical wavelength that is input into the input end 3002 of the optical fiber 3000. The optical input signal $W_I$ comprises optical signal components at the predetermined optical wavelength. The optical input signal $W_I$ is preferably introduced into each eigenpolarization mode. This may be accomplished, for example, by polarizing the light with a polarizer 3006 so that the light transmitted by the polarizer 3006 is polarized along the polarization axis of the polarizer 3006. The input end 3002 of the optical fiber 3000 and the polarization axis of the polarizer 3006 are rotated with respect to each other so that the elliptical axes of the core of the optical fiber 3000 are oriented at 45° with respect to the polarization axis of the polarizer 3006.

The optical fiber 3000 has a strain portion 3010. As will be discussed below, the strain portion is selectively strained to adjust the length of the optical path through which the optical input signal $W_I$ propagates in the optical fiber 3000. This in turn introduces an optical phase difference between the light propagating in the two spatial propagation modes and the light propagating in the two eigenpolarization modes. The optical input signal $W_I$ is launched into the optical fiber 3000 in a manner so that when the optical input signal $W_I$ reaches the strain portion 3010, there will be substantially equal amounts of the light in the first and second order spatial propagation modes. This may be advantageously accomplished, for example, as illustrated above in connection with FIG. 25a or as illustrated above in connection with FIGS. 25b and 26. In FIG. 31, the equalization of the light in the spatial propagation modes is accomplished in accordance with FIG. 25a by using a mode stripper 3020 to strip off any optical energy in the input optical signal $W_I$ in the second order $LP_{11}$ mode so that the light exiting the mode stripper 3020 propagates only in the first order $LP_{01}$ mode. An inter-modal coupler 3022 is formed on the optical fiber 3000 following the mode stripper 3020. The inter-modal coupler 3022 is preferably adjusted so that approximately 50% of the optical energy in the $LP_{01}$ propagation mode is coupled to the $LP_{11}$ propagation mode. Thus, the light exiting the inter-modal coupler 3022 has substantially equal intensities in the $LP_{01}$ and the $LP_{11}$ propagation modes. Because of the selection of the wavelength of the optical input signal $W_I$ in accordance with the fiber geometry, the light propagates in only $LP_{11}$ even mode and not in the $LP_{11}$ odd mode. Alternatively, the optical input signal $W_I$ can be launched into a single mode fiber and then coupled to the optical fiber 3000 using an offset splice as was illustrated above in FIG. 25b.

As illustrated in FIG. 31, the strain portion 3010 of the optical fiber 3000 comprises the portion of the optical fiber 3000 after the inter-modal coupler 3022. The strain portion 3010 defines a portion of the optical fiber 3000 that can be stretched to vary the length of the strain portion 3010. Various means can be used to vary the length of the strain portion 3010. For example, as schematically illustrated in FIG. 31, the strain portion 3010 can be secured on a linear translation stage 3030 having a first clamp 3032 and a second clamp 3034 that are spaced apart by an adjustable difference D. The distance D between the clamps 3032, 3034 is advantageously increased in small increments to thereby adjust the length of the strain portion 3010 and thus adjust the overall length of the optical fiber 3000. The strain introduced by the length adjustment is designated as S and is also shown as being applied between the first clamp 3032 and the second clamp 3034. Other mechanical or electromechanical means can also be used for adjusting the length of the strain portion 3010.

For purposes of explaining the operation of the polarization selector, the apparatus in FIG. 31 includes an output end 3040 of the optical fiber 3000. An optical beam splitter 3042 is positioned proximate to the output end 3040 to divide the light output from the output end 3040 into two portions. One portion of the light is directed to a first polarization filter 3044 that transmits horizontally polarized light and blocks vertically polarized light. The other portion of the light is directed to a second polarization filter 3046 that transmits vertically polarized light and blocks horizontally polarized light. The horizontally polarized light transmitted by the first polarization filter 3044 is directed to a first offset detector 3050 that is positioned to detect light that is in a selected one of the upper or lower halves (i.e., the upper or lower lobe) of the output field intensity pattern. The first offset detector 3050 is a photodetector or the like that provides an electrical output signal $I_x$ that has a magnitude proportional to the intensity of the horizontally polarized light in the selected upper or lower lobe of the output intensity pattern. In like manner, a second offset detector 3052 is positioned to receive the vertically polarized light transmitted by the second polarization filter 3046 in one of the two halves (i.e., lobes) of the output field intensity pattern. The second offset detector 3052 provides an electrical output signal $I_y$ that has a magnitude proportional to the intensity of the vertically polarized light in the selected lobe of the output intensity pattern. It should be understood that as used hereinafter, $I_x$ and $I_y$ designate the respective intensities of the detected light or the electrical representations of the intensities as will be apparent from the context in which they are used.

Heretofore, the difference in propagation constants between the horizontally polarized light in each spatial mode and the vertically polarized light in each spatial mode have not been considered. In FIG. 31, however, the light propagating in the strain portion 3010 of the optical fiber 3000 comprises light in both spatial propagation modes and in both polarizations for each spatial propagation mode. As discussed above, the length of an optical fiber, such as the optical fiber 3000, can be adjusted so that the differential phase shift between the light propagating in the $LP_{01}$ spatial propagation mode and the light propagating in the $LP_{11}$ spatial propagation mode varies. For example, as illustrated in FIG. 24b, the differential phase shift can be adjusted to an even multiple of $\pi$ radians (i.e., $2N\pi$) so that the light in the optical fiber is concentrated in the upper lobe or adjusted to an odd multiple of $\pi$ radians (i.e., $(2N+1)\pi$) so that the light is concentrated in the lower lobe. When the light is propagating in both polarizations, as in the apparatus of FIG. 31, the adjustment of the optical path length to concentrate the light in one lobe for one polarization does not necessarily cause the light to be concentrated in the same lobe for the other polarization. This occurs because the difference in propagation constants between the two spatial propagation modes is not the same for both polarizations. This is illustrated in FIG. 30, wherein $\Delta B_x$ is the difference in propagation constants for the horizontally polarized light propagating in the $LP_{01}$ and the $LP_{11}$ spatial modes; and wherein $\Delta B_y$ is the difference in propagation constants for the vertically polarized light propagating in the $LP_{01}$ and the $LP_{11}$ spatial propagation modes. Although $\Delta B_x$ and $\Delta B_y$ are shown as approximately equal in FIG. 30, it should be understood that FIG. 30 is not drawn to scale and that the two propagation constant differences, $\Delta B_x$ and $\Delta B_y$, are generally unequal. Thus, when the length of the strain portion 3010 of the optical fiber 3000 is adjusted, the effect on the light propagating in the two polarizations is not the same. In addition, when an elliptical core fiber is strained, the induced differential phase shift between the $LP_{01}$ and the $LP_{11}$ even mode for one of the two polarizations is quite different from the induced differential phase shift between the two spatial modes for the other polarization. This difference between the two polarization modes is greater than would be expected to be caused by the change in fiber length alone and may be caused by an asymmetric stress that develops in the fiber when it is stretched. The differences in the effect of stretching the fiber on the two polarizations is used to advantage in the polarization detector to adjust the differential phase difference between the two spatial modes for each of the two polarizations.

Figure 32A:
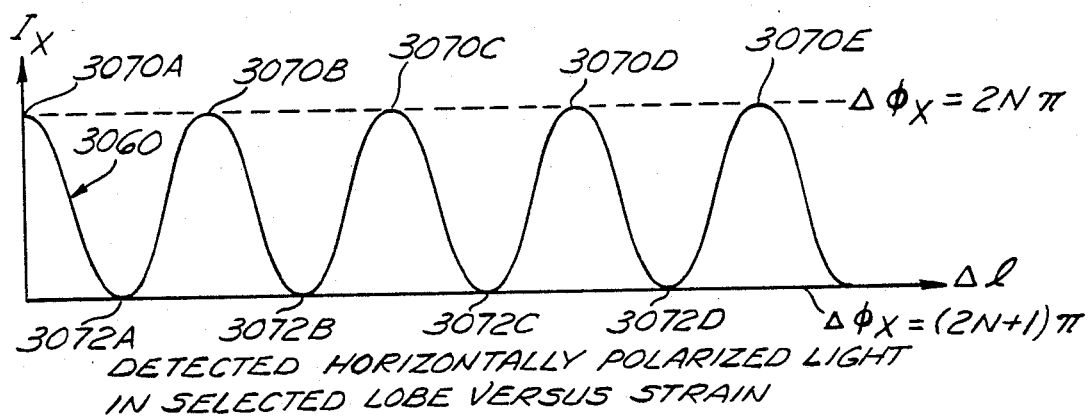
FIG. 32a and FIG. 32b are graphs of detected output light intensity in the horizontal polarization and vertical polarization, respectively, for the embodiment of FIG. 31, illustrating the periodic effect of strain on the two light intensities.
Figure 32B:
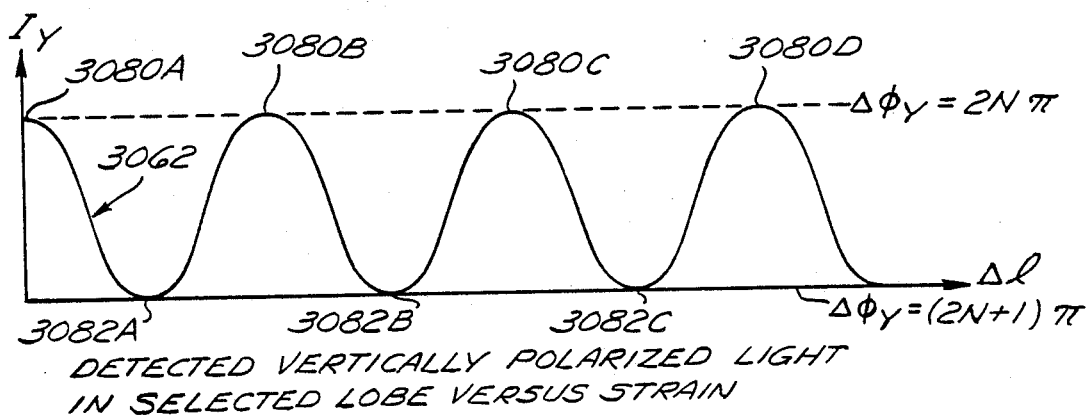

The foregoing is further illustrated in FIGS. 32a and 32b which are graphs of the optical output intensity detected by the first detector 3050 and the second detector 3052, respectively, versus the applied strain $\Delta l$. A curve 3060 in FIG. 32a graphically represents the intensity $I_x$ of the horizontally polarized light in the selected lobe as detected by the first detector 3050. The intensity $I_x$ is represented along the vertical axis, and the strain applied to the fiber resulting in a change in the overall length $\Delta l$ is represented along the horizontal axis. Similarly, FIG. 32b illustrates a curve 3062 which is a graphical representation of the intensity $I_y$ of the vertically polarized light versus the strain $\Delta l$.

In each graph of FIGS. 32a and 32b, the detected intensity represents the intensity of the light in the selected half of the output intensity pattern, which is in turn determined by the phase relationship between the light in the $LP_{01}$ spatial propagation mode and the light in the $LP_{11}$ spatial propagation mode for the respective polarization. For example, when the first detector 3050 is positioned to receive the light in the upper half of the output intensity pattern for the horizontally polarized light, as was illustrated above in FIG. 24b, a set of maxima 3070A, B, C, D and E of the curve 3060 in FIG. 32a represent the phase relationship wherein the difference in phase between the light in the $LP_{01}$ spatial propagation mode and the $LP_{11}$ spatial propagation mode of the horizontally polarized light is an even multiple of $\pi$ (i.e., $\Delta\phi_x = 2N\pi$, as represented by the leftmost intensity pattern in FIG. 24b). A set of minima 3072A, B, C and D of the curve 3060 in FIG. 32a represent the phase relationship wherein the difference in phase between the light in the $LP_{01}$ spatial propagation mode and the $LP_{11}$ spatial propagation mode is an odd multiple of $\pi$ (i.e., $\Delta\phi_x = (2N+1)\pi$), as represented by the rightmost intensity pattern in FIG. 24b). In like manner, a set of maxima 3080A, B, C and D of the curve 3062 of FIG. 32b represent phase differences of even multiples of $\pi$ (i.e., $\Delta\phi_y = 2N\pi$) for the vertically polarized light, and a set of minima 3082A, B and C represent phase differences of odd multiples of $\pi$ (i.e., $\Delta\phi_y = (2N+1)\pi$) for the vertically polarized light.

It can be seen by comparing the graphs of FIG. 32a and FIG. 32b that the optical intensities in the selected lobes change at different rates for the two different polarizations as the strain portion 3010 of the is stretched. For example, it can be seen that for the exemplary fiber 3000, the rate of change of the intensity $I_x$ of the horizontally polarized light versus $\Delta l$ is greater than the rate of change of the intensity $I_y$ of the vertically polarized light. In the example of FIGS. 32a and 32b, both curves 3060 and 3062 have initial peak intensities represented by maxima 3070A and 3080A, respectively, for an exemplary magnitude of $\Delta l$. (This magnitude of $\Delta l$ does not necessarily correspond to zero strain.) As $\Delta l$ is increased, by stretching the strain portion 3010 of the optical fiber 3000, for example, the intensities of the detected light represented by both curves 3060 and 3062 decrease and increase periodically. However, the intensities do not increase and decrease at the same rate. For example, when the intensity of the horizontally polarized light is at the third maxima 3070C, the intensity of the vertically polarized light is at the second minima 3082B. Thus, by selectively varying the strain by varying the length D of the strain portion 3010 of the optical fiber 3000, the intensities of the light in the two lobes for each of the two polarizations can be varied so that substantially all of the light in one polarization (e.g., the horizontal polarization) is in one of the two lobes (e.g., the upper lobe) and substantially all the light in the other polarization (e.g., the vertical polarization) is in the other of the two lobes (e.g., the lower lobe). Depending upon the relative rates of change of the two intensities with respect to the applied strain, the polarization of the light in the two lobes can be reversed. For example, if the strain is adjusted so that the intensity of the detected light in the upper lobe for the vertically polarized light is at the maximum 3080B, the intensity of the horizontally polarized light in the upper lobe is close to the minimum 3072B indicating that a substantial portion of the horizontally polarized light is in the lower lobe of the output intensity pattern.

It can be seen from the foregoing that the apparatus of FIG. 31 can be used as a polarization selector by selectively adjusting the strain applied to the strain portion 3010 of the optical fiber 3000. The strain is adjusted to that the light in the two spatial propagation modes for one of the two polarization orientations (e.g., the horizontal polarization) has a even multiple of $\pi$ phase difference (i.e., $\Delta\phi_x = 2N\pi$) and so that the light in the two spatial propagation modes for the other of the two polarization orientations (e.g., the vertical polarization) has an odd multiple of $\pi$ phase difference (i.e., $\Delta\phi_y = (2N+1)\pi$). Thus, light having one of the two polarizations (e.g., the horizontal polarization) will be concentrated in the upper lobe and the light having the other of the two polarizations (e.g., the vertical polarization) will be concentrated in the lower lobe. As discussed above, the relative rates of the periodicities of the two polarizations will determine whether 100% separation of the two polarizations is achievable for a particular wavelength of light.

FIG. 33 illustrates an alternative embodiment of an apparatus for demonstrating the operation of the polarization selector of the present invention. As in the FIG. 31, the apparatus of FIG. 33 includes a polarization selector that comprises an optical fiber 3200. The optical fiber has an input end 3202, a strain portion 3210 and an output end 3240. The apparatus of FIG. 33 further includes an optical signal source 3204; a polarizer 3206; a mode stripper 3220; and an inter-modal coupler 3222. The length of the strain portion 3210 is adjustable as before. The means for adjusting the length of the strain portion is illustrated by a strain device 3242 which may advantageously be a translation table or other known means for stretching an optical fiber. As before, the optical fiber 3200 is two-mode at the wavelength of the light provided by the light source 3204. The polarizer 3206, the mode stripper 3220 and the inter-modal coupler 3222 operate as before to couple light into the strain portion of the optical fiber 3200 in the two polarizations of the first and second order spatial propagation modes. The length of the strain portion 3210 is adjustable to vary the phase differences between the two spatial propagation modes for each of the two polarizations. The light output from the output end 3240 is coupled to a first single mode optical fiber 3250 and a second single mode optical fiber 3252 having respective input ends 3254 and 3256 positioned proximate to the output end 3240 of the two mode optical fiber 3200. Each of the two single mode optical fibers 3250, 3252 is offset from the center of the two-mode optical fiber 3200. As illustrated in the schematic cross section of FIG. 34, core at the input end 3254 of the first single mode optical fiber 3250 is positioned proximate to the lower half of the core of the output end 3240 of the two-mode optical fiber 3200 and is thus positioned proximate to the lower lobe of the output intensity pattern of the light exiting from the two-mode optical fiber 3200. The core of the input end 3256 of the second single mode optical fiber 3252 is positioned proximate to the upper half of the core of the output end 3240 of the two-mode optical fiber 3200 and is thus positioned proximate to the upper lobe of the output intensity pattern. By adjusting the length of the strain portion 3210, as discussed above, the light of one polarization in the lower lobe will enter the first single mode fiber 3250 and propagate therein, and the light of the other polarization in the upper lobe will enter the second single mode fiber 3252 and propagate therein. For example, as illustrated, the first optical fiber 3250 is shown as propagating the light having the horizontal polarization as represented by the intensity $I_x$, and the second optical fiber 3252 is shown as propagating the light having the vertical polarization as represented by the intensity $I_y$. The polarizations can be interchanged by further adjusting the length of the strain portion 3210.

Figure 35:
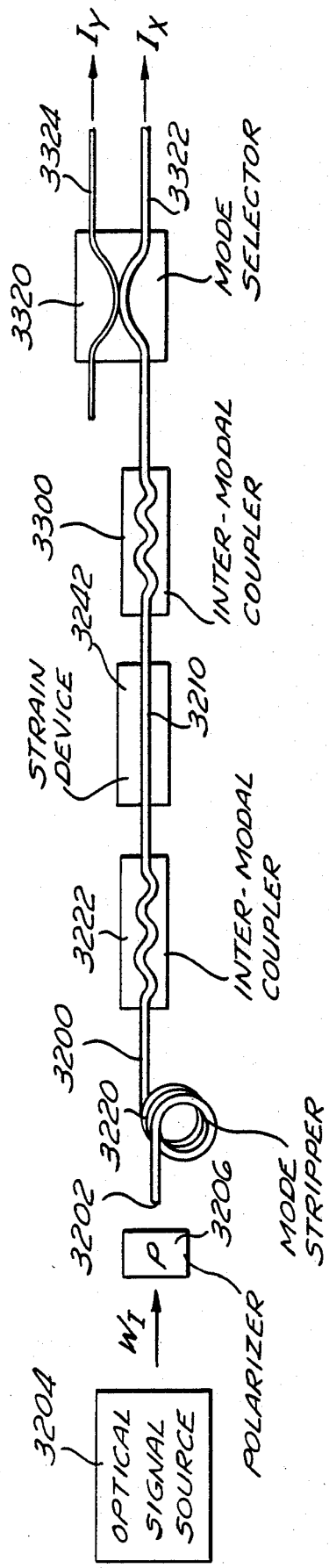
FIG. 35 illustrates an alternative embodiment of a polarization selector in which a second inter-modal coupler and a mode selector are used to separate the light in the two polarization modes.

FIG. 35 illustrates a further alternative embodiment of an apparatus for demonstrating the operation of the polarization selector of the present invention. In FIG. 35, like elements are numbered as in FIG. 33. Rather than coupling the output of the two-mode optical fiber 3200 to a pair of single-mode optical fibers, as in FIG. 33, the apparatus of FIG. 35 includes a second inter-modal coupler 3300 which is formed on the optical fiber 3200 after the strain portion 3210. The inter-modal coupler 3300 is advantageously constructed in accordance with FIG. 9. The optical energy entering the inter-modal coupler 3300 from the strain portion 3210 of the optical fiber 3000 includes light that is propagating in the $LP_{01}$ spatial propagation mode and light that is propagating in the $LP_{11}$ spatial propagation mode for each of the two orthogonal polarizations. As discussed above, the inter-modal coupler 3300 is reciprocal and operates to combine the light in the two spatial propagation modes. As is known in the art, the mode to which the light is coupled and combined depends upon the phase relationship between the two modes upon entry into the inter-modal coupler 3300. The inter-modal coupler 3300 introduces a $+\pi/2$ phase difference in light that is coupled from one spatial propagation mode to the other spatial propagation mode. Thus, light that is propagating in one spatial propagation mode with a $-\pi/2$ phase difference with respect to the other spatial propagation mode will constructively interfere when coupled to the other spatial propagation mode. For example, when the phase of the light propagating in the $LP_{01}$ spatial propagation mode for a particular polarization leads the phase of the light propagating in the $LP_{11}$ spatial propagation mode by $\pi/2$ for that same polarization, the light in the $LP_{11}$ spatial propagation mode will couple to the $LP_{01}$ spatial propagation mode and constructively interfere so that the light output from the inter-modal coupler for that particular polarization will be in the $LP_{01}$ spatial propagation mode. On the other hand, when the phase of the light propagating in the $LP_{01}$ spatial propagation mode for a particular polarization lags the phase of the light propagating in the $LP_{11}$ spatial propagation mode by $\pi/2$ for that same polarization, the light in the $LP_{01}$ spatial propagation mode will couple to the $LP_{11}$ spatial propagation mode and constructively interfere so that the light output from the inter-modal coupler for that particular polarization will be in the $LP_{11}$ spatial propagation mode. Thus, by selectively adjusting the length of the strain portion 3210 of the optical fiber 3200 so that for one of the two polarizations, the phase of the light in the $LP_{01}$ spatial propagation mode leads the phase of the light in the $LP_{11}$ spatial propagation mode by $\pi/2$, and so that for the other polarization, the phase of the light in the $LP_{11}$ spatial propagation mode leads the phase of the light in the $LP_{01}$ spatial propagation mode by $\pi/2$, the light exiting from the inter-modal coupler 3300 to the output end 3240 of the optical fiber 3200 will comprise light in one spatial propagation mode having the vertical polarization and light in the other spatial propagation mode having the horizontal polarization. By selectively varying the length of the strain portion 3210 of the optical fiber 3200 so that the phase differences vary, the polarizations of the light output from the optical fiber 3200 in the two spatial propagation modes can be switched. Thus, for one length of the strain portion 3210 the $LP_{01}$ spatial propagation mode will be vertically polarized and the $LP_{11}$ spatial propagation mode will be horizontally polarized. For a second length of the strain portion 3210, the $LP_{01}$ spatial propagation mode will be horizontally polarized and the $LP_{11}$ spatial propagation mode will be vertically polarized.

The two polarizations can be selectively routed to a pair of output fibers, for example, by including a mode selector 3320 which is positioned on the optical fiber 3200 after the inter-modal coupler 3300. Such a mode selector is described above in connection with FIGS. 13–20b. The mode selector 3320 has a first output fiber segment 3322 which is an extension of the two-mode optical fiber 3200 through the mode selector 3320 and has a second output fiber segment 3324 that is preferably a single-mode optical fiber to which a portion of the optical signals that enter the mode selector 3320 are coupled within the mode selector 3320. As discussed above, the mode selector 3320 operates to couple the light entering the mode selector in the $LP_{11}$ mode to the single-mode optical fiber 3324 while light entering the mode selector 3320 in the $LP_{01}$ mode remains in the first output fiber segment 3322 of the two-mode optical fiber 3200. Since the light propagating in the $LP_{01}$ spatial propagation mode has one polarization and the light propagating in the $LP_{11}$ spatial propagation mode has the other polarization, the light in the first output fiber segment 3322 will have one of the polarizations (e.g., horizontal, as represented by the intensity $I_x$) and the light in the second output fiber segment 3324 will have the other polarization (e.g., vertical, as represented by the intensity $I_y$). The two polarizations can be interchanged by introducing an additional phase difference in the strain portion 3210 so that the spatial propagation mode that previously led the other spatial propagation mode in phase by $\pi/2$, now lags, and vice versa. For example, if the phase of the light in the $LP_{01}$ spatial propagation mode initially leads the phase of the light in the $LP_{11}$ spatial propagation mode by $\pi/2$, increasing the phase difference by $\pi$ will cause the phase of the light in the $LP_{11}$ spatial propagation mode to lead the phase of the light in the $LP_{01}$ spatial propagation mode by $\pi/2$.

Description of a Wavelength Splitter

Figure 36:
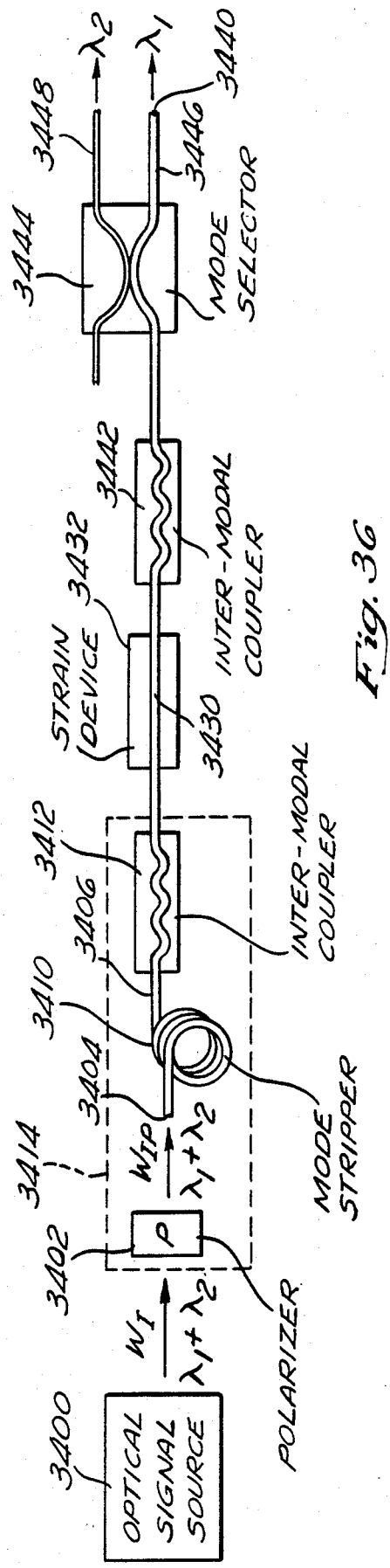
FIG. 36 illustrates an embodiment of a wavelength splitter that utilizes the difference in propagation characteristics between the $LP_{01}$ and $LP_{11}$ propagation modes for a selected polarization.

FIG. 36 illustrates a wavelength splitter in accordance with the present invention. The wavelength splitter of FIG. 36 operates on a pair of input wavelengths having the same polarization and splits the two wavelengths so that one wavelength propagates in a first output fiber and so that the other wavelength propagates in a second output fiber. An optical signal source 3400 represents the source of an optical signal $W_I$ having a first wavelength $\lambda_1$ and a second wavelength $\lambda_2$. The optical signal source 3400 can represent an arbitrary optical system in which the optical signal $W_I$ having the two wavelengths is generated. The optical signal $W_I$ should be in a selected one of the polarizations (i.e., either the vertical polarization or the horizontal polarization using the conventions discussed above). If necessary, a polarizer 3402 can be included between the optical signal source 3400 and the input end 3404 of a two-mode optical fiber 3406 to assure that only light of one polarization is coupled into the apparatus. The polarized light is illustrated by a polarized signal $W_{IP}$. The polarized optical signal $W_{IP}$ is input into the input end 3404 of the two-mode optical fiber 3406.

Each of the two wavelengths $\lambda_1$ and $\lambda_2$ should be distributed substantially equally between the $LP_{01}$ and the $LP_{11}$ spatial propagation modes. If the optical signal source 3400 does not provide the optical signal $W_I$ in that condition, one of the above-described apparatus and methods for equalizing the optical energy in the two spatial propagation modes can be advantageously used. For example, a mode stripper 3410 is advantageously positioned on the optical fiber 3406 proximate to the input end 3404 to remove any light originally in the $LP_{11}$ mode. The mode stripper 3410 is followed by an inter-modal coupler 3412 set for 50% coupling to equalize the light in the two spatial propagation modes. The mode stripper 3410, the inter-modal coupler 3412 and the polarizer 3402 are enclosed within a dashed block 3414 to indicate that one or more of the components are optional depending upon the condition of the optical signal generated by the signal source 3400.

As before, the two-mode optical fiber 3406 preferably has a highly elliptical core or other suitable geometry to assure that the light propagating therein propagates in only the first order $LP_{01}$ spatial propagation mode and in only one stable intensity pattern of the second order $LP_{11}$ spatial propagation mode. It should be understood that if the components in the block 3414 are included, they can be formed directly on the optical fiber 3406, as previously discussed.

The optical fiber 3406 includes a strain portion 3430 having a length that can be selectively varied by a strain device 3432, such as a translation table, as discussed above. The optical fiber 3406 has an output end 3440. Between the strain portion 3430 and the output end 3440, a second inter-modal coupler 3442 is formed on the fiber 3406, followed by a mode selector 3444, both of which are advantageously constructed as discussed above. For example, the mode selector 3444 includes a first output segment 3446, which is preferably an extension of the two-mode optical fiber 3420, and a second output segment 3448, which is preferably a single-mode optical fiber.

The apparatus of FIG. 36 operates in a similar manner to the apparatus of FIG. 35. In particular, when the phase of the light entering the inter-modal coupler 3442 in the $LP_{01}$ spatial propagation mode leads the phase of the light entering the inter-modal coupler 3442 in the $LP_{11}$ spatial propagation mode by $\pi/2$, the light in the $LP_{11}$ spatial propagation mode is coupled to the $LP_{01}$ spatial propagation mode where it constructively interferes to provide a single output signal in the $LP_{01}$ spatial propagation mode. Conversely, when the phase of the light entering the inter-modal coupler 3442 in the $LP_{11}$ spatial propagation mode leads the phase of the light entering the inter-modal coupler 3442 in the $LP_{01}$ spatial propagation mode by $\pi/2$, the light in the $LP_{01}$ spatial propagation mode is coupled to the $LP_{11}$ spatial propagation mode where it constructively interferes to provide a single output signal in the $LP_{11}$ spatial propagation mode. Thus, by selectively adjusting the length of the strain portion 3430 of the optical fiber 3200, the phase difference between the two spatial propagation modes can be varied to control whether the light is coupled to the $LP_{01}$ spatial propagation mode or the $LP_{11}$ spatial propagation mode.

Figure 37A:
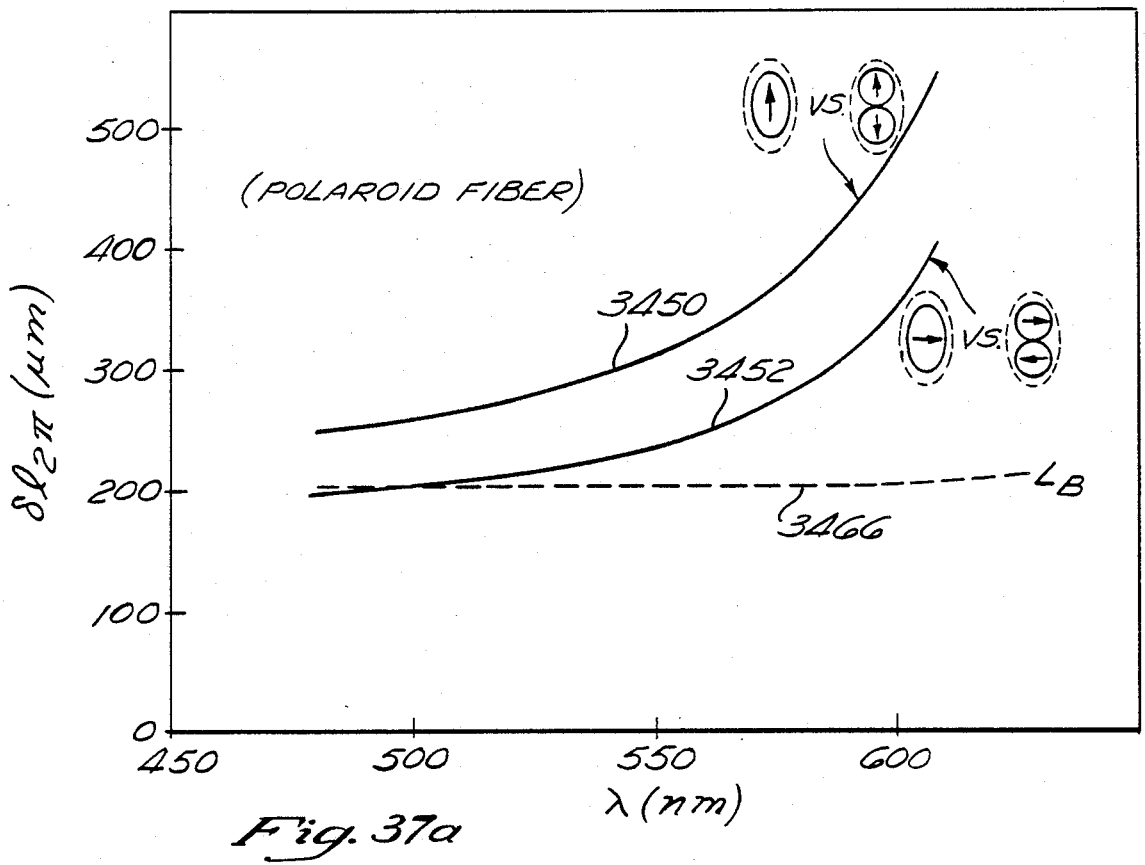
FIG. 37a and FIG. 37b are graphs that illustrate the effect of optical wavelength on the amount of strain required to cause an additional $2\pi$ difference in the phase between the $LP_{01}$ and $LP_{11}$ spatial propagation modes for two different fibers and for the two polarization modes for each fiber.
Figure 37B:
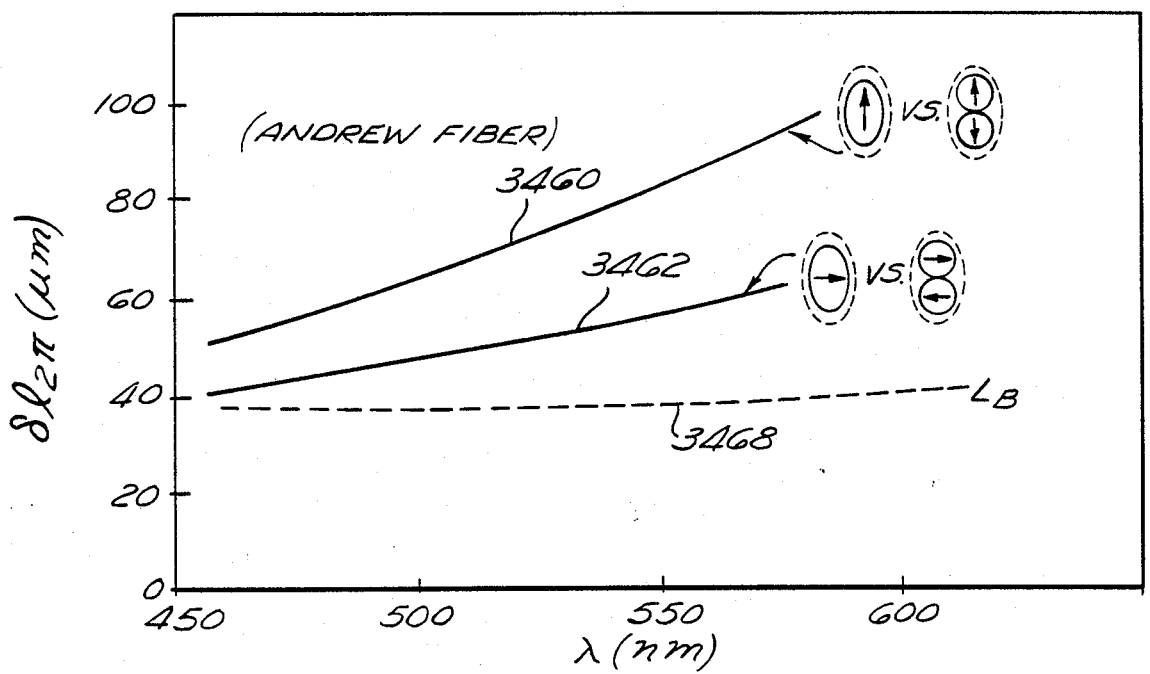

Unlike the polarization selector described above, the apparatus of FIG. 36 depends on a differential effect on the phase difference for the light in the two wavelengths. It can be shown, for example, that a given change in the length of the strain portion 3430 will cause a change in the phase difference between the $LP_{01}$ mode and the $LP_{11}$ mode for the light of the wavelength $\lambda_1$ that is different from the change in the phase difference between the $LP_{01}$ mode and the $LP_{11}$ mode for the light of the wavelength $\lambda_2$ caused by the same change in length of the strain portion. This is shown in FIGS. 37a and 37b which illustrate pairs of curves that relate the change in length required to cause a $2\pi$ differential phase shift between the $LP_{01}$ and the $LP_{11}$ modes versus the wavelength for the two orthogonal polarizations for exemplary two-mode optical fibers having highly elliptical cores. The vertical axis of each graph is labeled as $\delta l_{2\pi}$ and represents the length by which the strain portion 3430 of each fiber must be stretched in order to obtain an additional $2\pi$ differential phase delay between the two modes. The horizontal axis of each graph is the wavelength of the light propagating in the fiber. The information in FIG. 37a is provided for an exemplary elliptical core optical fiber from Polaroid Corporation having a major axis length of 4.1 microns, a minor axis length of 2.24 microns, and a normalized core-cladding refractive index difference (i.e., $(n_{coren-cladding})/n_{core}$) of 0.0031. The information in FIG. 37b is provided for an exemplary elliptical core optical fiber from Andrew Corporation having a major axis length of 2.69 microns, a minor axis length of 1.23 microns, and a normalized core-cladding refractive index difference of 0.033. The upper curve in each pair of curves represents the relationship for the vertical polarization and the lower curve represents the relationship for the horizontal polarization. The pictorial representations of the polarizations are positioned proximate to the respective curves for convenience in identifying the polarizations. Thus, in FIG. 37a, an upper curve 3450 represents the relationship between the strain required to introduce an additional $2\pi$ phase shift for the light in the two spatial modes when the light is vertically polarized; and a lower curve 3452 represents the relationship between the strain required to introduce an additional $2\pi$ phase shift for the light in the two spatial modes when the light is horizontally polarized. Similarly, in FIG. 37b, an upper curve 3460 represents the relationship between the strain required to introduce an additional $2\pi$ phase shift for the light in the two spatial modes when the light is vertically polarized; and a lower curve 3462 represents the relationship between the strain required to introduce an additional $2\pi$ phase shift for the light in the two spatial modes when the light is horizontally polarized. In FIG. 37a, a dashed line 3466 represents the beat length $L_B$ between the two spatial propagation modes, when the fiber is free from strain, which is relatively constant and which is substantially the same for both polarizations. In like manner a dashed line 3468 in FIG. 37b represents the beat length $L_B$ between the two spatial propagation modes for the Andrew Corporation fiber. In both cases, it can be seen that the amount of strain required to introduce an additional $2\pi$ phase difference for the horizontally polarized light is approximately equal to the beat length without strain at the shorter wavelengths and increases with increasing wavelength.

It can be seen from FIGS. 37a and 37b, that for both polarizations of both fibers, the change in length required to introduce an additional $2\pi$ phase difference between the two spatial propagation modes increases as the wavelength of the light increases. Thus, as the length of the strain portion 3430 is selectively changed, the light propagating in the two spatial propagation modes at a lower wavelength will undergo an additional $2\pi$ phase difference before the light propagating in the two spatial propagation modes at a higher wavelength.

Returning now to FIG. 36, the foregoing relationship between the two wavelengths is used to advantage to separate the two wavelengths. The length of the strain portion 3430 is adjusted so that, for the light entering the inter-modal coupler 3432 at the wavelength $\lambda_1$, the phase of the light propagating in the $LP_{01}$ mode leads the phase of the light propagating in the $LP_{11}$ mode by a phase difference substantially equal to $\pi/2$. At the same time, the length of the strain portion 3430 is adjusted so that, for the light entering the inter-modal coupler 3432 at the wavelength $\lambda_2$, the phase of the light propagating in the $LP_{11}$ mode leads the phase of the light propagating in the $LP_{01}$ mode by a phase difference substantially equal to $\pi/2$. Thus, as previously discussed, the inter-modal coupler 3432 will operate to couple the light at the wavelength $\lambda_1$ to the $LP_{01}$ mode and to couple the light at the wavelength $\lambda_2$ to the $LP_{11}$ mode. The light in the two spatial propagation modes is then separated by the mode selector 3434, as before, so that the light output from the mode selector 3434 via the first output fiber segment 3446 comprises light in the $LP_{01}$ propagation mode at the first wavelength $\lambda_1$, and so that the light output via the second output fiber segment 3448 comprises light in the $LP_{11}$ propagation mode at the second wavelength $\lambda_2$. By selectively adjusting the length of the strain portion 3430, as discussed above, the phase differences for the light in the two spatial propagation modes for the two wavelengths can be varied so that the light output from the first output fiber segment 3446 comprises light in the $LP_{01}$ spatial propagation mode at the second wavelength $\lambda_2$ or so that the light output from the second output fiber segment 3448 comprises light in the $LP_{01}$ spatial propagation mode at the first wavelength $\lambda_1$. Thus, it can be seen that the apparatus of FIG. 36 operates as a wavelength splitter/selector.

Description of an Exemplary Strain Gauge

Figure 38:
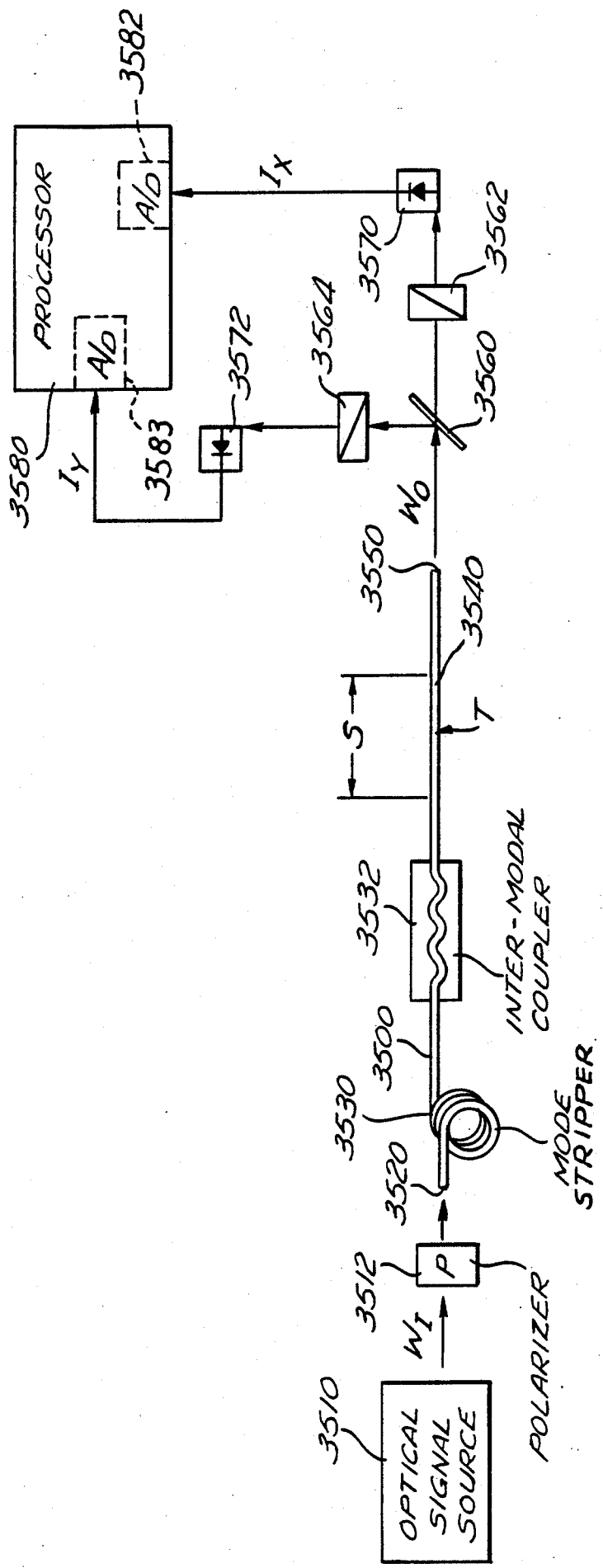
FIG. 38 illustrates an embodiment of an exemplary strain gauge that utilizes the differences in propagation characteristics between the spatial propagation modes and between the polarizations for each spatial propagation mode to detect both strain and temperature.

FIG. 38 illustrates an exemplary strain gauge that incorporates a highly elliptical core two-mode optical fiber 3500 such as has been described above. The strain gauge of FIG. 38 includes an optical signal source 3510 which, in the embodiment described herein, is an Argon laser, a diode laser, or the like. The light from the signal source 3510 is preferably passed through a polarizer 3512 or other suitable means for polarizing the light from the signal source 3510 so that it is oriented along the axis of polarization of the polarizer 3512. The polarized light is then directed into an input end 3520 of the optical fiber 3500. The light in the optical fiber 3500 is caused to propagate substantially equally in the two orthogonal polarization modes. This is accomplished in the embodiment of FIG. 38 by orienting the input end 3520 of the optical fiber 3500 so that the axes of the elliptical core are at 45° angles to the axis of polarization of the polarizer 3512. Preferably, the light is coupled into the core of the optical fiber 3500 so that the light propagates with substantially equal intensity in both the first order $LP_{01}$ spatial propagation mode and the second order $LP_{11}$ spatial propagation mode. In the embodiment illustrated in FIG. 38, the portion of the optical fiber 3500 proximate to the input end 3520 is formed into a mode stripper 3530 which strips off light in the second order $LP_{11}$ spatial propagation mode so that only light in the first order $LP_{01}$ spatial propagation mode remains. The light in the $LP_{01}$ mode is then passed through an intermodal coupler 3532 which is adjusted to couple approximately 50% of the light to the $LP_{11}$ mode, as desired. Thus, the light propagating in the optical fiber 3500 after passing through the mode stripper 3530 and the inter-modal coupler 3532 will comprise light having substantially equal intensities in each of the two spatial propagation modes in each of the two orthogonal polarizations.

The light exiting the inter-modal coupler 3532 then passes through a strain portion 3540 of the optical fiber 3500. The strain portion 3540 is subjectable to a strain S to be measured by the apparatus. The strain portion 3540 is also subjectable to an ambient temperature effect illustrated by an arrow T. The apparatus is advantageously usable, for example, to measure a very small strain represented by the strain S. The optical fiber 3500 includes an output end 3550. The light passing through the strain portion 3540 exits the optical fiber 3500 via the output end 3550 as an output light signal $W_O$. The output light signal $W_O$ is split into two substantially equal portions by a beam splitter 3560 that directs a first portion to a first polarizer 3562 that selectively transmits the horizontally polarized portion of the light incident thereto and selectively blocks the vertically polarized light. In like manner, the beam splitter 3560 directs a second portion of the light to a second polarizer 3564 that selectively transmits vertically polarized light and blocks horizontally polarized light. It should be understood that the beam splitter 3560 and the two polarizers 3562 and 3564 can be replaced by a polarization beam splitter to accomplish the same result. The horizontally polarized light transmitted by the first polarizer 3562 is directed onto a first offset detector 3570 that is positioned to receive the light in either the upper lobe or the lower lobe of the output intensity pattern of the horizontally polarized light, as discussed above in connection with the interferometers. In like manner the vertically polarized light is directed to a second offset detector 3572 that is positioned to receive the light in either the upper lobe or the lower lobe of the output intensity pattern of the vertically polarized light. The optical fiber 3500 thus operates as two independent interferometers with one interferometer operating with the horizontally polarized light and the other interferometer operating with the vertically polarized light.

It can shown that under a stable ambient temperature, the intensity $I_x$ of the horizontally polarized light detected by the first detector 3570 can be given by:

$$I_x \sim 1 + C \cos(2\pi(\delta l/\delta l_{2\pi}^x) + \phi_0^x) \quad (15)$$

where $\delta l$ is the fiber elongation, $\phi_0^y$ is the unperturbed phase difference between the two spatial modes at the output end 3550 of the optical fiber 3500, and $\delta l_{2\pi}^x$ is the fiber elongation required to introduce an additional $2\pi$ phase difference between the two spatial propagation modes, as discussed above in connection with FIGS. 37a and 37b. C is a constant (less than 1) that represents the electrical fringe visibility which is dependent on the launching conditions and the detector area and location. In like manner, the intensity $I_y$ of the horizontally polar-ized light detected by the second detector 3572 can be given by:

$$I_y \sim 1 + C \cos(2\pi(\delta l/\delta l_{2\pi}^y) + \phi_0^y) \quad (16)$$

where $\delta l$ is the fiber elongation, $\phi_0^x$ is the unperturbed phase difference between the two spatial modes at the output end 3550 of the optical fiber 3500, and $\delta l_{2\pi}^y$ is the fiber elongation required to introduce an additional $2\pi$ phase difference between the two spatial propagation modes.

As discussed above in connection with FIGS. 32a and 32b, the rate at which the intensity $I_x$ varies in response to fiber elongation differs from the rate at which the intensity $I_y$ varies in response to fiber elongation. Thus, two different interferometers can be provided in the same optical fiber 3500. By making use of the two interferometers, the apparatus of FIG. 38 monitors the strain and ambient temperature simultaneously. The change in the relative phase between the first and second order spatial propagation modes for each polarization, $\delta(\Delta\phi_x)$ and $\delta(\Delta\phi_y)$, due to both length and temperature changes, $\delta l$ and $\delta T$, can be expressed as, $$\begin{bmatrix} \delta(\Delta\phi_x) \\ \delta(\Delta\phi_y) \end{bmatrix} = \begin{bmatrix} 2\pi/\delta l_{2\pi}^x & 2\pi/\delta T_{2\pi}^x \\ 2\pi/\delta l_{2\pi}^y & 2\pi/\delta T_{2\pi}^y \end{bmatrix} \begin{bmatrix} \delta l \\ \delta T \end{bmatrix} \quad (17)$$

where $\delta l_{2\pi}^x$ and $\delta l_{2\pi}^y$ as defined above, and where $\delta T_{2\pi}^x$ and $\delta T_{2\pi}^y$ are the changes in temperature required to introduce an additional $2\pi$ phase difference between the two spatial propagation modes for the horizontal and vertical polarizations, respectively. These four parameters can be determined experimentally under controlled conditions, and, for a given strain/temperature gauge will be constants for the equation.

As long as the determinant of the matrix of the equation is non-zero, the equation can be inverted, and both $\delta l$ and $\delta T$ can be explicitly found from measured values of $\delta(\Delta\phi_x)$ and $\delta(\Delta\phi_y)$. Thus, the ambient temperature changes and strain can be independently and simultaneously measured because strain and temperature changes affect the two polarization interferometers differently. Exemplary Mach-Zehnder interferometers and polarimetric strain sensors known to the art typically have large sensitivities to strain which unfortunately cannot be differentiated from temperature changes. This limits the practicality of such types of strain gauges. In principle, an exemplary two-core fiber strain sensor can overcome the temperature sensitivity problem; however, in order to manufacture such a two-core fiber strain sensor precise control of the critical fiber parameters in the manufacturing process is required. In contrast, the simple two-mode fiber strain gauge of FIG. 38 has special significance in the practicality. The simultaneous measurements of both strain and temperature effects enables the strain effects to be distinguished from the temperature effects and provides the measurement of the temperature change as a useful additional measurement.

As illustrated in FIG. 38, the electrical output signal $I_x$ from the first detector 3570 and the electrical output signal $I_y$ from the second detector 3572 are provided as inputs to a processor 3580. The processor 3580 can advantageously be an analog processor or a digital processor. In preferred embodiments, the processor 3580 is a digital processor having analog-to-digital convertors (A/D 3582 and A/D 3583 in FIG. 38) that convert the electrical representations of the light intensities $I_x$ and $I_y$ to digital magnitudes. The processor 3580 is programmed to solve Equation (17) in a known manner. The detailed construction of a processor such as the processor 3580 is known to the art. For example, the processor 3580 can be a conventional microprocessor-based computer, such as the IBM ® PC, or the like, with a commercially available data acquisition board included therein. The programming of the processor 3580 to solve Equation (17) can be accomplished in a known manner in any one of a number of programming languages (FORTRAN, BASIC, Pascal, or the like).

The apparatus of FIG. 38 is particularly advantageous because of its accuracy. As illustrated in FIGS. 37a and 37b, the elongation required to produce a $2\pi$ differential phase shift between the two spatial modes can be about as small as the beat length between them. This can range from a few tens of microns up to a few hundred microns using typical fiber parameters. Consequently, highly elliptical core two-mode fiber strain sensors can potentially have resolutions covering more than an order of magnitude of range depending on the requirements for the particular application. The resolutions achievable from fibers having beat lengths on the short end of this spectrum is only one order of magnitude larger than that for two fiber interferometers, and length changes as small as a fraction of an angstrom can be detected.

Figures 39, 40:
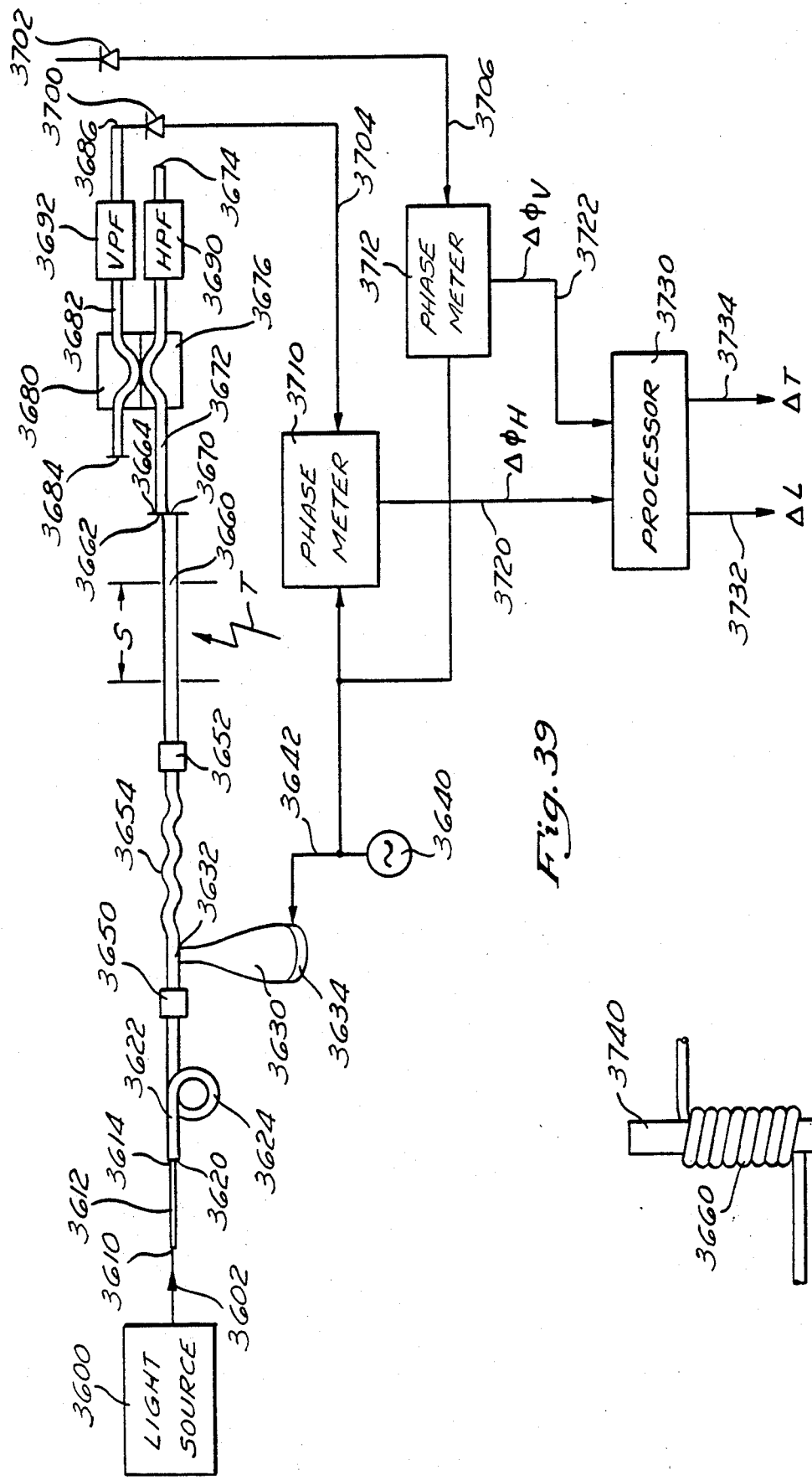
FIG. 39 illustrates an alternative embodiment of a strain gauge constructed in accordance with the present invention in which a frequency shifter and a lock-in amplifier are used to detect strain and temperature.
FIG. 40 illustrates the sensing portion of the strain gauge of FIG. 39 wrapped around a mandrel to provide a temperature sensing function.

Description of an Alternative Embodiment of a Strain Gauge Using a Frequency Shifter An alternative embodiment of an exemplary strain gauge constructed in accordance with the present invention is illustrated in FIG. 39. The strain gauge includes a light source 3600 (e.g., a laser light source, a broadband light source such as a superluminescent diode, or the like) that produces a source optical signal 3602. The source optical signal 3602 is directed into the first end portion 3610 of a first single-mode optical fiber 3612. The first single-mode optical fiber 3612 has a second end portion 3614 that is butt-spliced to a first end portion 3620 of a two-mode optical fiber 3622 that has a highly elliptical core such as has been previously discussed. Preferably, the first single-mode optical fiber 3612 and the two-mode optical fiber are aligned so that substantially all of the optical energy coupled to the two-mode optical fiber 3622 from the first single-mode optical fiber 3612 is in the $LP_{01}$ propagation mode; however, a portion of the two-mode optical fiber 3622 proximate to the first end portion 3620 is formed into a mode stripper 3624 to remove substantially all of any optical energy that may be coupled to the $LP_{11}$ propagation mode.

After forming the mode stripper 3624, a portion of the two-mode optical fiber 3622 is formed into a frequency shifter by bonding the optical fiber 3622 to a transducer 3630 at a location 3632. The transducer 3630 is preferably constructed in accordance with FIG. 12 above and includes a piezoelectric acoustic signal generator 3634 that is electrically driven by the output of a signal source 3640 via a line 3642. The acoustic signal generator 3634 generates acoustic signals that are propagated by the transducer 3630 to the location 3632 on the optical fiber 3622. The acoustic waves induce traveling microbends into the optical fiber 3622 that travel away from the location 3632. The traveling microbends are suppressed in the portion of the optical fiber 3622 between the location 3632 and the mode stripper 3624 by a first acoustic damper 3650. A second acoustic damper 3652 is located on the optical fiber 3622 at a distance away from the location 3632 in the opposite direction from the first acoustic damper 3650. A frequency shifter portion 3654 of the optical fiber 3622 is defined between the location 3632 and the second acoustic damper 3652 that provides a propagation medium for the traveling microbends induced in the optical fiber 3622 by the transducer 3630. Approximately fifty percent of the optical energy traveling in the $LP_{01}$ propagation mode in the optical fiber 3622 upon entry to the frequency shifter portion 3654 is coupled to the $LP_{11}$ propagation mode and is shifted in frequency by an amount determined by the frequency of the electrical signal generated by the signal source 3640.

After passing through the frequency shifter portion 3654, the frequency shifted optical energy in the $LP_{11}$ propagation mode and the optical energy in the $LP_{01}$ propagation mode at the original optical frequency then enters a strain gauge portion 3660 of the optical fiber 3622 between the second acoustic damper 3652 and a second end portion 3662 of the two-mode optical fiber 3622. The strain gauge portion 3660 is subjected to a strain, represented by S in FIG. 40, and may also be subjected to an additional environmental perturbation, such as temperature changes, represented by the arrows labeled as T.

The second end portion 3662 of the two-mode optical fiber 3622 forms part of an offset splice 3664 along with a first end portion 3670 of a second single-mode optical fiber 3672. The second single-mode optical fiber 3672 has a second end portion 3674. A first coupler half 3676 is formed on the second single-mode optical fiber 3672 at a location between the first end portion 3670 and the second end portion 3674. The first coupler half 3676 is juxtaposed with a second coupler half 3680 formed on a third single-mode optical fiber 3682 between a first end portion 3684 and a second end portion 3686. The first coupler half 3676 and the second coupler half 3680 are preferably adjusted so that approximately 50% of the optical energy propagating in the second single-mode optical fiber 3672 from the first end portion 3670 is coupled to the third single-mode optical fiber 3682, and approximately 50% of the optical energy remains in the second single-mode optical fiber 3672.

The optical energy propagating in each of the second single-mode optical fibers 3672 and the third single-mode optical fiber 3682 after passing through the coupler halves 3676, 3680 comprises optical energy in both the vertically polarized $LP_{01}$ mode and the horizontally polarized $LP_{01}$ mode. A first polarization filter (HPF) 3690 is positioned on the second single-mode optical fiber 3672 between the first coupler half 3676 and the second end portion 3674. The first polarization filter 3690 is oriented to pass only optical energy in the horizontally polarized $LP_{01}$ mode. Similarly, a second polarization filter (VPF) 3692 is positioned on the third single-mode optical fiber 3682 between the second coupler half 3680 and the second end portion 3686, and is oriented to pass only optical energy in the vertically polarized $LP_{01}$ mode. The coupler halves 3676, 3680 and the polarization filters 3690, 3692 can be replaced with other known polarization beam splitters.

The second end portion 3674 of the second single-mode optical fiber 3672 is positioned proximate to a first detector 3700, and the second end portion 3686 of the third single-mode optical fiber 3682 is positioned proximate to a second detector 3702. The first detector 3700 provides an electrical output signal on a line 3704 that is responsive to the intensity of the optical energy in the horizontally polarized $LP_{01}$ propagation mode in the second single-mode optical fiber 3672. The second detector 3702 provides an electrical output signal on a line 3706 that is responsive to the intensity of the optical energy in the vertically polarized $LP_{01}$ propagation mode in the third single-mode optical fiber 3682. Both of the electrical output signals will include components caused by the effects of the frequency shifter, the effects of any strain applied to the strain gauge portion 3660, and the effects of any changes in the temperature. The electrical output of the first detector 3700 on the line 3704 is provided as an input to a first phase meter 3710, and the electrical output of the second detector 3702 on the line 3706 is provided as an input to a second phase meter 3712. The first phase meter 3710 has an input from the signal source 3640 and provides an output signal $\Delta\phi_H$ on a line 3720 that represents the changes in differential phase between the horizontally polarized $LP_{01}$ and $LP_{11}$ modes in the strain portion 3660 of the optical fiber 3622 caused by the effects of strain and the effects of temperature changes. Similarly, the second phase meter 3712 has an input from the signal source 3640 and provides an output signal $\Delta\phi_V$ on a line 3722 that represents the changes in the differential phase between the vertically polarized $LP_{01}$ and $LP_{11}$ modes in the strain portion 3660 of the optical fiber 3622 caused by the effects of strain and the effects of temperature changes. The phase meters 3710 and 3712 are conventional phase meters and may comprise lock-in amplifiers operating as phase meters, time-interval counters or other devices that provide outputs representing the differential phase between their inputs.

The strain gauge of FIG. 39 operates in accordance with the same principles as the strain gauge in FIG. 38, except that the optical energy in the $LP_{11}$ mode (approximately fifty percent of the optical energy) is shifted in frequency by the acoustic frequency provided by the signal generator 3640. Therefore, the output signals detected by the detectors 3700 and 3702 are time-varying signals as a result of beating between the $LP_{01}$ and $LP_{11}$ modes in the respective polarizations. The phases of the these beat signals (at the acoustic frequency) represent the differential phases between the $LP_{01}$ and $LP_{11}$ modes at the output of the two-mode fiber 3622.

Both the strain S and the temperature T will cause changes in the length of the optical paths through the strain gauge portion 3660 and will thus cause changes in the phase delays through the strain gauge portion 3660. Thus, it would be expected that one would not be able to differentiate the effects of changes in the temperature T from the effects of the strain. However, it has been found that the changes in the phase delay caused by temperature changes affect both the vertically polarized optical energy and the horizontally polarized optical energy substantially equally over a relatively wide range of temperatures. In contrast, the changes in phase delay caused by strain (i.e., by changing the overall length of the strain gauge portion 3660 of the optical fiber 3614) have a greater effect on one polarization than on the other polarization. This can be better understood by the following equations:

$$\Delta\phi_H = A\Delta L + B\Delta T \quad (18)$$

$$\Delta\phi_V = C\Delta L + D\Delta T \quad (19)$$

where $\Delta L$ is the change in the length caused by strain applied to the strain gauge portion 3660 of the two-mode optical fiber 3614; $\Delta T$ is the change in the temperature applied to the strain gauge portion 3660 of the two-mode optical fiber 3614; and the constants A, B, C, and D are experimentally determined as part of a calibration procedure for the strain gauge of FIG. 39. It can be seen that Equations (18) and (19) are equivalent to the matrix Equation (17) above.

The output signals $\Delta\phi_H$ and $\Delta\phi_V$ on the lines 3720 and 3722, respectively, are provided as inputs to a processor 3730 that calculates $\Delta L$ and $\Delta T$ using Equations (18) and (19) above, and provides an output signal representing $\Delta L$ on a line 3732 and an output representing $\Delta T$ on a line 3734. The processor 3730 can advantageously be a digital processor having one or more analog-to-digital converters to convert the analog input signals on the lines 3720 and 3722 to digital representations. The processor 3730 can apply one of a number of known algorithms for solving the two equations (15 and 16) for two unknown values ($\Delta L$ and $\Delta T$), provided that AD-BC is non-zero. AD-BC should be nonzero for the present invention because the temperature affects $\Delta\phi_H$ and $\Delta\phi_V$ differently than the strain affects $\Delta\phi_H$ and $\Delta\phi_V$.

As set forth above, although the strain gauge portion 3660 is sensitive to temperature, the sensitivity is relatively small compared to its sensitivity to strain. Thus, the $\Delta T$ output on the line 3734 does not provide a very sensitive temperature indication. The strain gauge of FIG. 39 can also be used as a sensitive temperature sensor by wrapping the strain gauge portion 3660 of the optical fiber 3614 around a mandrel 3740, as illustrated in FIG. 40. The mandrel 3740 is constructed from a material that expands and contracts in accordance with its temperature. The expansion and contraction of the mandrel 3740 causes changes in the length of the strain gauge portion 3660 of the optical fiber 3614 that are detectable as set forth above. The processor 3730 can be calibrated so that the $\Delta L$ output is responsive to the changes in temperature of the mandrel 3740.

While preferred embodiments of this invention have been disclosed herein, those skilled in the art will appreciate that changes and modifications may be made therein without departing from the spirit and the scope of this invention, as defined in the appended claims.

What is claimed is:

1. An apparatus, comprising:
    an optical waveguide having a core with a non circular cross section; and
    a source of light for introducing light signals having at least one wavelength into the wavelength for propagation therein, such that a substantial portion of the light is at one or more wavelengths less than a first predetermined cutoff wavelength of said waveguide to cause the waveguide to guide light in both a fundamental spatial propagation mode and a higher order spatial propagation mode;
    said waveguide being sized to provide a second predetermined cutoff wavelength for said signals, less than the first predetermined cutoff wavelength, the noncircular cross section of the core having cross-sectional dimensions selected such that light guided by the waveguide in the higher order mode at wavelengths greater than the second predetermined cutoff wavelength propagates in only a single, stable, spatial intensity pattern, substantially all of the light signals introduced into the waveguide by said source of light being at one or more wavelengths greater that the second predetermined cutoff wavelength to cause said light signals to propagate in only one spatial intensity pattern for the higher order mode.

2. The apparatus defined by claim 1, wherein the fundamental spatial mode includes two polarization modes, the cross-sectional dimensions of the core further selected to cause the polarization modes of the fundamental mode to be non-degenerate.

3. The apparatus defined by claim 2, wherein the single intensity pattern of the higher order spatial mode includes two polarization modes, the cross-sectional dimensions of the core further selected to cause these polarization modes to be non-degenerate.

4. The apparatus of claim 1, additionally comprising:
means for introducing light into said waveguide such that said light propagates in two spatial modes of said waveguide, and such that said light propagates through a sensing section of the waveguide for exposure to an ambient effect;
means for detecting light output from said sensing section, said detecting means including a photodetector arranged to intercept only a selected portion of the spatial intensity pattern defined by a superposition of the spatial intensity patterns of the two modes, said selected portion of said spatial intensity pattern including substantial portions of light from both of said two spatial modes such that said intensity pattern of said selected portion varies in response to said ambient effect.

5. The apparatus of claim 4, wherein said detecting means further includes another photodetector arranged to intercept another portion of the spatial intensity pattern, and a comparing apparatus for comparing the output of the two photodetectors.

6. The apparatus of claim 5, wherein said introducing means comprises an optical frequency shifter and a signal generator for driving the frequency shifter, and wherein said detecting means further comprises a comparing apparatus for comparing the output of the two photodetectors.

7. The apparatus of claim 6, wherein said detecting means further comprises an amplifier which detects the output of the comparing apparatus in accordance with the frequency of the signal source.

8. The apparatus of claim 4, wherein said introducing means comprises an optical frequency shifter which couples light input into one of the two modes to the other of the two modes and shifts the coupled light in frequency.

9. The apparatus of claim 8, wherein said frequency shifter comprises an optical fiber and a generator for introducing flexural wave in said fiber.

10. The apparatus of claim 4, additionally comprising a splitting device which splits said selected portion of said spatial intensity pattern into two light beams, a first polarizer for polarizing one of said beams to produce a first light signal, said photodetector positioned to receive said first light signal, a second polarizer for polarizing the other of said beams to produce a second light signal, a second photodetector for receiving said second light signal, said polarizers oriented such that said first and second signals have orthogonal polarizations, and a comparing device for comparing the outputs of the photodetectors.

11. The apparatus of claim 10, wherein said two spatial modes comprise said fundamental mode and said higher order mode, said signal intensity pattern of the higher order mode including two polarization modes, said fundamental mode also including two polarization modes, the cross-sectional dimensions of the core further selected to cause both sets of polarization modes to be non-degenerate.

12. The apparatus of claim 11, wherein said introducing means comprises a frequency shifter for coupling frequency shifted light from one of the two spatial modes to the other, a generator for driving the frequency shifter at a frequency, and a device for synchronously detecting the output of the comparing device in accordance with the frequency of the generator.

13. The apparatus of claim 12, wherein said waveguide comprises an optical fiber and said ambient effect comprises a strain on said optical fiber.

14. The apparatus of claim 13, wherein said optical fiber is wrapped on an expandable member to cause said strain.

15. The apparatus of claim 14, wherein said member expands in response to temperature.

16. The apparatus of claim 4, wherein said waveguide comprises a multimode optical fiber.

17. The apparatus of claim 16, wherein said detecting means further includes a mode selector for selectively coupling one of said two modes from said multimode fiber, after propagation of said light through said sensing section, said photodetector positioned to receive light from the single mode fiber.

18. The apparatus of claim 16, wherein said introducing means comprises a single mode optical fiber, butt coupled to introduce light into said multimode fiber, said single mode fiber having a central axis which is offset from the central axis of said multimode fiber to cause the light entering the multimode fiber to be split between said two modes of said multimode fiber.

19. The apparatus of claim 18, additionally comprising a coupler, positioned on said single mode fiber, and a reflector positioned at the output of the sensing section for reflecting said light after propagation through said sensing section such that it passes back through said sensing section, and through said coupler, said photodetector positioned to receive light from said coupler.

20. The apparatus of claim 16, wherein said ambient effect comprises a strain on said optical fiber.

21. The apparatus of claim 16, wherein said introducing means comprises a modal coupler at the input to said sensing section of said multimode fiber to split said light between said two modes of said multimode fiber.

22. The apparatus of claim 21, additionally comprising a reflector for reflecting said light after propagation through said sensing section such that it passes back through said sensing section and back through said modal coupler.

23. The apparatus of claim 22, wherein said detecting means additionally comprises a mode stripper for stripping one of said modes from said fiber prior to reaching said photodetector.

24. The apparatus of claim 23, wherein said detecting means further includes a modal coupler at the output of said sensing section for coupling light between said two modes prior to reaching said mode selector.

25. The apparatus of claim 23, wherein said detecting means further includes a single mode fiber butt coupled to receive light from the multimode fiber, said single mode fiber having a central axis which is offset from the central axis of the multimode fiber to cause the light entering the single mode fiber to include substantial portions of light from both of said two modes.

26. The apparatus of claim 25, wherein said detecting means further includes a single source for driving said frequency shifter and an amplifier for synchronously detecting the photodetector output in accordance with the frequency of the signal source.

27. An apparatus, comprising:
an optical waveguide having a core with a noncircular cross section; and
a source of light for introducing light signals having at least one wavelength into the waveguide for propagation therein, such that a substantial portion of the light is at one or more wavelengths less than a first predetermined cutoff wavelength of said waveguide to cause the waveguide to guide light in both a fundamental spatial propagation mode and a higher order spatial propagation mode;
wherein said waveguide is sized to provide a second predetermined cutoff wavelength for said signals, less than the first predetermined cutoff wavelength, the noncircular cross section of the core having cross-sectional dimensions selected such that light guided by the waveguide in the higher order mode at wavelengths greater than the second predetermined cutoff wavelength propagates in only a single, stable, spatial intensity pattern, substantially all of the light signals introduced into the waveguide by said source of light being at one or more wavelengths greater than the second predetermined cutoff wavelength to cause said light signals to propagate in only one spatial intensity pattern for the higher order mode; and
wherein the waveguide comprises an optical fiber, the fundamental mode being the $LP_{01}$ mode of the optical fiber and the higher order mode being the $LP_{11}$ mode of the optical fiber, the single intensity pattern being the even mode intensity pattern of the $LP_{11}$ mode.

28. The apparatus defined by claim 27, wherein the core of the optical fiber has an elliptical cross section.

29. The apparatus defined by claim 27, additionally comprising means for inducing a periodic stress in the optical fiber at intervals related to the beat length between the fundamental mode and the higher order mode such that light is cumulatively coupled between the fundamental and higher order modes at said intervals.

30. The apparatus defined by claim 29, wherein the stress inducing means induces microbends into the fiber.

31. The apparatus defined by claim 27, additionally comprising a periodic structure for applying force to the fiber to induce static microbends in the fiber at intervals defined by the beat length between the fundamental mode and the higher order mode such that light is cumulatively coupled between the modes at said intervals.

32. An apparatus, comprising:
an optical waveguide having a core with a noncircular cross section; and
a source of light for introducing light signals having at least one wavelength into the waveguide for propagation therein, such that a substantial portion of the light is at one or more wavelengths less than a first predetermined cutoff wavelength of said waveguide to cause the waveguide to guide light in both a fundamental spatial propagation mode and a higher order spatial propagation mode;
wherein said waveguide is sized to provide a second predetermined cutoff wavelength for said signals, less than the first predetermined cutoff wavelength, the noncircular cross section of the core having cross-sectional dimensions selected such that light guided by the waveguide in the higher order mode at wavelengths greater than the second predetermined cutoff wavelength propagates in only a single, stable, spatial intensity pattern, substantially all of the light signals introduced into the waveguide by said source of light being at one or more wavelengths greater than the second predetermined cutoff wavelength to cause said light signals to propagate in only one spatial intensity pattern for the higher order mode; and
wherein the waveguide comprises an optical fiber, said apparatus additionally comprising:
a generator for producing a traveling flexural wave which propagates in said optical fiber, the energy of said traveling flexural wave confined to said optical fiber and having a wavelength in the direction of propagation selected in accordance with a beat length for two modes of the fiber to cause light to be cumulatively coupled from one of the modes to the other of the modes and shifted in frequency.

33. The apparatus of claim 32, wherein said flexural wave forms a series of microbends which propagate in the fiber.

34. An apparatus, comprising:
an optical waveguide having a core with a noncircular cross section; and
a source of light for introducing light signals having at least one wavelength into the waveguide for propagation therein, such that a substantial portion of the light is at one or more wavelengths less than a first predetermined cutoff wavelength of said waveguide to cause the waveguide to guide light in both a fundamental spatial propagation mode and a higher order spatial propagation mode;
wherein said waveguide is sized to provide a second predetermined cutoff wavelength for said signals, less than the first predetermined cutoff wavelength, the noncircular cross section of the core having cross-sectional dimensions selected such that light guided by the waveguide in the higher order mode at wavelengths greater than the second predetermined cutoff wavelength propagates in only a single, stable, spatial intensity pattern, substantially all of the light signals introduced into the waveguide by said source of light being at one or more wavelengths greater than the second predetermined cutoff wavelength to cause said light signals to propagate in only one spatial intensity pattern for the higher order mode; and
wherein said waveguide comprises a first optical fiber, said apparatus additionally comprising a second optical fiber which is dissimilar to the first fiber, said second fiber having at least one spatial propagation mode, only two of the modes of the fibers having matching propagation velocities, one of the matching modes being in the first fiber and the other being in the second fiber, said fibers juxtaposed to form an interaction region in which light is transferred between their cores, the proximity of the fiber cores at the interaction region selected such that light propagating in one of the matching modes in one of the fibers is coupled to the other of the fibers, the remainder of the modes all having mismatched propagation velocities such that the propagation velocity of each of the mismatched modes differs sufficiently from all of the other modes to prevent substantial optical coupling between any of the mismatched modes.

35. The apparatus defined by claim 34, wherein the cores of each of the fibers have a cross section which is substantially the same inside the interaction region as outside the interaction region.

36. The apparatus defined by claim 35, wherein the second fiber is a single mode fiber.

37. The apparatus defined by claim 35, wherein the length of the interaction region is at least an order of magnitude larger than the maximum cross sectional core dimension of either of the fibers.

38. The apparatus of claim 34, additionally comprising a grating reflector disposed at a location on the first fiber, the grating reflector having a spatial periodically selected to couple light having a predetermined wavelength between one of the mismatched modes and one of the matched modes, both of these modes being in the first fiber.

39. An apparatus, comprising:
an optical waveguide having a core with a noncircular cross section; and
a source of light for introducing light signals having at least one wavelength into the waveguide for propagation therein, such that a substantial portion of the light is at one or more wavelengths less than a first predetermined cutoff wavelength of said waveguide to cause the waveguide to guide light in both a fundamental spatial propagation mode and a higher order spatial propagation mode;
wherein said waveguide is sized to provide a second predetermined cutoff wavelength for said signals, less than the first predetermined cutoff wavelength, the noncircular cross section of the core having cross-sectional dimensions selected such that light guided by the waveguide in the higher order mode at wavelengths greater than the second predetermined cutoff wavelength propagates in only a single, stable, spatial intensity pattern, substantially all of the light signals introduced into the waveguide by said source of light being at one or more wavelengths greater than the second predetermined cutoff wavelength to cause said light signals to propagate in only one spatial intensity pattern for the higher order mode; and
wherein said waveguide comprises a first optical fiber, said apparatus additionally comprising a second optical fiber which is dissimilar to said first optical fiber, said fibers juxtaposed to form an interaction region for coupling light exclusively between a selected spatial mode in the first fiber and a selected spatial mode in the second fiber, one of the selected modes being of a higher order than the other of the selected modes, the length of the interaction region being at least an order of magnitude greater than the maximum cross sectional dimension of the core of either of the fibers, and each of the fibers having a cross sectional area which is substantially the same within the interaction region as outside the interaction region.

40. An apparatus, comprising:
an optical waveguide having a core with a noncircular cross section; and
a source of light for introducing light signals having at least one wavelength into the waveguide for propagation therein, such that a substantial portion of the light is at one or more wavelengths less than a first predetermined cutoff wavelength of said waveguide to cause the waveguide to guide light in both a fundamental spatial propagation mode and a higher order spatial propagation mode;
wherein said waveguide is sized to provide a second predetermined cutoff wavelength for said signals, less than the first predetermined cutoff wavelength, the noncircular cross section of the core having cross-sectional dimensions selected such that light guided by the waveguide in the higher order mode at wavelengths greater than the second predetermined cutoff wavelength propagates in only a single, stable, spatial intensity pattern, substantially all of the light signals introduced into the waveguide by said source of light being at one or more wavelengths greater than the second predetermined cutoff wavelength to cause said light signals to propagate in only one spatial intensity pattern for the higher order mode;
wherein the fundamental spatial mode includes two polarization modes, the cross-sectional dimensions of the core further selected to cause the polarization modes of the fundamental mode to be non-degenerate;
wherein the single intensity pattern of the higher order spatial mode includes two polarization modes, the cross-sectional dimensions of the core further selected to cause these polarization modes to be non-degenerate; and
wherein the non-degeneracy between the polarization modes of the fundamental mode and higher order mode produces a beat length between polarization modes on the order of 10 cm or less, for both sides of polarization modes.

41. An optical apparatus, comprising:
an optical waveguide comprising first and second propagation modes having first and second propagation constants, respectively, said first propagation constant different from said second propagation constant such that light in said first mode propagates at a different velocity than light in said second mode, said light being comprised of first and second components having first and second characteristics, respectively, a portion of each of said components propagating in each of said propagation modes, said first component in said first propagation mode being in phase with said first component in said second propagation mode at a predetermined location on said fiber, said second component in said first mode being out of phase with said second component in said second mode at said predetermined location; and
first and second propagation paths coupled to receive said light from said predetermined location of said waveguide such that (1) said first component of said first mode and said first component of said second mode are combined in one of said first and second paths, and (2) said second component of said first mode and said second component of said second mode are combined into the other of said first and second paths, thereby separating light having said first characteristics from light having said second characteristic.

42. An apparatus as defined by claim 41, wherein said first characteristics is a first wavelength and said second characteristic is a second wavelength.

43. An apparatus as defined by claim 43, wherein said first and second components have the same polarization.

44. An apparatus as defined by claim 41, wherein said first characteristic is a first polarization and said second characteristic is a second polarization.

45. An apparatus as defined in claim 44, wherein said first and second components have the same wavelength.

46. An apparatus as defined by claim 41, wherein said waveguide has a noncircular core.

47. An apparatus as defined by claim 46, wherein the cross-sectional dimensions of said noncircular core are selected to cause light in the higher order of said modes to propagate in a single stable intensity pattern.

48. An apparatus as defined in claim 41, wherein said first and second propagation paths comprise said first and second modes of said waveguide and wherein said propagation paths are coupled to receive said light from said waveguide by a modal coupler disposed at said predetermined location.

49. An apparatus as defined by claim 48, wherein said modal coupler comprises a series of microbends formed in said fiber.

50. An apparatus as defined by claim 48, additionally comprising a mode selector for coupling only one of said first and second modes to a second waveguide.

51. An apparatus as defined by claim 41, additionally comprising a mechanism for stretching said fiber to control the phase relationship of said components at said coupling location.

52. An apparatus as defined by claim 41, wherein said propagation paths are formed by a pair of fibers disposed at said predetermined location.

53. An apparatus as defined by claim 52, wherein said light at said predetermined location in said waveguide is spatially separated into two lobes, and wherein an end of each of said pair of fibers is positioned to receive light from said lobes.

54. An apparatus comprising:
  an optical waveguide having a non-circular core, said core being sized to have dimensions that are selected so that said waveguide propagates light in a predetermined wavelength range such that the light having a wavelength within said predetermined wavelength range propagates in a fundamental spatial propagation mode and in a second order spatial propagation mode, each of said fundamental spatial propagation mode and said second order spatial propagation mode supporting the propagation of light in first and second orthogonal polarization modes;
  a light source that introduces light into said optical waveguide at a waveguide within said predetermined wavelength range to propagate in said waveguide in both of said fundamental and second order spatial propagation modes and in both of said two polarization modes within each of said spatial propagation modes;
  means optically coupled to said waveguide for separating said light after passing through said optical waveguide into a first portion having said first polarization and a second portion having said second polarization, each of said first and second portions including light in said first and second spatial propagation modes; and
  a detection system that detects the intensity of the light in said first and second portions, the intensity of the light in said first and second portions varying in response to a perturbation of said waveguide, said detection system providing a first output signal responsive to the intensity of the light in said first portion and a second output signal responsive to the intensity of the light in said second portion.

55. The apparatus as defined in claim 54, wherein the perturbation is a strain applied to said waveguide that causes the length of said waveguide to change.

56. The apparatus as defined in claim 55, wherein the intensity of the light in said first and second portions varies in response to changes in the temperature of said waveguide, the variations in intensity caused by changes in the temperature differing from the variations in intensity caused by strain, said apparatus further including means for processing said first and second output signals to determine the magnitude of the strain and the magnitude of the temperature change.

57. The apparatus as defined in claim 56, wherein said processing means determines the magnitude of the strain and the magnitude of the temperature change in accordance with the following equations:

$$\Delta\phi_H = A\Delta L + B\Delta T$$

$$\Delta\phi_V = C\alpha L + D\Delta T$$

wherein $\Delta\phi_H$ is the change in phase between the fundamental spatial propagation mode and the second order spatial propagation mode for the light propagating in one of said first and second polarization modes as measured by the changes in intensity in a respective one of said first and second portions; $\Delta\phi_L$ is the change in phase between the fundamental spatial propagation mode and the second order spatial propagation mode for the light propagating in the other of said first and second polarization modes as measured by the changes in intensity in the respective other of said first and second portions; $A\Delta L$ is the change in length of the waveguide responsive to the applied strain; $B\Delta T$ is the change in the temperature of the waveguide; and A, B, C and D are constants determined when said apparatus is calibrated with known applied strains and known temperatures.

58. The apparatus as defined in claim 54, wherein said non-circular core has a geometry that is selected so that the light having said wavelength within said predetermined range of wavelengths propagates only in a single, stable intensity pattern in said second order propagation mode, said core geometry suppressing propagation of light in a second intensity pattern in said second order propagation mode.

59. The apparatus as defined in claim 58, wherein said waveguide is a two-mode optical fiber.

60. An apparatus comprising:
  a light source coupled to a single core optical waveguide such that light from said light source propagates in said optical waveguide in first, second, third and fourth propagation paths as first, second, third and fourth light signals; and
  a detection system that (1) detects the phase difference between said first and second light signals propagating in said first and second propagation paths and (2) detects the phase difference between said third and fourth light signals propagating in said third and fourth propagation paths, said detection system utilizing (1) said detected phase difference between said first and second light signals and (2) said detected phase difference between said third and fourth light signals to provide an output signal responsive to perturbation of at least one of said first, second, third and fourth propagation paths of said optical waveguide.

61. The apparatus as defined in claim 60, wherein said optical waveguide is a multimode optical fiber, said first and second propagation paths are the fundamental and second order spatial propagation modes of light having a first polarization, and said third and fourth propagation paths are the fundamental and second order spatial propagation modes of light having a second polarization orthogonal to said first polarization.

62. A method of propagating light from a source of light through an optical waveguide having a core with a non-circular cross-section, comprising the steps of:
   selecting the wavelength of the light and the cross-sectional dimensions of the non-circular core such that (1) the waveguide propagates light in a fundamental spatial propagation mode and a higher order spatial propagation mode, and (2) substantially all of the light in the higher order mode propagates in only a single, stable intensity pattern.

63. The method of claim 62, wherein the fundamental spatial mode includes two polarization modes, the method additionally comprising further selecting the cross-sectional dimensions of the core to cause the polarization modes of the fundamental mode to be nondegenerate.

64. The method of claim 63, wherein the single intensity pattern of the higher order spatial mode includes two polarization modes, the method additionally comprising further selecting the cross-sectional dimensions of the core to cause these polarization modes to be nondegenerate.

65. The method of claim 64, wherein the nondegeneracy between the polarization modes of the fundamental mode and higher order mode produce a beat length between polarization modes on the order of 10 cm or less, for both sets of polarization modes.

66. The method of claim 63, additionally comprising the step of inducing a periodic stress in the waveguide at intervals related to the beat length between the fundamental mode and the higher order mode such that light is cumulatively coupled between the fundamental and higher order modes at the intervals.

67. The method of claim 63, wherein the waveguide comprises an optical fiber, the method additionally comprising the step of propagating a traveling flexural wave in the optical fiber and utilizing the flexural wave to couple light from one of the modes to another of the modes.

68. The method of claim 67, wherein the flexural wave forms a series of microbends which propagate in the fiber.

69. A method of propagating light from a source of light through an optical waveguide having a core with a non-circular cross section, comprising the steps of:
   selecting the wavelength of the light and the cross-sectional dimensions of the non-circular core such that (1) the waveguide propagates light in a fundamental spatial propagation mode and a higher order spatial propagation mode, and (2) substantially all of the light in the higher order mode propagates in only a single, stable intensity pattern, wherein the fundamental spatial mode includes two polarization modes, the method additionally comprising further selecting the cross-sectional dimensions of the core to cause the polarization modes of the fundamental mode to be nondegenerate;
   wherein the waveguide comprises a first optical fiber, said method additionally comprising the step of coupling the light from a selected one of the fundamental and higher order modes of the first fiber to a selected mode of a second fiber, without coupling light from the other of the fundamental and higher order modes to the selected mode of the second fiber.

70. A method of propagating light from a source of light through an optical waveguide having a core with a non-circular cross section, comprising the steps of:
   selecting the wavelength of the light and the cross-sectional dimensions of the non-circular core such that (1) the waveguide propagates light in a fundamental spatial propagation mode and a higher order spatial propagation mode, and (2) substantially all of the light in the higher order mode propagates in only a single, stable intensity pattern, wherein the fundamental spatial mode includes two polarization modes, the method additionally comprising further selecting the cross-sectional dimensions of the core to cause the polarization modes of the fundamental mode to be nondegenerate;
   said method additionally comprising the step of introducing light into the waveguide such that the light propagates in two spatial modes of the waveguide, and such that the light propagates through a sensing section of the waveguide for exposure to an ambient effect, and detecting only a selected portion of the spatial intensity pattern defined by a superposition of the spatial intensity patterns of the two modes, said selected portion of the spatial intensity pattern including substantial portions of light from both of the two spatial modes.

71. The method of claim 70, additionally comprising the step of detecting another portion of the spatial intensity pattern and comparing the detected portions of the spatial intensity patterns to measure the ambient effect.

72. The method of claim 70, additionally comprising the step of coupling light input into one of the two modes to the other of the two modes and shifting the coupled light in frequency.

73. The method of claim 70, wherein the waveguide comprises an optical fiber, the method additionally comprising the step of stretching the optical fiber to produce the ambient effect.

74. The method of claim 70, wherein the two spatial modes comprise the fundamental mode and the higher order mode, the single intensity pattern of the higher order mode including two polarization modes, the fundamental mode also including two polarization modes, the method additionally comprising the step of further selecting the cross-sectional dimensions of the core to cause both sets of polarization modes to be non degenerate.

75. The method of claim 74, additionally comprising the steps of splitting the selected portion of the spatial intensity pattern into two light beams, passing one of the beams through a polarizer to produce a first light signal, passing the other of the beams through a second polarizer to produce a second light signal, orienting the polarizers such that the first and second signals have orthogonal polarizations, and comparing the first and second signals to measure the ambient effect.

76. The method of claim 75, additionally comprising the step of coupling light between the fundamental mode and the higher order mode and frequency shifting the coupled light.

77. A method of separating light having a first wavelength from light having a second wavelength, comprising:
propagating said light in a waveguide comprising first and second propagation modes having first and second propagation constants, respectively, said first propagation constant different from said second propagation constant such that light in said first mode propagates at a different velocity than light in said second propagation mode;
propagating a component of said light at said first wavelength in each of said first and second modes;
propagating a component of said light at said second wavelength in each of said first and second modes;
coupling both of said components at said first wavelength to a first propagation path; and
coupling both of said components at said second wavelength to a second propagation path.

78. The method of claim 77, additionally comprising the step of perturbing the propagation modes to adjust the phase relationship of said components at said first and second wavelengths.

79. The method of claim 78, wherein said waveguide comprises an optical fiber, and wherein the step of perturbing the propagation modes comprises the step of stretching the optical fiber.

80. The method of claim 77, wherein said first and second propagation paths comprise propagation modes of said waveguide, and wherein both of said coupling steps further comprise passing said components through a modal coupler.

81. The method of claim 77, wherein said propagation paths are formed by a pair of optical fibers.

82. The method of claim 77, wherein said coupling steps are performed at a predetermined location on said waveguide at which said components at said first wavelength are out of phase and said components at said second wavelength are in phase.

83. A method of separating light having a first polarization from light having a second polarization, comprising:
propagating said light in a waveguide comprising first and second propagation modes having first and second propagation constants, respectively, said first propagation constant different from said second propagation constant such that light in said first mode propagates at a different velocity than light in said second mode;
propagating a component of said light having said first polarization in each of said first and second modes;
propagating a component of said light having said second polarization in each of said first and second modes;
coupling both of said components having said first polarization to a first propagation path; and
coupling both of said components having said second polarization to a second propagation path.

84. The method of claim 83 additionally comprising the step of perturbing the propagation modes to adjust the phase relationship of said components at said first and second wavelengths.

85. The method of claim 84, wherein said waveguide comprises an optical fiber, and wherein the step of perturbing the propagation modes comprises the step of stretching the optical fiber.

86. The method of claim 83, wherein said first and second propagation paths comprise propagation modes of said waveguide, and wherein said coupling step comprises passing said components through a modal coupler.

87. The method of claim 83, wherein said propagation paths are formed by a pair of optical fibers.

88. The method of claim 83, wherein said coupling steps are performed at a predetermined location on said waveguide at which said components having said first polarization are out of phase and said components having said second polarization are in phase.

* * * * *

UNITED STATES PATENT AND TRADEMARK OFFICE
CERTIFICATE OF CORRECTION

PATENT NO.   : 4,915,468

DATED        : April 10, 1990

INVENTOR(S)  : Byoung Y. Kim, et al.

It is certified that error appears in the above-identified patent and that said Letters Patent is hereby corrected as shown below:

```
In Column 49, at line 53, change "FIG. 34, core" to --FIG. 34,
              the core--.
In Column 50, at line 22, change "3000" to --3200--.
In Column 52, at line 43, change "3420" to --3406--; and
              at line 64, change "3200" to --3406--.
In Column 54, at line 14, change "3432" to --3442--;
              at line 20, change "3432" to --3442--;
              at line 24, change "3432" to --3442--;
              at line 28, change "3434" to --3444--; and
              at line 29, change "3434" to --3444--.
In Column 56, at line 58, change "enables" to --enable--; and
              at line 59, change "provides" to --provide--.
In Column 57, at line 26, change "is only" to --are only--;
              and
              at line 46, change "fiber are" to --fiber 3622
              are--.
In Column 58, at line 25, change "FIG. 40" to --FIG. 39--; and
              at line 49, change "fibers 3672" to --fiber
              3672--.
In Column 59, at line 45, change "the these" to --these--; and
              at line 63, change "3614" to --3622--.
In Column 60, at line 6, change "3614" to --3622--;
              at line 8, change "3614" to --3622--;
              at line 24, change "(15 and 16)" to --(18 and
              19)--; and
              at line 36, change "3614" to --3622--.
In Column 66, at line 41, change "both sides" to --both
              sets--.
```

UNITED STATES PATENT AND TRADEMARK OFFICE
CERTIFICATE OF CORRECTION

PATENT NO.    : 4,915,468

DATED         : April 10, 1990

INVENTOR(S)   : Byoung Y. Kim, et al.

It is certified that error appears in the above-identified patent and that said Letters Patent is hereby corrected as shown below:

```
In Column 31, at line 63, change "of the fiber" to --of the
              fibers--.
In Column 32, at line 9, change "could by used" to --could be
              used--.
In Column 34, at line 61, change "1810 pass" to --1800 pass--.
In Column 36, at line 1, change "2101" to --2102--;
              at line 4, change "2118" to --2120--;
              at line 17, change "2124" to --2100--;
              at line 26, change "2124" to --2100--; and
              at line 50, change "different (αθ)" to
              --difference (Δθ)--.
In Column 37, at line 39, change "to the negative" to --to the
              positive--;
              at line 41, change "to the positive" to --to the
              negative--;
              at line 66, change "2303" to --2302--; and
              at line 66, change "ill be" to --will be--.
In Column 39, at line 11, change "2342" to --2340--; and
              at line 56, change "2382" to --2384--.
In Column 40, at line 29, change "232" to --2302--.
In Column 41, at line 12, change "2428" to --2436--; and
              at line 37, change "intensity nd" to --intensity
              and--.
In Column 42, at line 58, change "2470" to --2472--; and
              at line 60, change "2470" to --2472--.
In Column 44, at line 64, change "differences" to
              --difference--.
In Column 48, at line 33, change "of the is" to --of the
              optical fiber is--.
```

UNITED STATES PATENT AND TRADEMARK OFFICE
CERTIFICATE OF CORRECTION

PATENT NO.    : 4,915,468

DATED         : April 10, 1990

INVENTOR(S)   : Byoung Y. Kim, et al.

It is certified that error appears in the above-identified patent and that said Letters Patent is hereby corrected as shown below:

```
In Column 17, at line 46, change "core 420" to --core 422--.
In Column 18, at line 5, change "are varied" to --is varied--.
In Column 24, at line 6, change "t generate" to --to
                generate--.
In Column 25, at line 20, change "cladding" to --cladding
                1114--.
In Column 26, at line 16, change "in FIG. 14" to --in FIG.
                13--;
              at line 21, change "cladding remaining" to
                --cladding 1114 remaining--;
              at line 28, change "surfaces 1114," to
                --surfaces 1144,--; and
              at line 34, change "in FIG. 16" to --in FIG.
                15--.
In Column 27, at line 59, change "cladding" to --cladding
                1114--.
In Column 28, at line 5, change "1227" to --1228--;
              at line 32, change "1110 interact" to --1100
                interact--;
              at line 57, change "surface 154," to --surface
                1154,--; and
              at line 59, change "fiber 1110" to --fiber
                1100--.
In Column 29, at line 35, change "core 1122" to --core 1112--;
              at line 36, change "cladding 1124," to
                --cladding 1114,--;
              at line 36, change "core 1122" to --core 1112--;
                and
              at line 36, change "forth the" to --forth--.
In Column 30, at line 33, change "signal" to --signals--.
```

UNITED STATES PATENT AND TRADEMARK OFFICE
CERTIFICATE OF CORRECTION

PATENT NO. : 4,915,468

DATED : April 10, 1990

INVENTOR(S) : Byoung Y. Kim, et al.

It is certified that error appears in the above-identified patent and that said Letters Patent is hereby corrected as shown below:

```
In Column 1, at line 35, change "greater that" to --greater
                  than--;
             at line 39, change "greater that" to --greater
                  than--;
             at line 42, change "of first order" to --or first
                  order--; and
             at line 66, change "sifters" to --shifters--.
In Column 2, at line 5, change "from other" to --from optical
                  energy propagating in the other--; and
             at line 39, change "dimension" to --dimensions--.
In Column 3, at line 13, change "are selected" to --is
                  selected--; and
             at line 17, change "differ" to --differs--.
In Column 4, at line 6, change "is utilized" to --are
                  utilized--.
In Column 7, at line 53, change "permits" to --permit--.
In Column 10, at line 1, change "field line 142" to --field
                  line 162--.
In Column 12, at line 39, change "grater" to --greater--; and
              at line 49, change "rage" to --range--.
In Column 14, at line 22, change "Figure 2b" to --Figure 2c--;
              at line 24, change "core 203" to --core 202--;
              at line 38, change "(Figure 6f)" to --(Figure
                  6g)--; and
              at line 40, change "(Figure 6g")" to --(Figure
                  6h)--.
In Column 15, at line 21, change "The curve 312" to --The
                  curve 310--.
In Column 16, at line 22, change "L hd B" to --$L_B$--.
```

UNITED STATES PATENT AND TRADEMARK OFFICE
CERTIFICATE OF CORRECTION

PATENT NO. : 4,915,468

DATED : April 10, 1990

INVENTOR(S) : Byoung Y. Kim, et al.

It is certified that error appears in the above-identified patent and that said Letters Patent is hereby corrected as shown below:

```
In Column 67, at line 1, change "characteristics" to
                 --characteristic--;
             at line 4, change "characteristics" to
                 --characteristic--; and
             at line 58, change "at a waveguide" to --at a
                 wavelength--.
In Column 68, at line 30, change "CαL" to --CΔL--.
```

Signed and Sealed this

Twenty-eight Day of February, 1995

Attest:

BRUCE LEHMAN

*Attesting Officer*  *Commissioner of Patents and Trademarks*